(12) United States Patent
Hanna et al.

(10) Patent No.: US 6,714,665 B1
(45) Date of Patent: Mar. 30, 2004

(54) FULLY AUTOMATED IRIS RECOGNITION SYSTEM UTILIZING WIDE AND NARROW FIELDS OF VIEW

(75) Inventors: Keith James Hanna, Princeton, NJ (US); Peter J. Burt, Princeton, NJ (US); Shmuel Peleg, Princeton, NJ (US); Douglas F. Dixon, Hopewell, NJ (US); Deepam Mishra, Plainsboro, NJ (US); Lambert E. Wixson, Rocky Hill, NJ (US); Robert Mandlebaum, Philadelphia, PA (US); Peter Coyle, Newtown, PA (US); Joshua R. Herman, Robbinsville, NJ (US)

(73) Assignee: Sarnoff Corporation, Princeton, NJ (US)

( * ) Notice: Subject to any disclaimer, the term of this patent is extended or adjusted under 35 U.S.C. 154(b) by 1327 days.

(21) Appl. No.: 08/759,346

(22) Filed: Dec. 3, 1996

Related U.S. Application Data

(63) Continuation-in-part of application No. 08/727,366, filed on Sep. 27, 1996, now Pat. No. 5,751,836, which is a continuation of application No. 08/300,678, filed on Sep. 2, 1994, now Pat. No. 5,572,596.
(60) Provisional application No. 60/027,653, filed on Oct. 4, 1996, provisional application No. 60/023,037, filed on Aug. 2, 1996, and provisional application No. 60/007,906, filed on Dec. 4, 1995.

(51) Int. Cl.[7] .............................................. G06K 9/00
(52) U.S. Cl. ...................... 382/117; 382/106; 382/190; 382/209
(58) Field of Search ................................. 382/117, 118, 382/115, 148, 181, 190, 199, 201, 209, 240, 203, 318, 319, 351, 154, 106

(56) References Cited

U.S. PATENT DOCUMENTS 4,589,140 A  5/1986  Bishop et al. .................. 382/8

(List continued on next page.)

OTHER PUBLICATIONS

Copy of International Search Report dated Mar. 7, 1997 from corresponding. international application.

A System for Non–intrusive Human Iris Acquisition and Identification, K. Hanna, et al. Presented at Machine Vision Applications, Tokyo, Nov. 96.

Methods & Designs, High–Speed Data Processing and Unobtrusive Monitoring of Eye Movements, Robert H. Lambert, Richard A. Monty and Robert J. Hall, Behavior Research Methods & Instrumentation, 1974, vol. 6 (6) 525–530.

*Primary Examiner*—Jayanti K. Patel
*Assistant Examiner*—Sheela Chawan
(74) *Attorney, Agent, or Firm*—William J. Burke

(57) ABSTRACT

A recognition system which obtains and analyzes images of at least one object in a scene comprising a wide field of view (WFOV) imager which is used to capture an image of the scene and to locate the object and a narrow field of view (NFOV) imager which is responsive to the location information provided by the WFOV imager and which is used to capture an image of the object, the image of the object having a higher resolution than the image captured by the WFOV imager is disclosed. In one embodiment, a system that obtains and analyzes images of the irises of eyes of a human or animal in an image with little or no active involvement by the human or animal is disclosed. A method for obtaining and analyzing images of at least one object in a scene comprising capturing a wide field of view image of the object to locate the object in the scene; and then using a narrow field of view imager responsive to the location information provided in the capturing step to obtain higher resolution image of the object is also disclosed.

16 Claims, 54 Drawing Sheets

U.S. PATENT DOCUMENTS

| | | | |
|---|---|---|---|
| 4,620,318 A | * 10/1986 | Hill | 382/2 |
| 4,641,349 A | * 2/1987 | Flom et al. | 382/2 |
| 4,692,806 A | * 9/1987 | Anderson et al. | 358/209 |
| 5,016,282 A | * 5/1991 | Tomono et al. | 382/58 |
| 5,063,603 A | * 11/1991 | Burt | 382/2 |
| 5,291,560 A | * 3/1994 | Daugman | 382/2 |
| 5,329,599 A | 7/1994 | Curry et al. | 382/54 |
| 5,365,597 A | * 11/1994 | Holeva | 382/1 |
| 5,430,809 A | 7/1995 | Tomitaka | 382/173 |
| 5,452,376 A | 9/1995 | Escalante Ramirez et al. | 382/274 |
| 5,504,319 A | * 4/1996 | Li et al. | 382/62 |
| 5,572,596 A | 11/1996 | Wildes et al. | 382/117 |
| 5,689,575 A | * 11/1997 | Sako et al. | 382/115 |
| 5,809,183 A | * 9/1998 | Serizawa et al. | 382/298 |

* cited by examiner

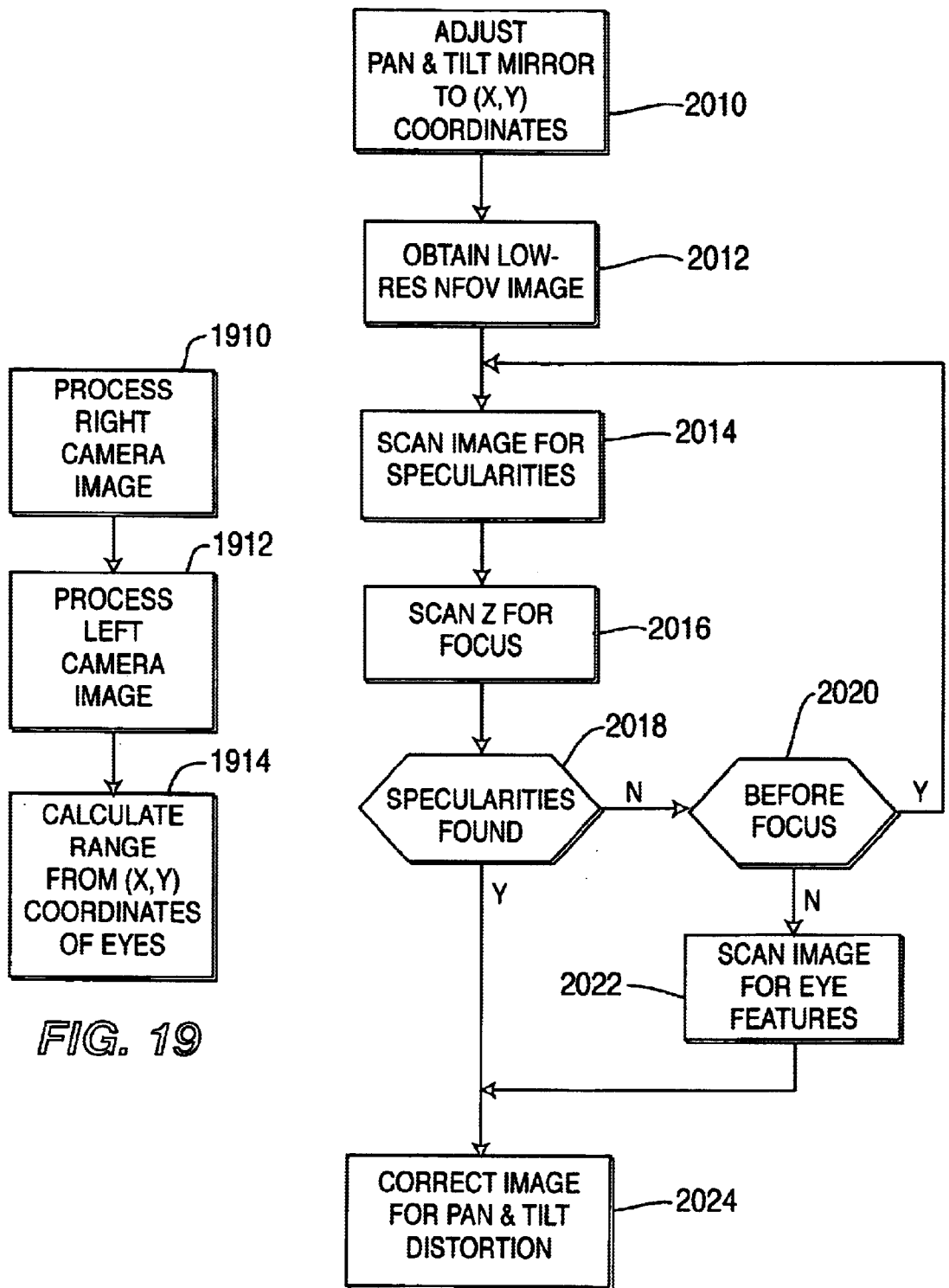

FULLY AUTOMATED IRIS RECOGNITION SYSTEM UTILIZING WIDE AND NARROW FIELDS OF VIEW

This application is a continuation-in-part of U.S. application Ser. No. 08/727,366, filed Sep. 27, 1996, now U.S. Pat. No. 5,751,836, which was a continuation of U.S. application Ser. No. 08/300,678, filed Sep. 2, 1994, now U.S. Pat. No. 5,572,596.

This application claims the benefit of U.S. Provisional Application No. 60/027,653, field Oct. 4, 1996; U.S. Provisional Application No. 60/023,037, filed Aug. 2, 1996; and U.S. Provisional Application No. 60/007,906, filed Dec. 4, 1995.

BACKGROUND OF THE INVENTION

The invention is directed to video image capture and processing systems and methods therefor.

There are many methods for recognizing or identifying an individual on a transactional basis. These include analyzing a signature, obtaining and analyzing an image of a fingerprint, and imaging and analyzing the retinal vascular patterns of a human eye. All of these recognition techniques have a common drawback, they require the individuals being recognized to perform some positive act, either signing their names, placing one of their fingers on an imaging plate or positioning themselves using a head-rest or bite bar or position their eye relative to an eyepiece so that an image of their vascular patterns may be captured.

Recently iris capture and analysis has been gaining favor as a method for identifying individuals. This technique is described in U.S. Pat. Nos. 4,641,349 to Flom et al. and 5,291,560 to Daugman and in an article by J. G. Daugman entitled "High Confidence Visual Recognition of Persons by a Test of Statistical Independence," *IEEE Transactions on Pattern Analysis and Machine Intelligence*, vol. 15, no. 11, pp. 1148–61, November 1993. The systems described in these references require the person being identified to hold at least one of their eyes in a fixed position with respect to an imaging imager while their iris is being imaged. While this procedure may be satisfactory for some applications, it is not satisfactory for quick transactional activities such as using an automatic teller machine (ATM). A person using an ATM typically does not want to spend any more time than is necessary to complete his or her transactions. Consequently, it would be considered an undue burden to ask ATM users to perform any positive act other inserting their ATM card and keying in their desired transactions on a keypad.

This need makes clear that there exists a more general problem of identifying objects or individuals in a passive way that is both fast and accurate.

SUMMARY OF THE INVENTION

The invention is embodied in a system which obtains and analyzes images of at least one object in a scene comprising a wide field of view (WFOV) imager which is used to capture an image of the scene and to locate the object and a narrow field of view (NFOV) imager which is responsive to the location information provided by the WFOV imager and which is used to capture an image of the object, the image of the object having a higher resolution than the image captured by the WFOV imager.

The invention is embodied in a fully automatic system that obtains and analyzes images of the irises of eyes of a human or animal in an image with little or no active involvement by the human or animal. According to one aspect of the invention, the system includes both WFOV and NFOV imagers. The system includes control circuitry which obtains an image from the WFOV imager to determine the location of the eyes and then uses the NFOV imager to obtain a high-quality image of one or both of the irises.

The invention is also a method for obtaining and analyzing images of at least one object in a scene comprising capturing a wide field of view image of the object to locate the object in the scene; and then using a narrow field of view imager responsive to the location information provided in the capturing step to obtain higher resolution image of the object.

BRIEF DESCRIPTION OF THE DRAWING

FIG. 1b is a flow chart that is useful for describing the operation of the acquisition system of FIG. 1a.

FIG. 19 is a flow chart which shows an exemplary method of implementing the find range block shown in FIG. 14.

FIG. 20 is a flow chart which shows an exemplary method of implementing the locate iris block of the flow chart shown in FIG. 14.

FIG. 22b is a drawing of a human eye which is useful for describing the operation of the method shown in FIG. 22a.

DETAILED DESCRIPTION

While the invention is described in terms of an iris recognition system which verifies the identify of an person using an automatic teller machine, it is contemplated that it may be practiced more generally as a system and method which uses successive WFOV processing and NFOV processing to locate and identify objects in a scene which contains the objects.

Overview

The exemplary embodiment of the invention is directed to an automated acquisition system for the non-intrusive acquisition of images of human irises for the purpose of identity verification. The exemplary embodiment uses active machine vision techniques that do not require the user to make physical contact with the system, or to assume a particular pose except that the user preferably stands with his head within a designated calibrated volume.

Figure 1A:
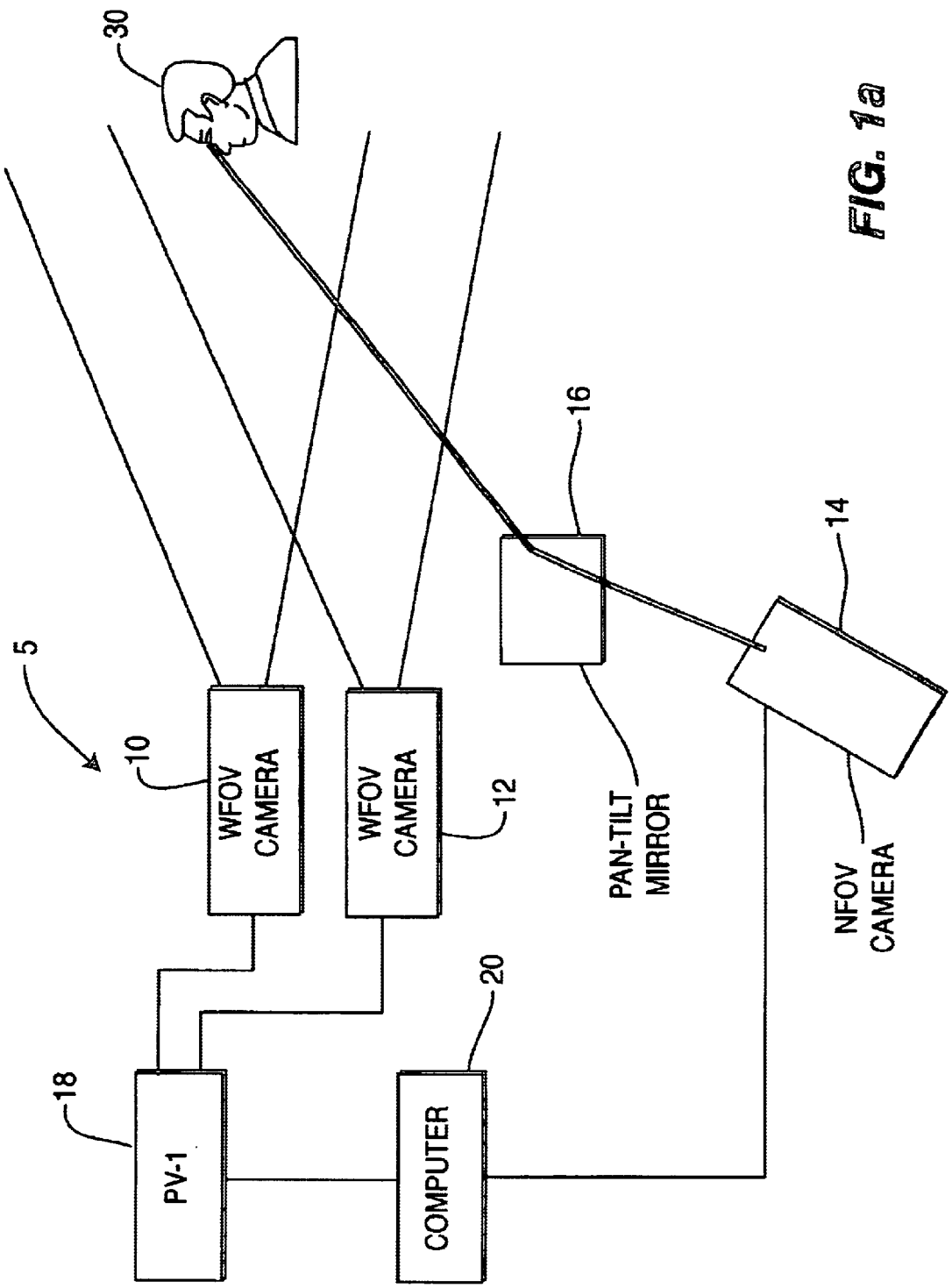
FIG. 1a is a block diagram of an acquisition system according to one embodiment of the invention.

As is shown in FIG. 1a, the acquisition system 5 consists of a stereo pair of wide field-of-view (WFOV) imagers 10 and 12, a narrow field-of-view (NFOV) imager 14, a pan-tilt mirror 16 allowing the image area of the NFOV imager to be moved relative to the WFOV imagers 10 and 12, an image processor 18 which may be a PV-1™ real-time vision computer available from Sensar Inc. or David Sarnoff Research Center, and a processor 20 which may be any of a number of computers which use a PENTIUM™ microprocessor manufactured from Intel, Corp., or other microprocessors having similar capabilities. The system 5 actively finds the position of a user's eye 30 and acquires a high-resolution image to be processed by the image processor 18 which performs iris recognition.

Figure 1B:
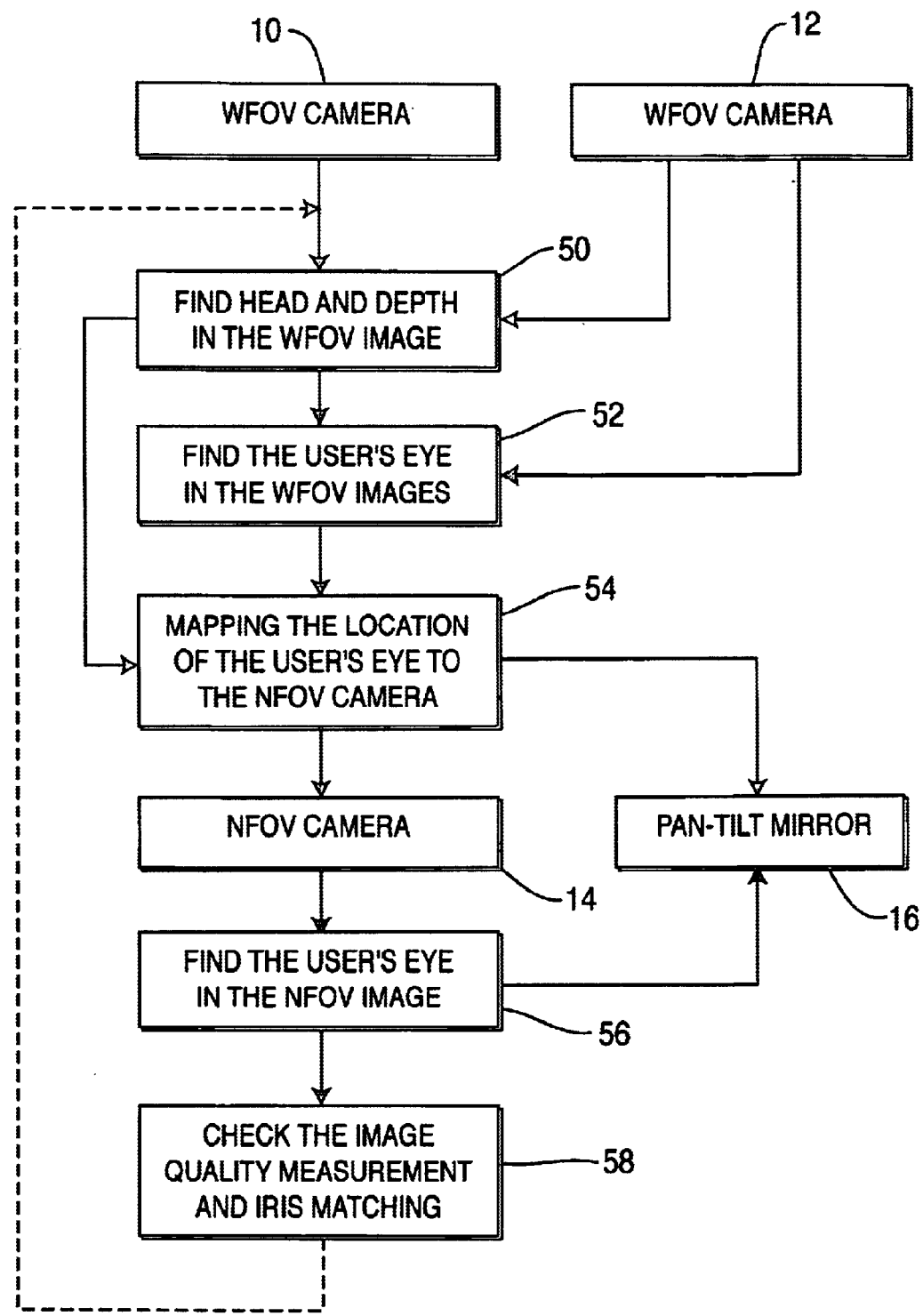

The operation of the system 5 is described below with reference to FIG. 1b. The head and depth finding process 50 uses a pair of stereo WFOV images from WFOV imagers 10 and 12. Using the stereo images, process 50 selects the nearest user to the system, finds the position of the user's head in the image, and estimates the depth of the user's eye 30 from the system 5. Process 50 implements a cross-correlation-based stereo algorithm to build a disparity map of the WFOV scene, the scene acquired by the WFOV imagers 10 and 12. The disparity map is then analyzed and the closest region, the region of interest (ROI), of approximately the size and shape corresponding to that of a human head is extracted. The disparity corresponding to the user's face is then taken to be the mean disparity of this region. The three dimensional depth of the user's face is proportional to the inverse of the disparity.

An image of the ROI containing the user's head is provided to WFOV eye finding process 52 which locates the user's eye is located in the ROI. It is also contemplated that the estimated depth of the user's head may also be provided to the WFOV eye finding process 52. Process 52, may, for example, use a template to locate the user's right eye in the ROI. Alternatively, the user's right or left eye could be located using one of the other processes described below. Process 52 may also analyze and combine the results of three eye finding processes to verify and determines the precise location of the user's eye.

The first exemplary process is a template based process which locates the user's face in the ROI by searching for characteristic arrangements of features in the face. A bandpass filtered version of the ROI and the orientation of particular features of the user's face, for example, the mouth, at a coarse resolution of the ROI are compared to the template. The face template comprises a priori estimate of the expected spatial arrangement of the facial features. A face is detected when a set of tests using these features is successfully passed.

The second process is a template-based method which uses similar features to those used in the first process but locates the eyes by identifying the speculation from the surface of spectacles worn by the user, if present. The third process is a specularity-based process that locates reflections of the illuminators that are visible on the user's cornea. The information from the first, second, and third process are combined to determine whether an eye has been detected, and, if so, its location in the image.

Next, process 54 maps the depth and WFOV image coordinates of the user's eye to estimate the pan, tilt, and focus parameters of the pan-tilt mirror 16 and the NFOV imager 14 which are used to capture an image of the user's eye with the NFOV imager 14. A calibration look-up table (LUT) is used to map the information recovered from the WFOV processing of processes 50 and 52 onto the NFOV imaging parameters which are used to align the WFOV and NFOV images. The input values to the LUT are the x, y image coordinates of the eye and the depth z of the head. The LUT provides as output values the pan and tilt angles of the pan/tilt mirror 16, the focus of the NFOV imager, and the expected diameter of the iris. The values stored in the LUT account for the baseline separations between the WFOV imagers and the NFOV imager 14, lens distortion in the WFOV imagers 10 and 12, and vergence of the WFOV imagers 10 and 12.

The contents of the LUT are obtained using a calibration process. Calibration is performed when the system 5 is built. An object of known size is placed at an x, y location (relative to the imager) in the image. The depth z in that region is computed by process 50. The pan/tilt mirror is manually slewed so that the object is centered in the NFOV image. The image is then focused, and the diameter in pixels of the object is measured. Thus, for each point, the set of corresponding values {x, z, pan, tilt, focus, iris diameter} is recorded. The x, y, and z values and the three dimensional coordinates of the user's head with respect to the system 5. Pan and tilt values are the adjustments for the pan-tilt mirror 16. The focus value is the focus of NFOV imager. Finally, iris diameter value is the expected size of the user's iris.

This process is repeated for up to twenty points per depth plane, and at up to four depths inside the working volume of the system 5. Next, for each set of neighboring points within the acquired points, a vector of linear functions is fit to the data as shown in relation (1) below.

$$(f_{pan}, f_{tilt}, f_{focus}, f_{diam}): X \times Y \times Z \ddagger P \times T \times F \times D \tag{1}$$

X is x, Y is y, Z is z, P is pan, T is tilt, F is focus, and D is iris diameter. The result is a set of vectors of functions that define the mapping from X, Y, and Z to each of the described parameters throughout the volume. In operation, the LUT maps the user's eye location (x, y, z) to the linearly interpolated NFOV imager parameters ($f_{pan}$, $f_{tilt}$, $f_{focus}$, $f_{diam}$) (x, y, z) derived from the values stored in the LUT. Other values may also be stored in the LUT including aperture size, expected specularity size, and expected distance between specularities. The aperture size may be determined by placing a white object at each position during calibration and adjusts the operation of the imager so that a uniform brightness level may be established. The expected specularity size and the expanded distance between specularities may be used to identify false detection of specularities, that is, specularities that are not from the user's cornea or glasses.

Next, the user's eye 30 is found in the NFOV image using the eye finding process 56. Process 56 detects a set of features visible in the NFOV image if the eye is in the field of view. Process 56 uses two incandescent light sources, one on either side of the NFOV imager. Light from these sources is reflected from the cornea of the eye 30, and appears as two bright spots. The specularities are used both to confirm the presence of the eye in the NFOV image and subsequently to determine the location of the eye 30. The separation of the detected specularities is estimated from the depth information obtained by process 50. Because the specularities are approximately symmetrically located on either side of the eye center, their positions are used to estimate the coordinates of the center of the iris. Once the presence of the eye has been reliably determined, closed-loop NFOV tracking is used without information from the WFOV image. In the event of large motion by the user, the NFOV imager 14 may lose track of the eye 30. In this instance, process 50 or processes 50 and 52 may be initiated to reacquire the eye 30.

Process 58 checks and adjusts, if necessary, the image quality of the image of the iris which is about 200 by 200 pixels. Image quality is adjusted by electronically centering the eye 30 in the image center from the NFOV imager 14 using the mean position of the detected specularities after mechanical centering of the eye in the NFOV imager 14. The image of the user's eye is then processed to identify the user.

In addition, the system may store other attributes of the user such a height, facial features, hair color, or face color for recognizing the user. This information may be acquired and stored in the system during enrollment when information relating to the user's iris is acquired and stored. Further, the system may also include security features to ensure that the acquired image of the iris is from a real person and not a imitation. For this purpose, the system may include blink detection processes to detect blinking of the user's eye lid, a pupil size process to detect changes in the user's pupil in response to changes in illumination, or a tremor detection process to detect the natural tremor of a person's eye.

Although the system described above and below is for recognizing a user, the same components and processes may be used in an enrollment process to store iris information. During the enrollment process, the system would perform the same operations as described above and below except that the acquired image of the user's eye would be stored in a database.

Detailed Description of Exemplary Embodiments

Figure 1C:
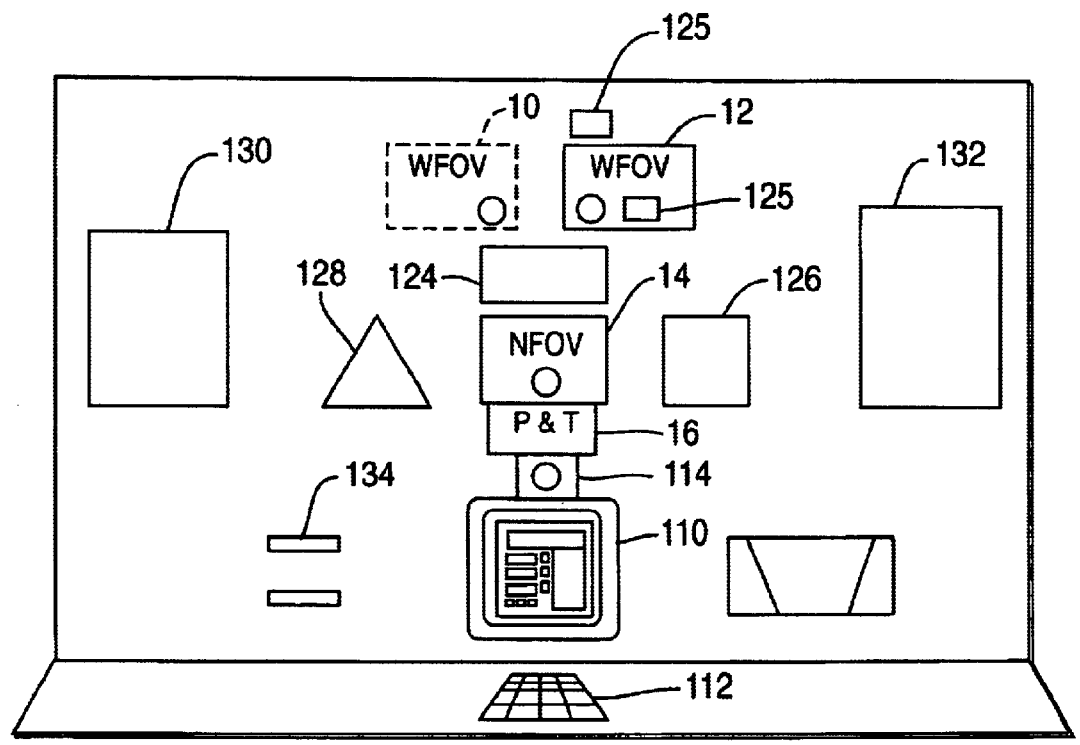
FIG. 1c is a front plan view of an automatic teller machine which includes an embodiment of the invention.

FIG. 1c is a front plan view of an automatic teller machine (ATM) which includes an iris recognition system according to the invention. In addition to the basic iris recognition system, the ATM shown in FIG. 1c also illustrates several alternative illumination schemes.

The exemplary ATM includes several features common to all ATM's, a display 110, a keypad 112 and a card reader 134. Although used for a different purpose, most ATM's also include a WFOV imager, such as the imager 10 shown in FIG. 1c. In a conventional system, the imager 10 is used to obtain images of persons using the ATM for security purposes. As described below, in an ATM according to the invention, the WFOV imager is also used to capture an image of a person who is using the ATM in order locate the person's eyes for a subsequent iris imaging operation.

In addition to the WFOV imager 10, the exemplary ATM includes a second WFOV (WFOV) imager 12 for stereoscopic imaging, a NFOV imager 14 and a pan and tilt mirror 16. One or both WFOV imagers 10 and 12 may include on-axis illumination 12s and off-axis illumination 12r that may be used in conjunction with the WFOV imagers 10 and 12 to detect and remove unwanted specularities from the imagery. The pan and tilt mirror 16 is used to direct light reflected from the person using the ATM into the lens system of the NFOV imager 14. The exemplary ATM shown in FIG. 1c also includes a sonic rangefinder transducer 114 which may be used, as described below, to determine an approximate distance between the NFOV imager 14 and the person using the ATM.

While, in the exemplary embodiment, the mirror is on a pan and tilt mounting, it is contemplated that a similar effect could be generated by using a fixed mirror and having the NFOV imager 14 on a pan and tilt mounting.

The ATM shown in FIG. 1c includes several alternative light sources that are used to illuminate the person for the imagers 10, 12 and 14. The light source 124 is positioned close to the optical axis of the WFOV imager 10. This light source may be used to locate the eyes of the person quickly using the "red eye" effect, as described below with reference to FIGS. 12, 13 and 15. One alternative lighting scheme includes the light sources 126 and 128. These light sources are positioned close to the imagers 10, 12 and 14 but far enough from the optical axes of the imagers such that a "red-eye" effect is not produced. These light sources may also have different shapes so that their specular reflections in the person's eyes can be differentiated from other reflections used to locate the eyes and to determine their gaze direction, as described below with reference to FIGS. 11 and 21. The third alternative light sources are the lights 130 and 132 which are located distant from the imagers 10, 12 and 14 and are relatively large in size so as to provide a diffuse illumination.

The ATM system shown in FIG. 1c includes another alternative light source (not shown) which is directed through the pan and tilt mirror 16. As described below with reference to FIGS. 4a, 4b, 5a and 5b, this light source is primarily used with the NFOV imager. It may, however, be used by the WFOV imagers 10 and 12 in much the same way as the light sources 126 and 128, described below with reference to FIG. 21.

Figure 2:
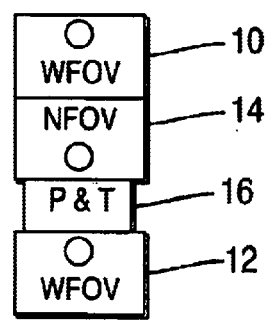
FIG. 2 is a front plan view of a physically smaller iris recognition system which includes an embodiment of the invention.

As shown in FIG. 1c, the iris recognition system may occupy relatively large area in the ATM machine depending upon the illumination method that is used. FIG. 2 shows a minimal configuration which includes WFOV imagers 10 and 12, a NFOV imager 14 and a pan and tilt mirror 16. In this embodiment of the invention, the WFOV imagers use a combination of ambient illumination and a light source (not shown) internal to the ATM which provides light via the pan and tilt mirror 16. In addition, by placing the WFOV imager 10 on axis with the other WFOV imager 12 in the vertical direction errors in determining the position of the user's eyes are minimized. Further, one of the WFOV imagers 10 and 12 may also be arranged to have the same optical axis as the NFOV imager 14. Thus, errors in pointing and focusing the NFOV imager 14 based on the WFOV images may be minimized because the NFOV imager 14 is already aligned with one WFOV imager.

Figure 3:
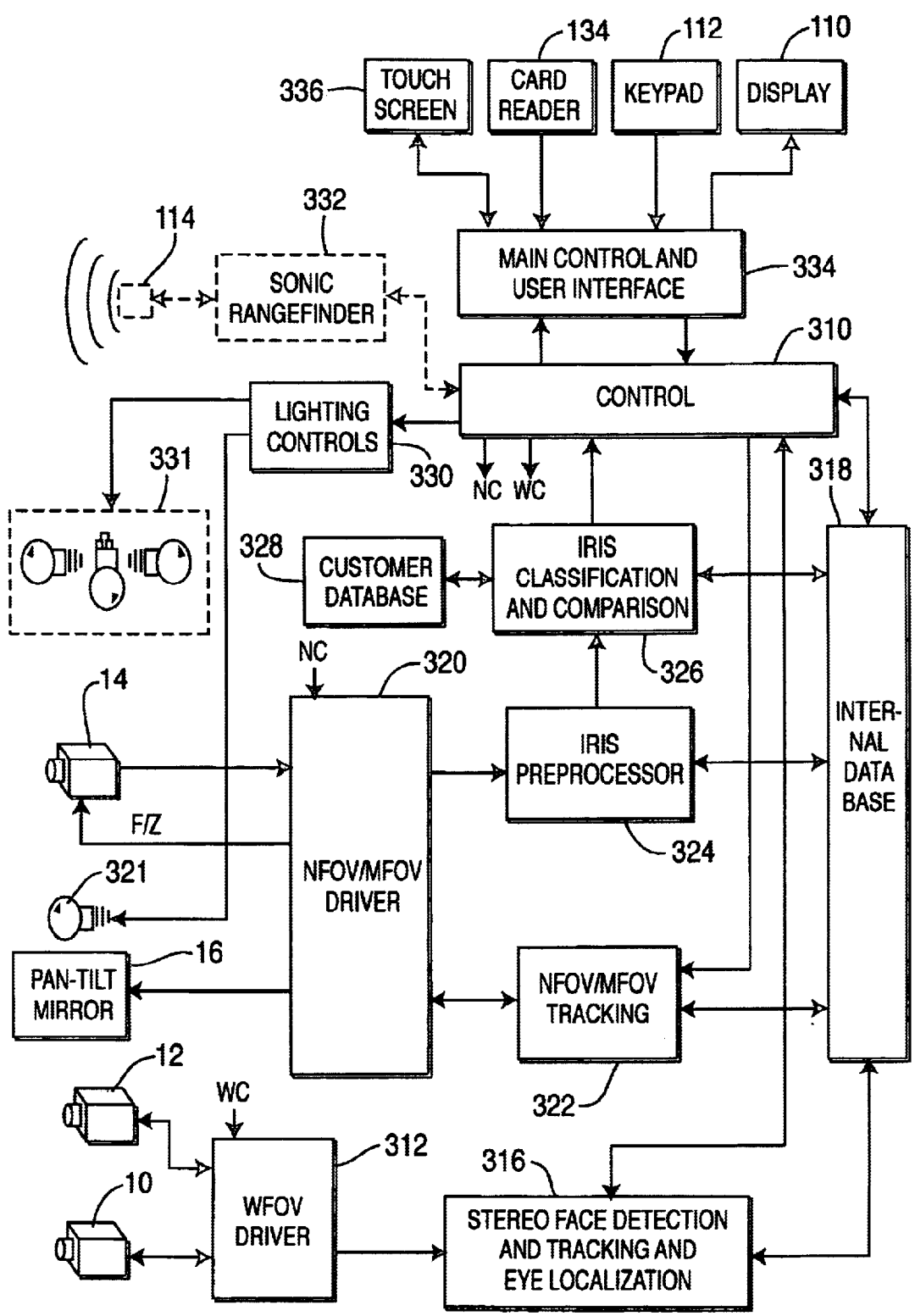
FIG. 3 is a functional block diagram of apparatus suitable for use in the automatic teller machine shown in FIG. 1c.

FIG. 3 is a functional block diagram of an iris recognition system of the type used in the ATM shown in FIG. 1c. In the exemplary embodiment of the invention the WFOV driver 312 and the NFOV driver 320 are implemented using the Smart Video Recorder Pro, manufactured by Intel. In addition, the sonic rangefinder 332 is implemented using the SonarRanger Proximity Subsystem Manufactured by Transition Research Corporation. It is contemplated, however that all of drivers and image processors may be implemented in software on a workstation computer. In the exemplary embodiment of the invention, the host computer, the one on which the control process 310 is implemented, is a Dimension XPS P120c PC computer manufactured by Dell.

In the system shown in FIG. 3, the WFOV imager 10 and a second WFOV imager 12 are coupled to the WFOV driver 312. An exemplary imager suitable for use as either of the WFOV imagers 10 or 12 is the IK-M27A Compact Desktop Color Video Camera manufactured by Toshiba. While the imagers are described in terms of video cameras it is understood that the cameras may operate at other than video rates and that any transducer for converting an image of an object or scene into an electrical signal may be used.

Figure 30:
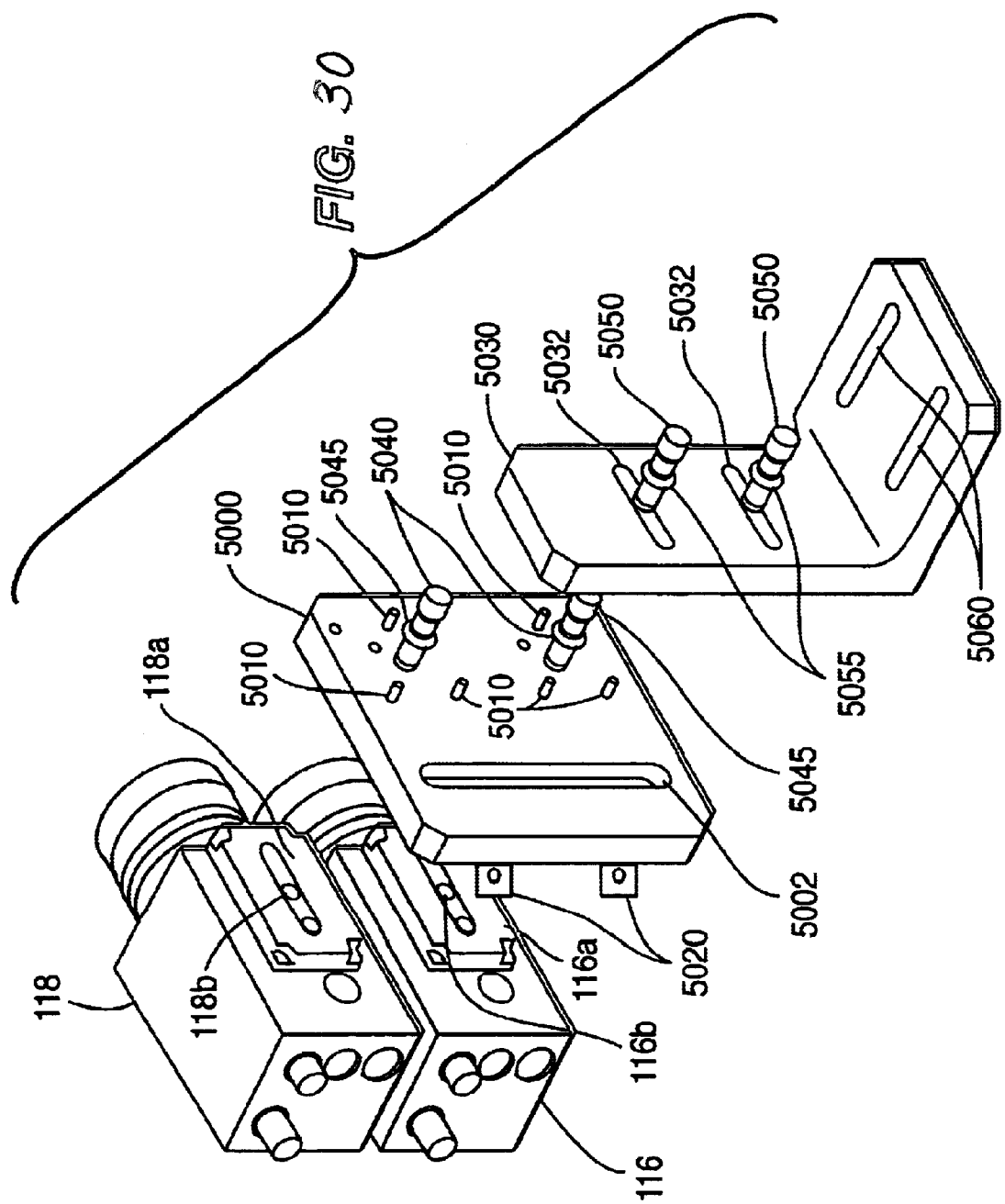
FIG. 30 is a diagram of the mounting apparatus for the WFOV imagers in accordance with an exemplary embodiment of the invention.

The WFOV imagers 10 and 12 are both mounted, as shown in FIG. 30, on a imager mounting bracket 5000 using their respective tripod mounts 10a and 12a. The tripod mounts 106a and 128a each have, for example, a standard ¼ inch, number 20 screw mount 10b and 12b. Each WFOV imager 10 and 12 is attached to the imager mounting bracket 5000 using a ¼ 20 screw 5040 and a lock washer 5045 which is received by the screw mounts 10b and 12b. Positioned around each screw 5040 are three set screws 5010 that protrude through the mounting bracket 5000 and which contact the base of each of the WFOV imagers 10 and 12. By adjusting each of the set screws 5010, the WFOV imagers 10 and 12 may be moved through several degrees of freedom to align the WFOV imagers 10 and 12. The alignment of the imagers is explained below with reference to FIGS. 31 and 32.

Figure 32:
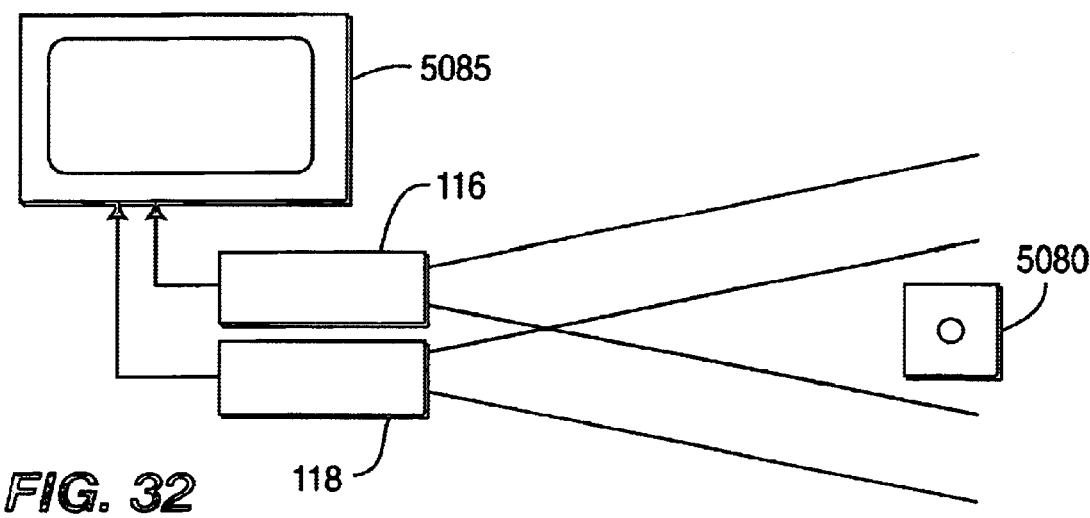
FIG. 32 is a block diagram of a test setup used in the process shown in FIG. 31 for adjusting the mounting apparatus.

As is shown in FIG. 32, the WFOV imagers 10 and 12 are aligned using a target 5080 and display device 5085. The WFOV imagers 10 and 12 are coupled to the display device 5085 so that images acquired by the WFOV imagers are displayed on the display device 5085. The WFOV imagers 10 and 12 are aligned so that the images acquired by each WFOV imager are aligned on the display device 5085. Screws 5040 are screwed into the tripod mount 10a and 12a. The lock washers 5045 used in conjunction with screws 5040 provide a spring effect and allow movement of the WFOV imagers 10 and 12 relative to the imager mounting bracket 5000 when the adjustments are made using the set screws 5010.

Figure 31:
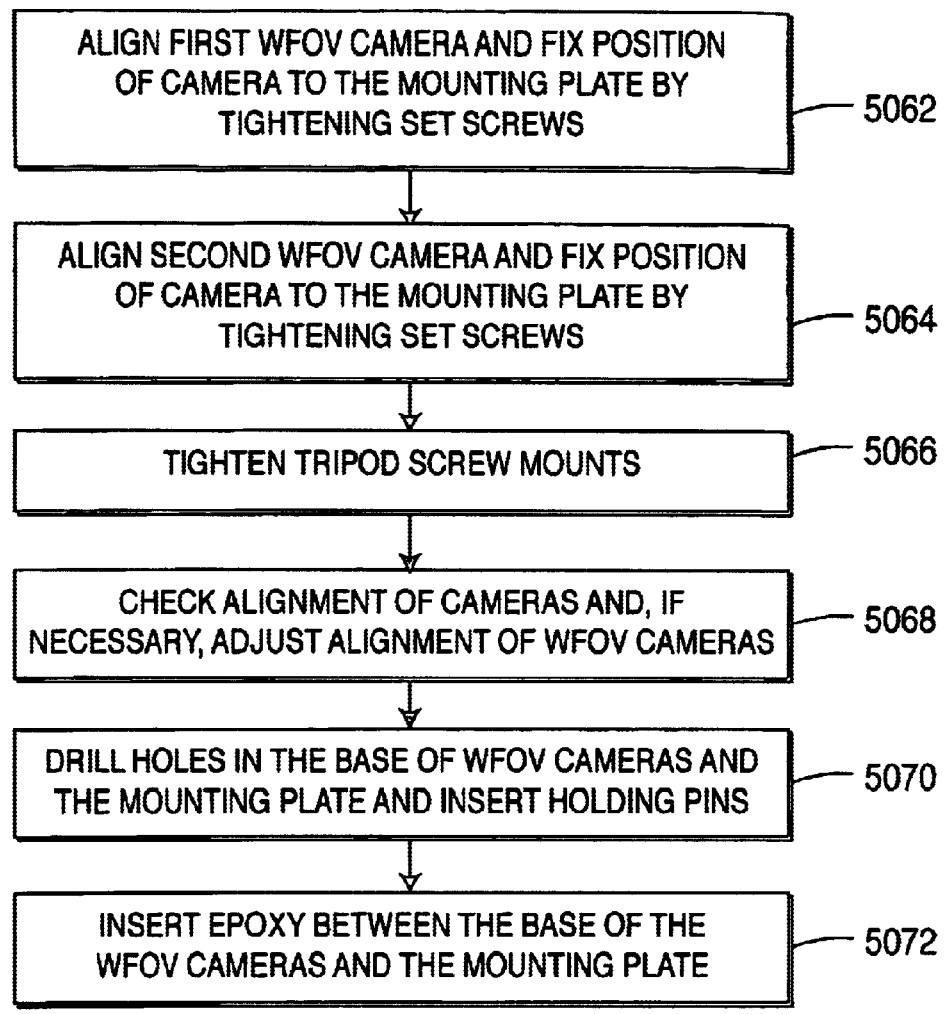
FIG. 31 is a flow chart which shows an exemplary method for adjusting the mounting apparatus shown in FIG. 30.

At step 5062, shown in FIG. 31, one of the WFOV imagers 10 and 12 is adjusted by adjusting the set screws 5010 to acquire an image of the target 5080 to be displayed, for example, in approximately the center of the display device 5085. At step 5064, the other one of the WFOV imagers 10 and 12 is adjusted by adjusting the set screws 5010 to acquire an image of the target 5080 which is also displayed on the display device 5085 and which is aligned with the displayed target of the other WFOV imager. Then, at step 5066, the tripod mounts 10a and 12a are tightened to the imager mounting bracket using screws 5040 and lock washers 5045.

Then, at step 5068, the alignments of the WFOV imagers 10 and 12 are checked using the target 5080 and the display device 5085 and, if necessary, adjusted again using the set screws 5010. At step 5070, holes are drilled through the imager mounting bracket 5000 and into the tripod mounts 10a and 12a and holding pins (not shown), such as split pins, are inserted into the holes. This freezes the WFOV imagers 10 and 12 with respect to the imager mounting bracket 5000 and prevents movement if screws 5040 loosen and loss of alignment. A split pin is a pin that has a tubular shape folded around itself and made round. The holding pins may also be solid pins. Finally, at step 5072, an epoxy is injected between the imager mounting bracket 5000 and the tripod mounts 10a and 12a to further prevent movement. The alignment process described with reference to FIGS. 31 and 32 is a cost efficient method of aligning the WFOV imagers 10 and 12 which allows rapid alignment of the WFOV imagers 10 and 12. The alignment process also enables the mounting hardware to be compact.

The imager mounting bracket 5000 is mounted to a mounting bracket 5030 through orthogonal slots 5031 and 5032 using ¼ 20 bolts 5050, ¼ flat washers 5055, and ¼ 20 nuts 5020. The mounting bracket 5030 is coupled to the system through slots 5060. Slots 5002, 5032, and 5060 provide movement of the WFOV imagers 10 and 12 relative to the system 5 so that the pan and tilt of the WFOV imagers 10 and 12 may be adjusted during the manufacture of the ATM.

Returning to FIG. 3, the exemplary driver 312 obtains images from one or both of the imagers 10 and 12 and provides these images to the host processor at a rate of three to five images per second. The inventors recognize, however, that it would be desirable to have a driver 312 and host interface which can provide image data at a greater rate. The WFOV images are passed by the driver 312 to the stereo face detection and tracking and eye localization module (the stereo module) 316. The stereo module 316 locates portions of the image which include features, such as skin tones or inter-image motion, that may be used by the stereo module 316 to find the person's head and eyes. The locations of the head and eyes determined by the stereo module 316 for each frame of the WFOV image are stored in an internal database 318 along with other, collateral information found by the stereo module 316, such as approximate height, hair color and facial shape. The process 312 and the stereo module 316 are controlled by a control process 310. The stereo module 316 provides a signal to the process 310 when it has located the person's eyes in the image. Further, control information may be provided to the WFOV imagers 10 and 12 via the WFOV driver 312 to control the aperture, focus, and zoom features of the WFOV imagers 10 and 12 that may be stored in a look-up table as described below.

As shown in FIG. 3, the WFOV driver 312 is also coupled to receive images from a second WFOV imager 12. Together, the imagers 10 and 12 provide a stereoscopic view of the person using the ATM. Using this stereoscopic image, the stereo module 316 can determine the position of the person's eyes in space, that is to say, it can determine the coordinates of the eyes in an (X, Y, Z) coordinate system. Knowing Z coordinate information about the eyes is useful for focusing the NFOV imager in order to quickly capture a high-quality image of at least one of the person's eyes.

A similar result may be obtained using a single imager and two light sources. Using this technique, the imager 10 obtains two successive images of the person: a first image illuminated only from the left by light source 130 shown in FIG. 1c and a second image illuminated only from the right by light source 132. Together, these images provide photometric stereoscopic information about the person. These photometric stereo images may be analyzed in much the same way as the true stereo images in order to determine the distance of the person's eyes from the NFOV imager (i.e. Z coordinate information) as well as the location of the eyes in the WFOV image (i.e. X, Y coordinate information).

Where only a single imager 10 and a single light source are used by the iris recognition system, information about the distance of the person from the NFOV imager can be obtained from the sonic rangefinder 332 and sonic transducer 114. An exemplary sonic rangefinder 332 and transducer 114 suitable for use in the exemplary embodiment of the invention are included in the SonarRanger Proximity Subsystem manufactured by Transition Research Corporation. The sonic rangefinder 332 is controlled by the control process 310 to determine the distance between the ATM and the person using conventional ultrasonic ranging techniques. The distance value returned by the rangefinder 332 is passed through the control process 310 to the internal database 318.

Another method of determining Z coordinate distance when only a single imager and a single light source are used is to scan the NFOV imager along a line in the X, Y coordinate plane that is determined by the X, Y coordinate position of the eyes determined from processing the WFOV image. This line corresponds to all possible depths that an image having the determined X, Y coordinates may have. As the NFOV imager is scanned along this line, the images it returns are processed to recognize eye-like features. When an eye is located, the position on the line determines the distance between the near field of view imager and the customer's eyes.

The NFOV imager 14120 is coupled to a NFOV/medium field of view driver 320. The driver 320 controls the focus and zoom of the imager 14 via a control signal F/Z. In addition, the driver 320 controls the pan and tilt mirror 16. An exemplary imager suitable for use as the NFOV imager 14 is the EVI-320 Color Camera 2×Telephoto manufactured by Sony and an exemplary pan and tilt mirror is the PTU-45 Computer Controlled Pan-Tilt Mirror Adapter manufactured by Directed Perception. In addition, the exemplary NFOV imager 14 uses a 46 mm FA 2×Telephoto Video Converter, manufactured by Phoenix as its zoom lens. In the embodiment of the invention shown in FIGS. 1, 2 and 3, the imager 14 and its zoom lens (not shown) are mounted in a fixed position in the ATM and the pan and tilt mirror 16 is used to scan image captured by the NFOV imager in the X and Y directions. The focus control on the imager lens is activated by the signal F/Z to scan the imager in the Z coordinate direction. In the exemplary embodiment of the invention, the zoom control is not used. It is contemplated, however, that the zoom control may be used 1) to magnify or reduce the size of the eye imaged by the near field of view imager in order to normalize the image of the iris or 2) to capture images at a medium field of view (small zoom ratio) prior to capturing images at a NFOV (large zoom ratio).

In the exemplary system shown in FIG. 3, the image captured by the NFOV imager 14 is one in which the person's iris has a width of approximately 200 pixels in the high resolution image. In addition, the NFOV driver 320 may capture several images of the eye in close time sequence and average these images to produce the image which is passed to the iris preprocessor 324. This averaged image has reduced noise compared to a single image and provides better feature definition for darkly pigmented irises. Alternatively, other techniques may be used for combining images such as taking the median or a mosaic process in which several images of marginal quality are combined to form an image of sufficient quality of the iris. This image is also passed to a NFOV/WFOV image tracking process 322. The driver 320 controls the imager 14 to provide NFOV images to the host processor at a rate of three to five per second. Again, the inventors recognize that a higher frame rate would be desirable.

The exemplary iris preprocessor 324 locates the boundaries of the iris and separates the portion of the image which corresponds to the iris from the rest of the image returned by the driver 120. This image is normalized to compensate for tilt introduced by the pan and tilt mirror 16, and to compensate for the person having a gaze direction which is not directly into the lens of the NFOV imager. This process is described below with reference to FIGS. 21 through 23.

When an image of a user wearing glasses is being acquired, it may be desirable for the user to look to one side. The desired angle of the user's head depends on the glass geometry of the glasses. There is a variability of the tilt of the glass surface more about a horizontal axis compared to any other. Therefore, viewing direction with regard to this factor is to the left or the right of the mirror/light source. A second factor is the nose which can occlude illumination. Therefore, the user should be guided to look to the left if the right eye is being imaged, and vice versa.

The separated iris image produced by the preprocessor 324 is passed to the internal database 318 and to an iris classification and comparison process 326. The classification and comparison process 326 receives image information on the person who is using the ATM from a customer database 328. The record in the database corresponding to the customer is identified from data on the ATM card that the person inserted into the card reader 134. Alternatively, it is contemplated that the card itself may be programmed with the customer's iris data. This data may be held in a conventional magnetic stripe on the back of the card or in read-only memory internal to the card if the ATM card is a conventional memory card or "smart" card. In this alternative embodiment, the customer database 328 may hold only the iris data retrieved from the ATM card. This implementation may need an additional data path (not shown) from the card reader 134 to the customer database 328. This path may be implemented via a direct connection or through the user interface process 334 and control process 310.

The image tracking process 322 receives successive NFOV images from the driver 320. Using these images, it correlates facial features from one image to the next and controls the pan and tilt mirror 16, through the driver 320, to keep the iris approximately in the center of the NFOV image. In addition, in the exemplary embodiment of the invention, the image provided by the driver 320 is 640 pixels by 480 pixels which is less than the 768 pixel by 494 pixel image provided by the imager 14. The driver 320 selectively crops the image returned by the imager 14 to center the iris in the image. Thus, the tracking circuit 322 controls the pan and tilt mirror 16 and indicates to the driver 320 which portion of the NFOV image is to be cropped in order to keep the user's iris centered in the images returned by the driver 320.

Image tracking based only on the NFOV image is necessarily limited. It can only track relatively small motions or larger motions only if they occur at relatively slow speeds. To augment the image tracking capability of the system, the tracking circuit 322 also receives feature location information from the WFOV image, as provided by the stereo module 316 to the internal database 318.

Figure 37:
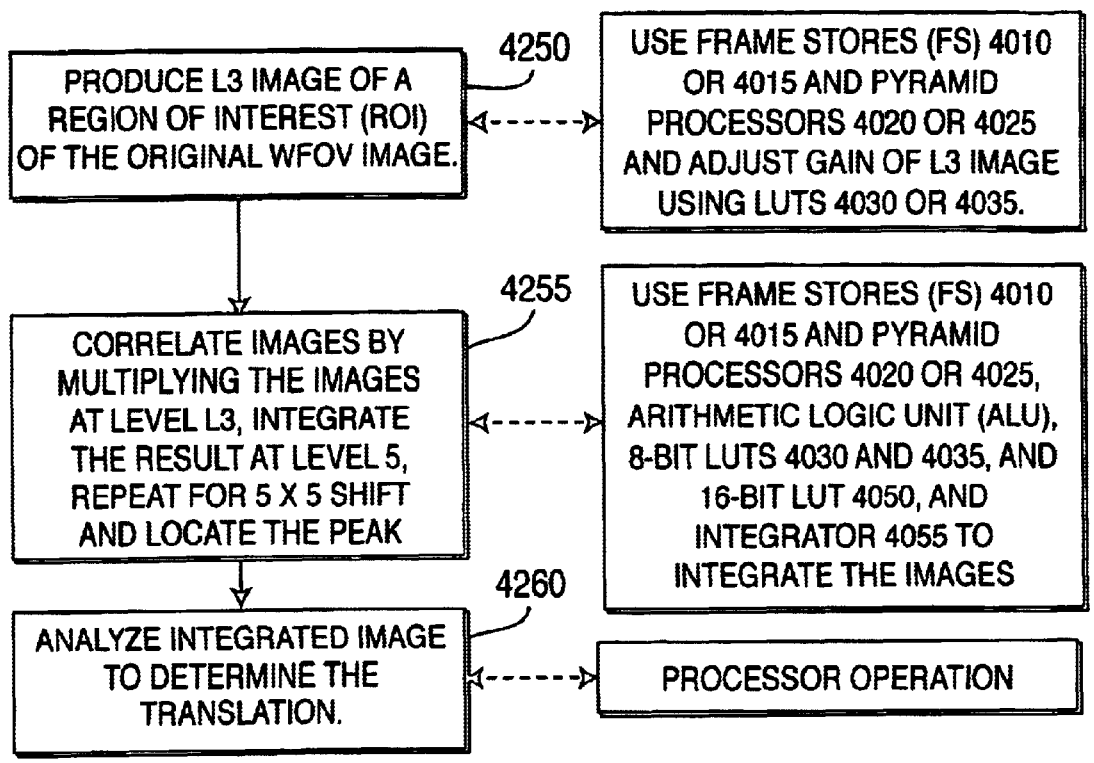
FIG. 37 is a flow chart that shows an exemplary method for tracking the user's head using the WFOV circuitry shown in FIG. 33.

Image tracking using WFOV images may be accomplished using a cross correlation technique. Briefly, after image of the head has been located in the WFOV image, it is copied and that copy is correlated to each successive WFOV image that is obtained. As the customer moves, the image of the head moves and the correlation tracks that motion. Further details of this and other image tracking methods are shown in FIG. 37 and disclosed in U.S. Pat. No. 5,063,603 entitled DYNAMIC METHOD FOR RECOGNIZING OBJECTS AND IMAGE PROCESSING SYSTEM THEREFOR, to Burt, which is hereby incorporated by reference for its teachings on image tracking.

In the exemplary embodiment of the invention, the WFOV imager 10, the NFOV imager 14 and the pan and tilt mirror 16 are calibrated by the control process 310 such that features in the WFOV image can be captured in a NFOV image without excessive scanning of the NFOV image in any of the three coordinate directions. This calibration is performed to program the look-up table as described below.

The iris classification and comparison process 326 compares the image to an iris image of the person obtained from the customer database. In the exemplary embodiment of the invention, two iris images, one for each eye, are held in the database for each customer. The process 326 compares the image returned by the preprocessor 324 to each of these stored images and notifies the control process 310 if a match has been found. In other applications of the iris recognition system, it may be desirable to match the obtained iris image to one of several images held in the customer database or in a similar database. For these uses, the process 326 may classify the iris image using a hash function and then compare the image to only those images which are in the same hash class.

Illumination of the scene being imaged is achieved by the light sources 331 and 321 responsive to the lighting control process 330. The control process 330 may, for example, switch a specified one of the light sources 124, 126, 128, 130 and 132 (collectively light source 331) and the light source 321 on or off and may also control the brightness of any of these light sources. The process 330 is coupled to the control process 310. In the exemplary embodiment of the invention, the process 310 provides the process 330 with specific commands to control the various light sources. It is contemplated, however, that the process 330 may be programmed with sequences of commands such that a single command from process 310 may cause the process 330 to execute a sequence of illumination operations. In addition, any of the light sources 124, 126, 128, 130, 132 and 321 may be augmented by an infrared light source (not separately shown) such as the TC8245IR Indoor IR Light manufactured by Burle Industries.

In addition, it is contemplated that any or all of the light sources may include a polarization filter and that the imagers 10, 12 and 14 may have a opposite-phase polarization filter. The inventors have determined that circular polarization is more desirable than linear polarization because linearly polarized light may create image artifacts in the iris. This type of polarization greatly reduces specular reflections in the image. These reflections may be, for example, from the customer's corrective lenses. This polarization may be controlled so that the imagers have the same polarization as the light sources when it is desirable to capture images having specular reflections.

Furthermore, it is contemplated that any of the light sources may be a colored light source. This is especially appropriate for the light sources 126 and 128 which are used to produce specular reflections on the customer's eyes.

The control process 310 is also coupled to the main control and user interface process 334, which controls customer interaction with the ATM via the card reader 134, keypad 112 and display 110. In addition, the ATM may include a touch screen 336 (not shown in FIG. 1*c*) through which the customer may indicate selections. The selections made using the touch screen 336, or keypad 112 may be routed to the control process 310 via the main control and user interface process 334. The control process may also communicate with the user via the display 110 through the process 334. In some of the exemplary embodiments of the invention, for example, it may be desirable to ask the user to stand at a certain minimum distance from the ATM or look at a particular location on the ATM in order to properly capture an image of his or her iris. Implementation of the communication functions between the control process 310 and the display 110 depend on the ATM to which the present iris recognition system is added. These functions could be readily implemented by a person skilled in the art of designing or programming ATMs.

Figure 4A:
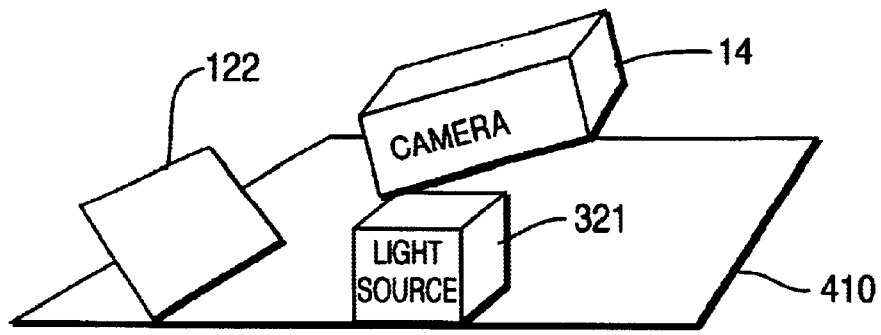
FIG. 4a is a perspective drawing and FIG. 4b is a side plan drawing which illustrate one configuration of the light source, NFOV imager and pan and tilt mirror for the apparatus shown in FIGS. 1 and 3.
Figure 4B:
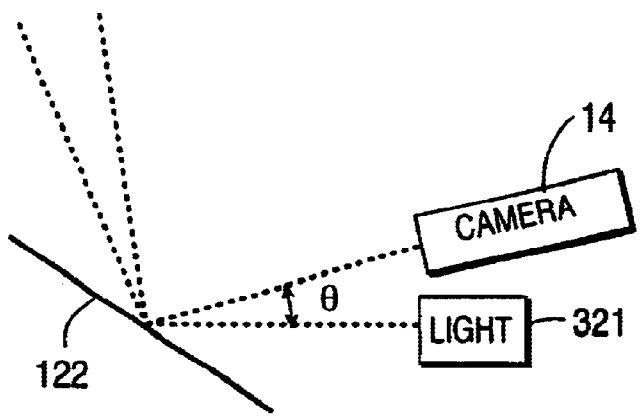
Figure 5A:
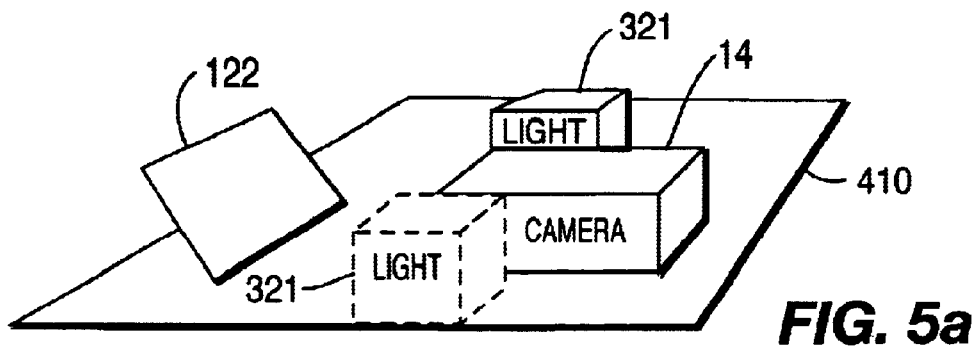
FIG. 5a is a perspective drawing and FIG. 5b is a side plan drawing which illustrate another configuration of the light source, NFOV imager and pan and tilt mirror for the apparatus shown in FIGS. 1c and 3.
Figure 5B:
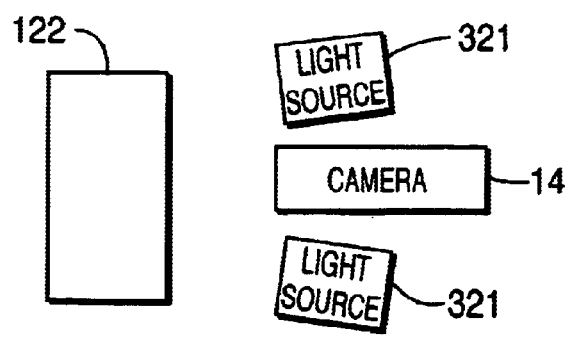

FIGS. 4*a* and 4*b* and FIGS. 5*a* and 5*b* illustrate two alternative physical configurations for the internal light source 321, pan and tilt mirror 16 and NFOV imager 14. In FIG. 4*a*, the light source 321 is located below the imager 14 to produce a light beam which is at an angle q from the optical axis of the imager. All of the elements are mounted on a platform 410, internal to the ATM. The angle q is selected to be as small as possible and yet produce minimal "red eye" effect. In the exemplary embodiment of the invention, the angle q is approximately 10 degrees. FIGS. 5*a* and 5*b* show an alternative configuration in which two light sources 321 are mounted adjacent to the imager 14 on the platform 410. In this implementation, the light sources are also mounted to produce light beams at an angle q from the optical axis of the imager.

Figure 5C:
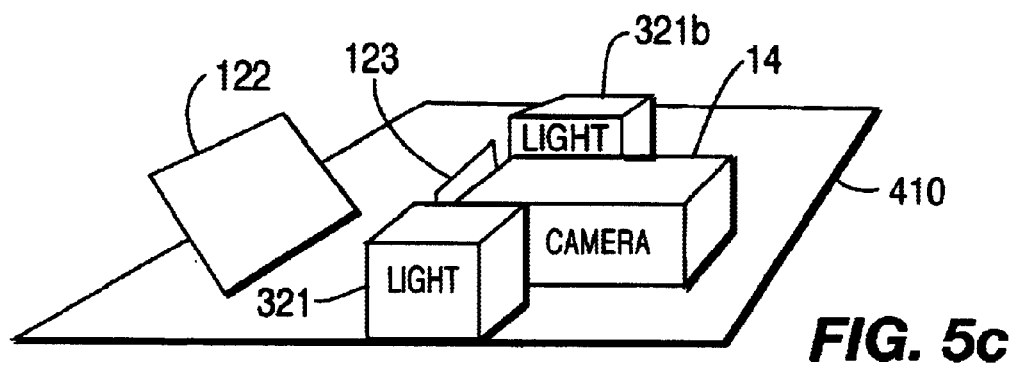
FIG. 5c is a perspective drawing that illustrates another configuration of the light source, NFOV imager and pan and tilt mirror for the apparatus shown in FIGS. 1c and 3.
Figure 5D:
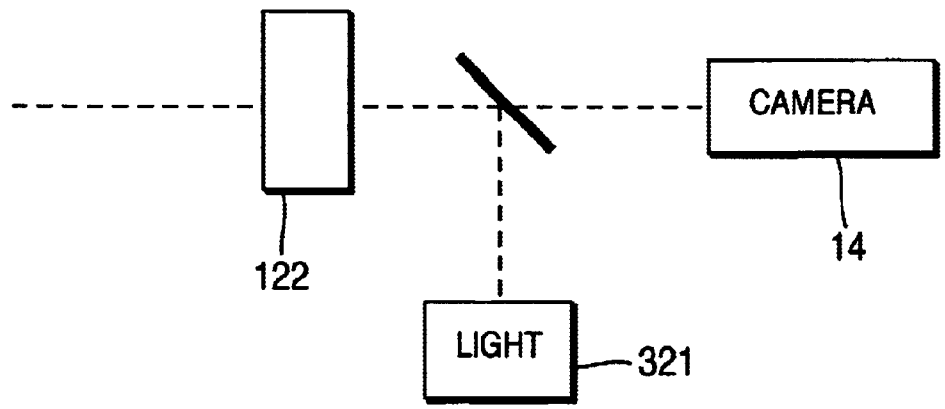
FIGS. 5d and 5e are perspective drawings that illustrate another configuration of the light source, NFOV imager and pan and tilt mirror for the apparatus shown in FIGS. 1c and 3.
Figure 5E:
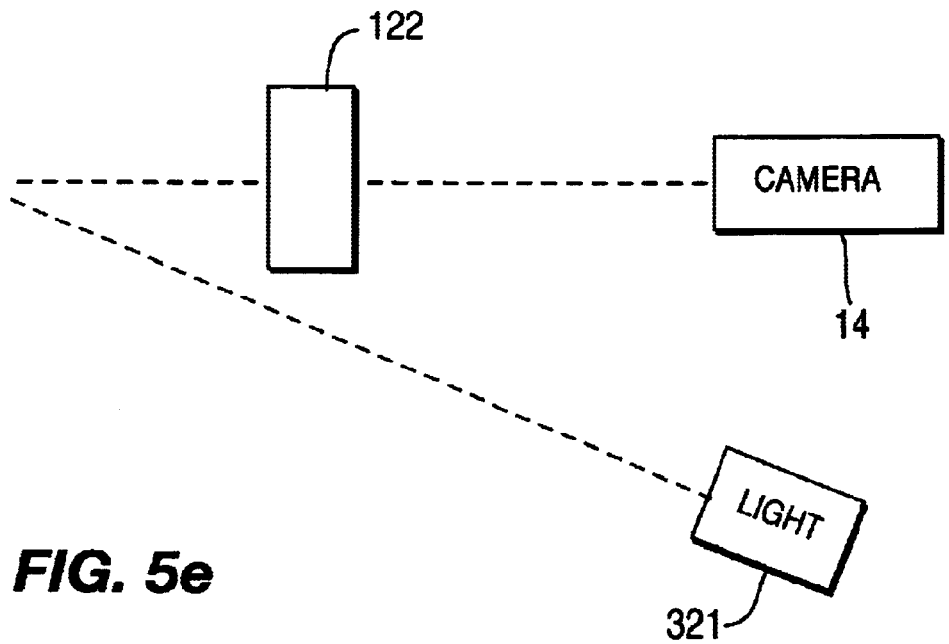

FIGS. 5*d* and 5*e* illustrate alternative arrangements of the light source and imager. As is shown in FIG. 5*d*, light source 321 provides on-axis illumination with imager 14 using a reflective mirror as is known in the art. FIG. 5*e* shows an embodiment were the light from the light source 321 does not pass through the pan-tilt mirror 122.

Another possible configuration of the light source 321 and the imager 14 is to direct the light from the source 321 to the mirror 16 through a half-silvered mirror (not shown) which is located along the optical axis of the imager 14. This configuration would direct the light along the optical axis of the imager 14. This method of illuminating the customer is used either with a relatively dim light source 321 so as to not produce significant "red eye" effect or in imaging operations in which the "red eye" effect can be tolerated. In this embodiment, if a light source generates illumination which is coaxial with NFOV imager light path, then the light generated by the light source can be steered using the same process as steering the light path for the NFOV imager. More efficient illumination such as reliable LED based illuminators can be used rather than powerful but unreliable incandescent lights which may be used if the whole scene is to be irradiated with, for example, IR light.

When IR is used for illumination, the IR cut off filter of imager 14 is removed. Imager 14 includes an IR cut off filter when IR light is not used by the system. When light sources 321 only generate IR light and visible light is not used, an IR pass filter 123 is positioned in front of the imager 14 as shown in FIG. 5*c*. If both visible light and IR light illumination are used, IR pass filter 123 is not placed in front of imager 14. Further, pan and tilt mirror 16 reflects IR light when IR light is used.

Ambient IR light can cause specular reflections and specular images reflected off the cornea which occlude or corrupt the image of the iris. Thus, it is desirable to remove the specular reflections and specular images caused by the IR light. The light source 321 will not change these specular images, but will increase the amount of light reflected off the iris. The ambient IR light is removed using the process shown in FIG. 29. At least one image is acquired using the NFOV imager 14 (shown in FIG. 1*c*) with the light source 321 turned off (shown in FIG. 1*c*) and one image is acquired using the NFOV imager 14 with the light source 321 turned on. The two acquired images are spatially aligned and compared using, for example, image subtraction. The resulting image is the result of light source 321. This assumes that light source 321 and ambient illumination together are within the dynamic range of the NFOV imager 14 so that the resulting image after the image comparison is within the range of the NFOV imager 14.

Figure 29:
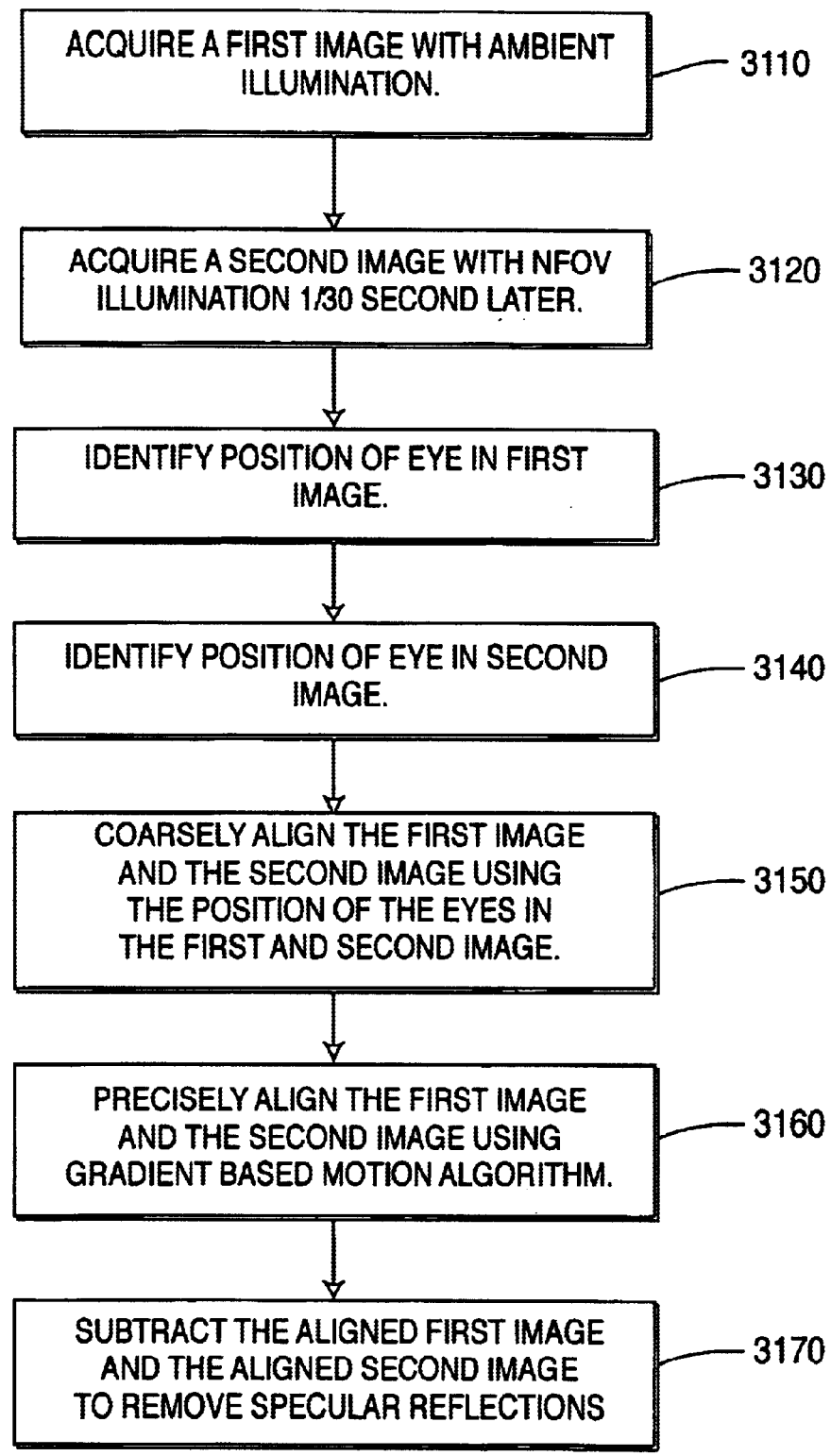
FIG. 29 is a flow chart which shows an exemplary method of removing ambient specular reflections from an image.

At step 3110, shown in FIG. 29, a first image is acquired using ambient illumination. At step 3120, a second image is acquired using NFOV illumination $\frac{1}{30}$ second later. At step 3130, the position of the eye is acquired from the first image using a spoke filter, described below with reference to FIGS. 21, 22a, and 22b, to identify the iris, such as that described with reference to FIG. 22a. At step 3140, the position of the eye in the second image is acquired using the same process as in step 3130. The two images are coarsely aligned using the identified positions of the eyes in each image. The first image and the second image are precisely aligned using a gradient based motion algorithm. An exemplary gradient based motion algorithm is described in J. R. Bergen, "Hierarchical Model-based Motion Estimation", Proceedings of European Conference on Computer Vision-92, pp. 1–21 (Mar. 23, 1992), which is herein incorporated by reference. At step 3170, the aligned first image and the aligned second image are subtracted to remove specular reflections from the image caused by the IR light.

Further, it may be desirable to illuminate with a combination of light sources including IR light. Existing ambient light—such as a surrounding light around an ATM, can be used as well as IR light. Two images could be encoded on enrollment—one in visible light and one in IR. For iris recognition, an iterative algorithm searches the first image for a poor iris match, finally iterating onto the iris code that corresponds to the best match for a ratio of IR to visible light. This means that it would not be necessary to know what proportion of light that is IR light and what proportion is visible light at the time the image is acquired. In this exemplary embodiment, stored values for irises may be stored for visible and IR illuminations. Then the desired proportion may be generated using a portion of the stored iris values for visible light and the stored iris values for IR light. Recognition is initiated at, for example, a 50 to 50 ratio of IR light to visible light. A rough iris match is found. Then the ratio is modified to make the match precise. For example, after the rough iris match is obtained, the ratio may be changed to 60/40 to determine if a better match is obtained. This process iterates until the best match is acquired.

Returning to FIGS. 3, 4a, 4b, 5a, and 5b, an exemplary placement of the light sources is to have the WFOV light source coaxial with the WFOV imager, another WFOV light source slightly off-axis from the same WFOV imager, a NFOV illuminator that is either a static panel beneath the mirror unit, or co-axial with the NFOV imager and the mirror. The two WFOV illuminators are turned off and on alternately. The alternated images will be very similar, except that red-eye will be very apparent in the coaxial image, and less apparent in the other image. An image alignment and subtraction (or simply subtraction) will yield the eye position. Polarized filters may also be used in the system to enhance the images acquired by the system to aid in locating and identifying the user's facial features in the images. A rotational polarized filter can also be used.

It is possible to have steered illumination that is not coaxial with the NFOV imager. In this exemplary embodiment there is a mixture of the static panel NFOV illuminators and a focused co-axial illumination. The light panel could then presumably be smaller and less powerful.

The NFOV imager 14 and WFOV imagers 10 may be used as stereo imagers. For example, a WFOV imager could locate the x, y position of the eyes. The depth would be unknown, but it is known that the user is within a certain range of depths. The NFOV imager could be pointed to the mid-point of this range and a WFOV image acquired. The mirror could then be rotated precisely by a known angle by the stepper motor and a second WFOV image could be acquired. The two WFOV images could then be aligned and then the location of the NFOV illumination beam that is visible in the WFOV images could be recovered. The displacement of the NFOV beam in the NFOV images can then be used to compute the depth of the user. This can then be used to drive the mirror 16 to the eye.

In either of the configurations shown in FIGS. 4a and 4b or in FIGS. 5a and 5b, the light is directed by the pan and tilt mirror 16 to the area in space which is being imaged by the NFOV imager 14. This illumination technique is desirable because it allows the heads and eyes of the persons being imaged to be uniformly illuminated regardless of their respective positions in the range which may be imaged by the NFOV imager 14. Once an approximate head position is known, this light source may be used to provide a known level of illumination to the head portions of the images captured by the WFOV imagers 10 and 12. This illumination scheme relies on the X, Y, Z coordinate map that exists between the pan and tilt mirror 16 and the WFOV imagers 10 and 12.

FIGS. 6 through 13 illustrate functions performed by the WFOV imager 10 and/or NFOV imager 14 when it is being used as a medium field of view imager, responsive to the zoom portion of the signal F/Z, shown in FIG. 3. This explanation is presented as an overview to the detailed description, presented below, of the various processes used to implement the automatic iris capture method.

Figure 6:
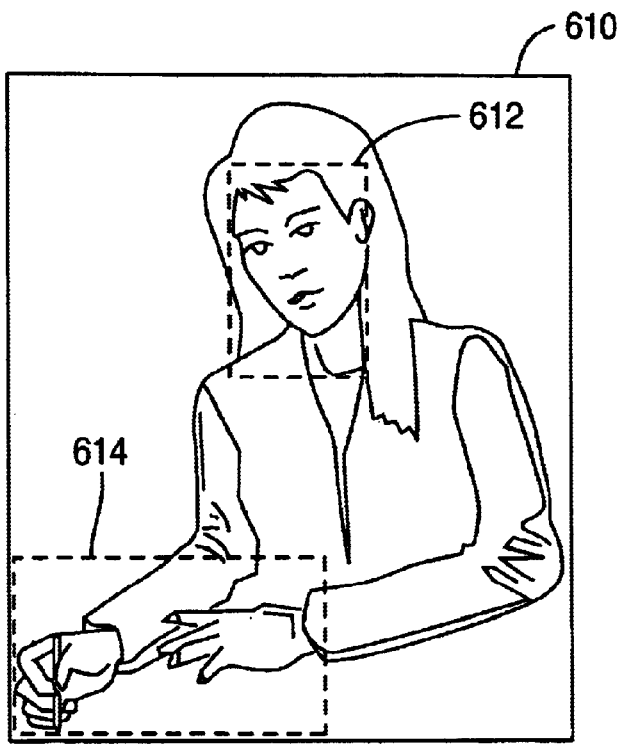
FIGS. 6, 7, 8 and 9 are perspective drawings of a person that are useful for describing the operation of the apparatus shown in FIGS. 1c and 3.

FIG. 6 represents an exemplary image 610 returned by the WFOV imager 10. In the exemplary embodiment of the invention, this image is a low resolution image of 160 horizontal pixels by 14 vertical pixels. The WFOV image may be captured after the system is alerted that a user is present because the user has inserted her ATM card into the card slot 134 of the ATM shown in FIG. 1c.

Alternatively, the system may be alerted by other means that a customer is approaching, such as by a conventional proximity detector (not shown) or by continually scanning the WFOV imager for head images. In this regard, it is contemplated that an iris scanning system according to the invention may identify the customer with sufficient accuracy to allow transactions to occur without using an ATM card or other identification card.

Returning to FIG. 6, the image 610 is examined to locate the head and eyes of the user. Several methods are presented below for locating the head in the image 610. One of these methods, which makes use of flesh tones in the image, is illustrated in FIG. 6. Using this method, the image 610 is scanned for image pixels that contain flesh tones. The image returned by the exemplary imager 10 includes a luminance component, Y, and two color difference components, U and V. Whether flesh tones exist at a particular pixel position can be determined by calculating a distance function (e.g. the vector magnitude in color space) between the U and V components of a trial pixel position and a predetermined pair of color component values, U0 and V0, which are defined to represent flesh tones. If the pixel is within a predetermined vector distance of the U0 and V0 values (e.g. if the vector magnitude is less than a threshold), then the pixel position is marked. After marking the image for flesh-tone pixels, the stereo module 316 (shown in FIG. 3) defines rectangular regions, 612 and 614 each of which includes at least some percentage, P, of flesh-tone pixels. The values of U0 and V0 vary with the imager 10 and light sources that are used. The percentage P in the exemplary embodiment of the invention is 60 but may need to be adjusted around this value for a particular implementation.

Figure 7:
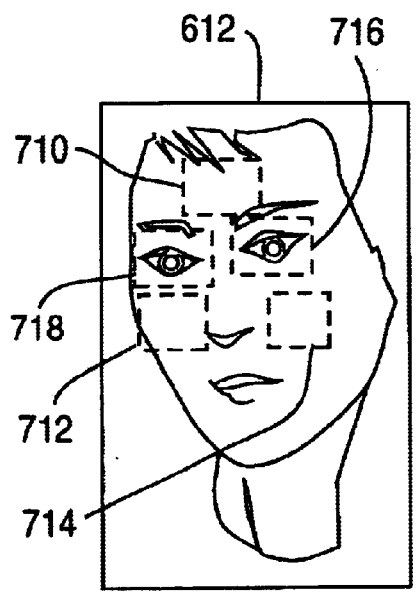

The regions 612 and 614 are then analyzed by the stereo module 316 to locate relatively bright and dark regions in the image. This is illustrated with reference to FIG. 6 and is described below with reference to FIGS. 15 and 17. Each region is assigned a possible type based on its relative brightness in the image; relatively dark regions surrounded by relatively bright regions may be defined as potential eyes, while a relatively bright region may be defined as a potential cheek or forehead. Other criteria may be established for recognizing nose and mouth regions. In FIG. 7, regions 710, 712 and 714 are classified as a potential forehead or cheek regions and regions 716 and 718 are classified as potential eye regions.

The classified regions are then passed to the stereo module 316, shown in FIG. 3. This process uses a symmetry algorithm, described below with reference to FIG. 18a, to determine if the classified regions are in relative positions that are appropriate for a face. In the segment 612, for example, a potential forehead region, 710 is above the two potential eye regions, 716 and 718 which, in turn, are above potential cheek regions 712 and 714. In addition, the two potential eye regions 716 and 718 are roughly horizontal. Thus, the segment 612 of the WFOV image 610 is recognized as corresponding to a face. An alternative process of locating the user's head and eyes is described below with reference to FIGS. 18b through 18i.

After the target eye locations have been identified by the stereo module 316, the WFOV image may be monitored for several seconds while the NFOV image is being captured and processed. The WFOV image is monitored for motion tracking, as described above, and to check for a change in the image at the identified eye position which corresponds to a blinking motion. It is contemplated that a positive recognition may not be allowed to occur until a blinking motion has been detected. This extra step provides a further check that the target locations are eye locations and ensures that the face being imaged is not a photograph.

If multiple facial images are recognized in the WFOV image, the image which is closest, as determined by either the stereoscopic techniques or by the sonic rangefinder 332, is selected as the image to be searched. Alternatively, the closest user in the WFOV images may be identified first, as described below with reference to FIGS. 24 and 24a, prior to localizing the user's face. If one or more facial images is equally close to the WFOV imager 10 then the facial image which is closer to the center of the image is selected.

Once a facial image has been selected, the X, Y coordinates of its eyes are passed to the internal database 318 by the stereo module 316. In addition, the stereo module 316 sends a signal to the control process 310 indicating that an eye location has been determined. If distance (Z coordinate information) is known, either from the stereoscopic analysis of the images or from the sonic rangefinder 332, it is combined with the X, Y information in the internal database by the process 310.

In response to the signal from stereo module 316, the process 310 signals the NFOV imager 14 to obtain images of the eyes using the stored X, Y coordinate positions. The NFOV imager 14 used in the exemplary embodiment of the invention captures two images of the eye, a relatively low resolution image (e.g. 160 by 120 pixels) which may be used by the NFOV/medium field of view tracking process 322 to locate the eye and to focus the NFOV imager 14, as described below with reference to FIG. 16b. The imager 14 also obtains a high-resolution image (e.g. 640 by 480 pixels) which is processed by the iris preprocessor 324 to separate the iris portion of the image for processing by the iris classification and comparison process 326. The steps performed by the processes 322 and 326 are illustrated in FIGS. 8 through 12.

Although all of the steps outlined above are disclosed as being performed using the WFOV imager, it is contemplated that the steps of capturing the image segment 612 and the processing steps described with reference to FIG. 7 may be implemented using the NFOV imager 14, operating as a medium field of view imager under control of the signal F/Z.

Figure 8:
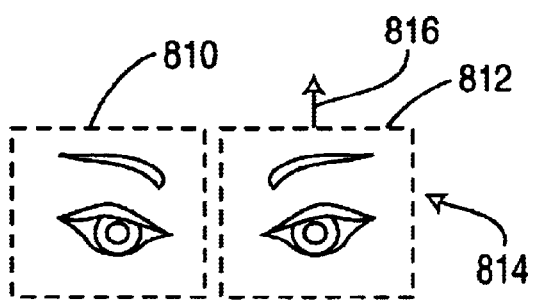
Figure 9:
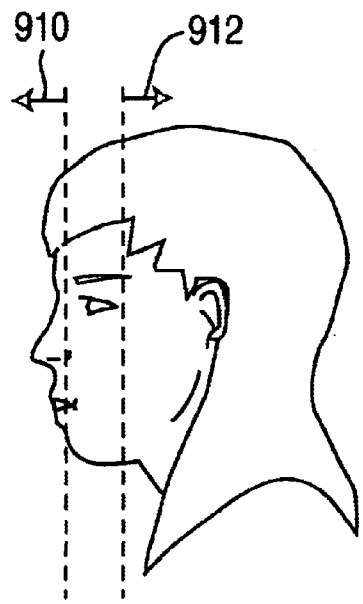

FIG. 8 shows two eye images, 810 and 812, obtained by the NFOV imager 14 in response to the eye location information provided by the stereo module 316 (shown in FIG. 3). Even though the WFOV imager 10 and NFOV imager 14 are calibrated in the X, Y, Z coordinate space, the NFOV imager may not find the user's eye at the designated position. This may occur, for example, if the user moves between when the WFOV and NFOV images are captured or if the Z coordinate information is approximate because it is derived from the sonic rangefinder 332. In these instances, the tracking process 322 may scan the NFOV imager in the X or Y coordinate directions, as indicated by the arrows 814 and 816 in FIG. 8, or change its focus to scan the image in the Z coordinate direction, as shown by the arrows 910 and 912 of FIG. 9. An exemplary tracking process is described below with reference to FIG. 37.

Figure 11:
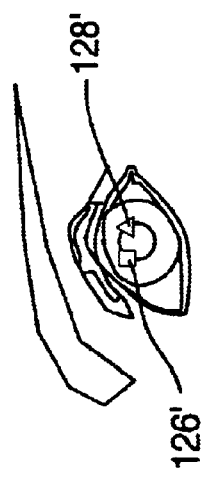
FIGS. 10, 11, 12 and 13 are drawings representing a human eye that are useful for describing the operation of the apparatus shown in FIGS. 1c and 3.
Figure 10:
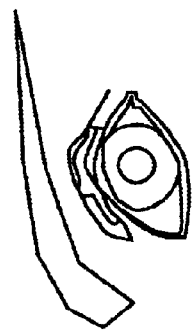

The eye may be found in the NFOV image by searching for a specular reflection pattern of, for example, the light sources 126 and 128, as shown in FIG. 11. Alternatively, a circle finder algorithm, such as that described below with reference to FIG. 19 may be executed. In another alternative embodiment, an autofocus algorithm, described below with reference to FIG. 21, which is specially adapted to search for sharp circular edges or sharp textures may be implemented in the tracking process 322 to focus the low-resolution image onto the user's eye.

In an alternative embodiment, the position of the user's eye ZEYE could be modeled using the equation below.

$$ZEYE = q + V$$

q represents the true coordinates of the user's eye and V is a vector of additive noise. If multiple measurements of the location of the user's eye were available over time, the statistical description of V could be used to construct a recursive estimator such as a Kalman filter to track the eye. Alternatively, a minimax confidence set estimation based on statistical decision theory could be used.

Once the user's eye has been located by the NFOV imager, the resolution of the image returned by the imager is changed to 640 pixels by 480 pixels to obtain a high-quality image of the eye. This high-quality image is provided to the iris preprocessor 324, shown in FIG. 3. The first step performed by the preprocessor 324 is to rotate the entire image by a predefined amount to compensate for rotational distortion introduced by the pan and tilt mirror 16. In the next step, the specular reflections of the light sources, for example the light sources 126 and 128 are located in the image.

These specular reflections are used to determine the direction in which the user is gazing. If the specular reflections are close to the pupil area, then the user is looking straight at the NFOV imager 14 and the iris will be generally circular. If, however, the specular reflections are displaced from the pupil region then the user is not looking at the imager 14 and the recovered iris may be elliptical in shape. In this instance, an affine transformation operation may need to be applied to the iris to convert the elliptical image into a roughly circular image. The type of operation that is to be applied to the recovered iris may be determined from the relative positions of the specular reflections and the edge of the iris in the image. It is contemplated that a similar correction may be made by analyzing the circularity of the image of the iris. Any recognized non-circular iris may be warped into a corresponding circular iris. Alternatively, the computation for the warping of image may be computed from the expected gaze direction of the user and the recovered X, Y, and Z position of the user's eye.

Figure 12:
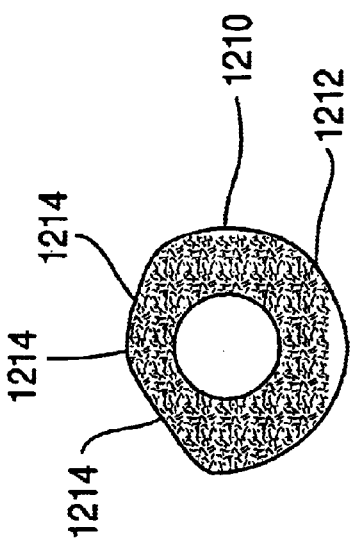

Before the gaze direction can be determined, however, the iris preprocessor 324 locates the pupil boundary 1210 and the limbic boundary 1212 of the iris, as shown in FIG. 12. These boundaries are located using a circle finding algorithm, such as that described below with reference to FIG. 19. Once the pupil boundary has been located, the image can be corrected to normalize the gaze direction of the user.

The next step in the process is to find horizontal and near-horizontal edges in the image. These edges, indicated by the reference number 1214 in FIG. 12, correspond to the user's eyelid. When the pupil boundary, the limbic boundary and the eyelid boundary have been determined by the preprocessor 324, the portion of the image that is contained within these boundaries (i.e. the iris) is extracted from the NFOV image and is passed to the iris classification and comparison process 326. This step is not needed when the process 326 uses the iris comparison method taught by the above referenced patents to Flom et al. and Daugman. It may be desirable, however, if an iris recognition system based on subband spatial filtering of the iris is used.

In the exemplary embodiment of the invention, the process 326 compares the iris as found by the preprocessor 324 to the irises stored in the customer database 328. If a match is found, the control process 310 is notified and the process 310 notifies the main control and user interface process 339.

Figure 13:
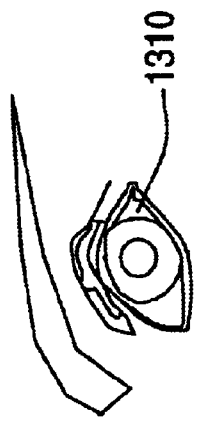

FIG. 13 illustrates an alternate method of locating the user's eye using the "red eye" effect. This effect is caused by reflection of a light beam from the retina of the user when the light beam is close to the optical axis of the imager. When the customer's pupils are dilated, this effect is especially pronounced and appears as a reddish glow 1310 for a color image or a bright area for black and white image emanating from the pupils. In an alternative embodiment of the invention, this effect may be used to quickly locate the user's eyes in the WFOV image. In this alternative embodiment, the light sources in the ATM provide a relatively low level of illumination. When the user places her card in the card reader 134, the close light source 124 is flashed while a WFOV image is captured. This image is scanned for the reddish color or a bright region characteristic of the "red eye" effect. If the color is detected, its location is passed to the stereo module 316 to determine if the relative brightness, location and size of the identified color areas is consistent with a retinal reflection from two eyes. If the stereo module 316 finds this correlation, then the eye positions have been found and they are passed to the internal database 318.

Although not shown in the Figures, it is contemplated that the specular reflection of the light sources 128 and 126, as shown in FIG. 11 could be used in the same way as the "red eye" effect in order to locate the eyes directly in the WFOV image, without first locating the head. In this alternative embodiment, the entire image is scanned for bright spots in the image representing the specular reflection from the light sources. After the reflections are located, their relative brightness, relative position and position in the WFOV image are tested to determine if they are consistent with expected values for a user's eyes.

Figure 14:
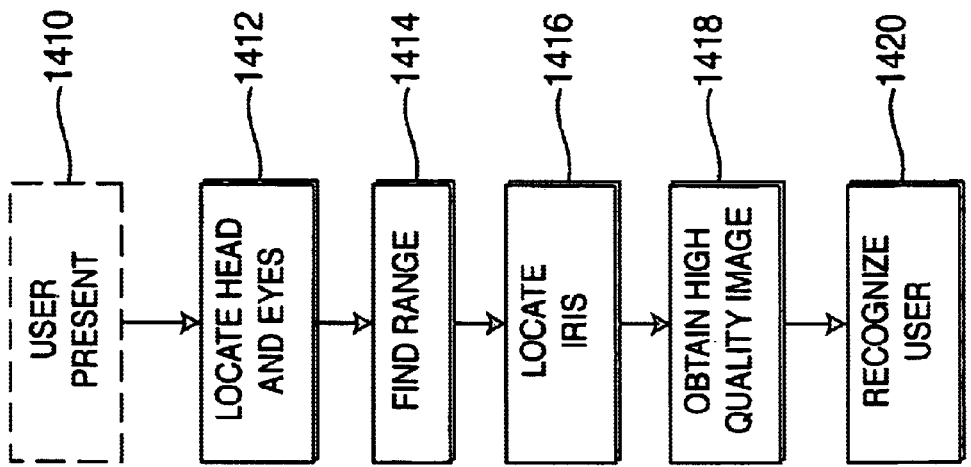
FIG. 14 is a flow chart which illustrates the high-level control flow for the control processor shown in FIG. 3.

FIG. 14 is a flow chart which shows, at a very high level, exemplary steps performed by the control process 310. The control process is initiated at step 1410 when the customer inserts her card into the card slot 134 of the ATM machine shown in FIG. 1c or, as described above, when a possible customer is detected approaching the ATM. Next, step 1412 is executed to capture an image of the user's head and eyes. Details of an exemplary implementation of this step are described below with reference to FIGS. 15 through 18a. As described below with reference to FIG. 15, this step may be abbreviated by directly locating the eyes in the WFOV image using either the "red eye" effect or by directly detecting specular reflections, as described above.

Once the eyes have been located, the control process 310, at step 1414, finds the distance between the eyes and the wide-field of view imagers 10 and 12. As set forth below, this step may not be needed if step 1412 utilized a range map to find the portion of the image corresponding to the customer's head. If range information is not available, it may be calculated at step 1412 using the two WFOV imagers 10 and 12 as described below with reference to FIG. 19. If a single imager is used to generate two photometric stereo images a similar technique may be used. If only a single WFOV imager and a single light source are used, range information may be derived from the sonic rangefinder 332, as described above. Alternatively, the range information may be derived in the process of capturing the NFOV image by using either a conventional autofocus algorithm or an algorithm, such as that described below with reference to FIG. 20, that is designed to focus on edges and features that are characteristically found in a human eye.

The inventors also contemplate a method by which the range information may be obtained at the same time that the head is located in the image. By this method, two stereoscopic images of the customer, captured by imagers 10 and 12 are analyzed to produce a depth map of the entire field of view of the two imagers. This depth map is then analyzed to identify a head as being close to the ATM and being at the top of an object which is in the foreground. Using this method, range information for each point in the image is determined before head recognition begins. Thus, once the head is found in the WFOV images, its distance from the ATM is known.

The next steps in the process 310 locates the iris (step 1416), using the focused NFOV image and then extract a high-quality image (step 1418) for use by the iris classification and comparison process 326, shown in FIG. 3. These steps are described below with reference to FIGS. 21, 22 and 23. The final step in the process, step 1420, recognizes the customer by comparing her scanned iris pattern to the patterns stored in the customer database 328.

Figure 15:
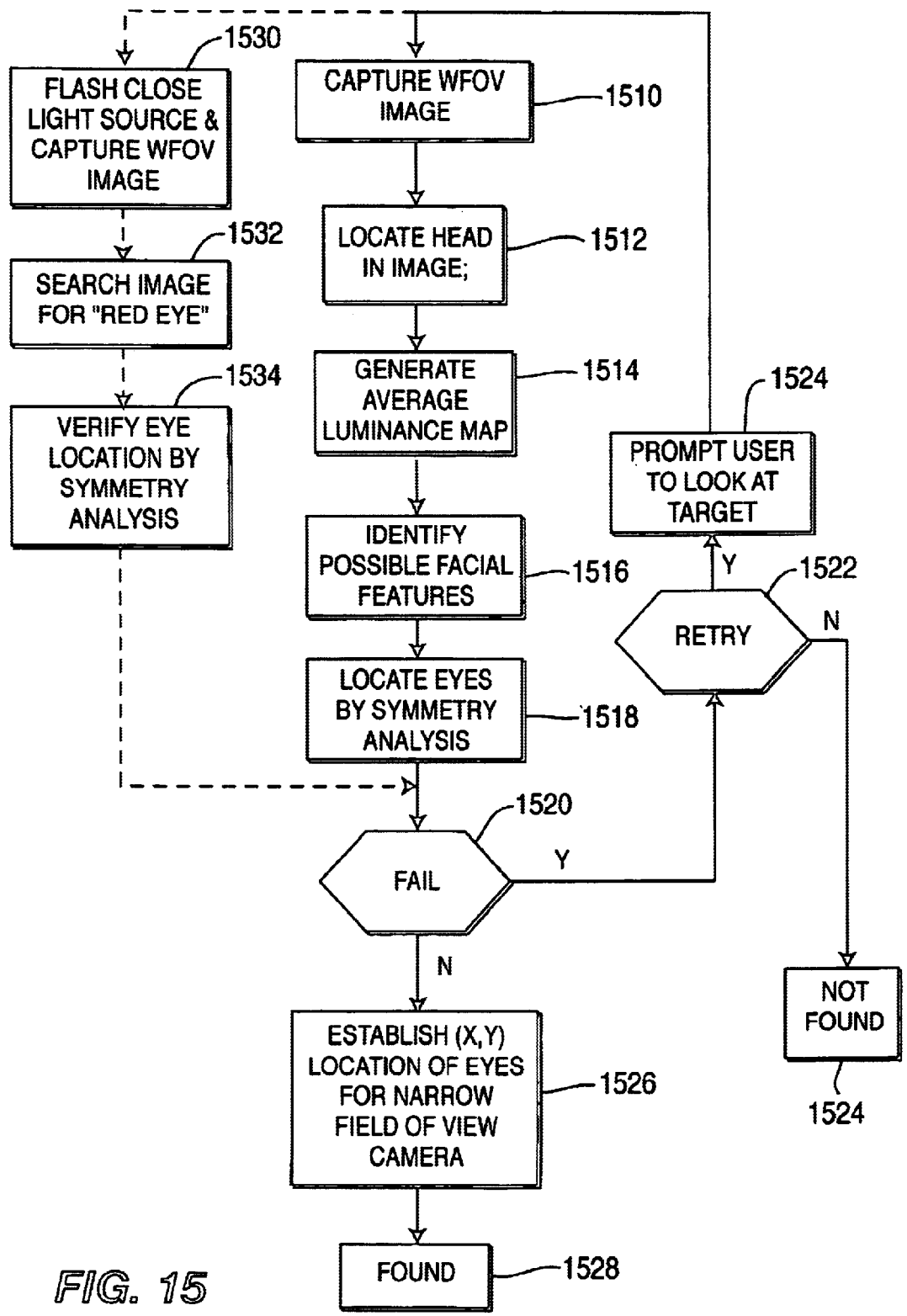
FIG. 15 is a flow chart which illustrates an exemplary process that details the process step in FIG. 14 which locates the head and eyes of the individual.

FIG. 15 is a flow chart which illustrates details of an exemplary process that implements the Locate Head and Eyes step 1412 of FIG. 14. The first step in this process, step 1510, is to capture the WFOV image using imager 10. The next step, 1512, is to locate the user's head in the image. The purpose of this step is to reduce the size of the image that needs to be processed to locate the eyes. This step is performed as outlined below with reference to FIG. 16.

Once extraneous material in the image surrounding the user's head has been removed, the process of locating the user's eyes begins at step 1514 of FIG. 15. In this step, the process shown in FIG. 15 generates an average luminance map of that part of the image which has been identified as the user's head. This may be done, for example, by averaging each pixel value with the pixels that surround it in a block of three by three pixels to generate an average luminance value for each pixel. This averaged image may then be decimated, for example by 4:1 or 9:1. Once the luminance map has been generated, the next step, step 1516, analyzes this map to identify possible facial features. Details of an exemplary process used by step 1516 are described below with reference to FIG. 17. Once the possible facial features have been identified, the next step, 1518, uses symmetry analysis, in a manner described below with reference to FIG. 18*a*, to determine which of the features that were identified as possible eyes are most likely to be the eyes of the user.

If, at step 1520, none of the "possible eye" facial features are identified as being the actual eyes, step 1522 is executed to determine if the process of locating the head and eyes should be retried with a new WFOV image. If so, the control process 310 may prompt the user, at step 1524 via a message on the display 110, to look at a target which will place her eyes in a better position to be imaged. After step 1524, the process repeats with step 1510, described above. The step 1522 may not allow unlimited retries. If for example, a retry limit has been exceeded, step 1522 may pass control to step 1524 which notifies the step 1412 of FIG. 14 that the system was unable to locate the user's eyes. In this instance, the control process 310 may abort, allowing the user to access the ATM without verifying her identity or the process may attempt to locate the user's eyes by a different method, such as that illustrated by the steps 1530, 1532 and 1534 of FIG. 15.

At step 1530, the control process 310 causes the lighting controls 330 to flash the close light source 124 while concurrently causing the WFOV driver 312 to capture a WFOV image. Next, step 1532 scans the WFOV image for color components and associated luminance components which correspond to the retinal reflections that cause the "red eye" effect. Step 1534 verifies that these are appropriate eye locations using a process (not shown) which determines if the size and relative position of the potential eye locations are appropriate and if their position in the image is consistent with that of a person using the ATM. Although steps 1530, 1532 and 1534 are shown in the context of a detector for the "red eye" effect, it is contemplated that similar steps may be used with a system that directly locates eyes in an image using specular reflection. In the modified algorithm, the shaped light sources 126 and 128 are turned on while the WFOV image is captured. The search step 1532 then searches for specular reflections in the image and compares the located reflections with the shapes and relative positions of the light sources 126 and 128. Step 1534 of the modified algorithm is essentially the same as for the "red eye" detector. It is also contemplated that the light sources 126 and 128 do not have to be shaped and that the specular reflections may be detected based on the amount of energy produced in the image at the positions of specular reflections in the image.

As another alternative to using the shaped light sources 126 and 128, it is contemplated that one or more unshaped flashing light sources could be used to detect specularities in the WFOV image. Using this alternative scheme, sequentially captured images would be compared and only those specular reflections showing the same temporal light/dark pattern as the flashing light sources would be identified as potential eyes.

Whenever relatively bright light sources or flashing light sources are used in the exemplary embodiment of the invention, it is contemplated that the light sources may be infrared light sources to minimize the discomfort to the customer. Alternatively, if flashing visible light sources are to be used, it is contemplated that the flash rate may be set relatively high, for example, 60 flashes per second, and the appropriate imager may be synchronized with this flash rate to obtain images both when the light is turned on and when it is turned off.

While the detection of specular reflections and the "red eye" effect have been described as alternatives, it is contemplated that they may be combined with each other and with the location scheme described above with reference to steps 1510 through 1518. One way in which these methods may be combined is to replace steps 1514 through 1518 with steps 1532 and 1534, thus scanning only parts of the image which have been identified as corresponding to the user's head for the "red eye" effect or for specular reflections.

Whichever method is used to locate the eyes, if at step 1520 it is determined that a good candidate eye location has been found, step 1526 is executed to establish X, Y coordinate locations for the eyes in the WFOV image. These coordinates can then be converted into coordinates for the NFOV imager 14 using the coordinate map that was generated during the calibration process, described above. At step 1528, the locate head and eyes process terminates.

Figure 24:
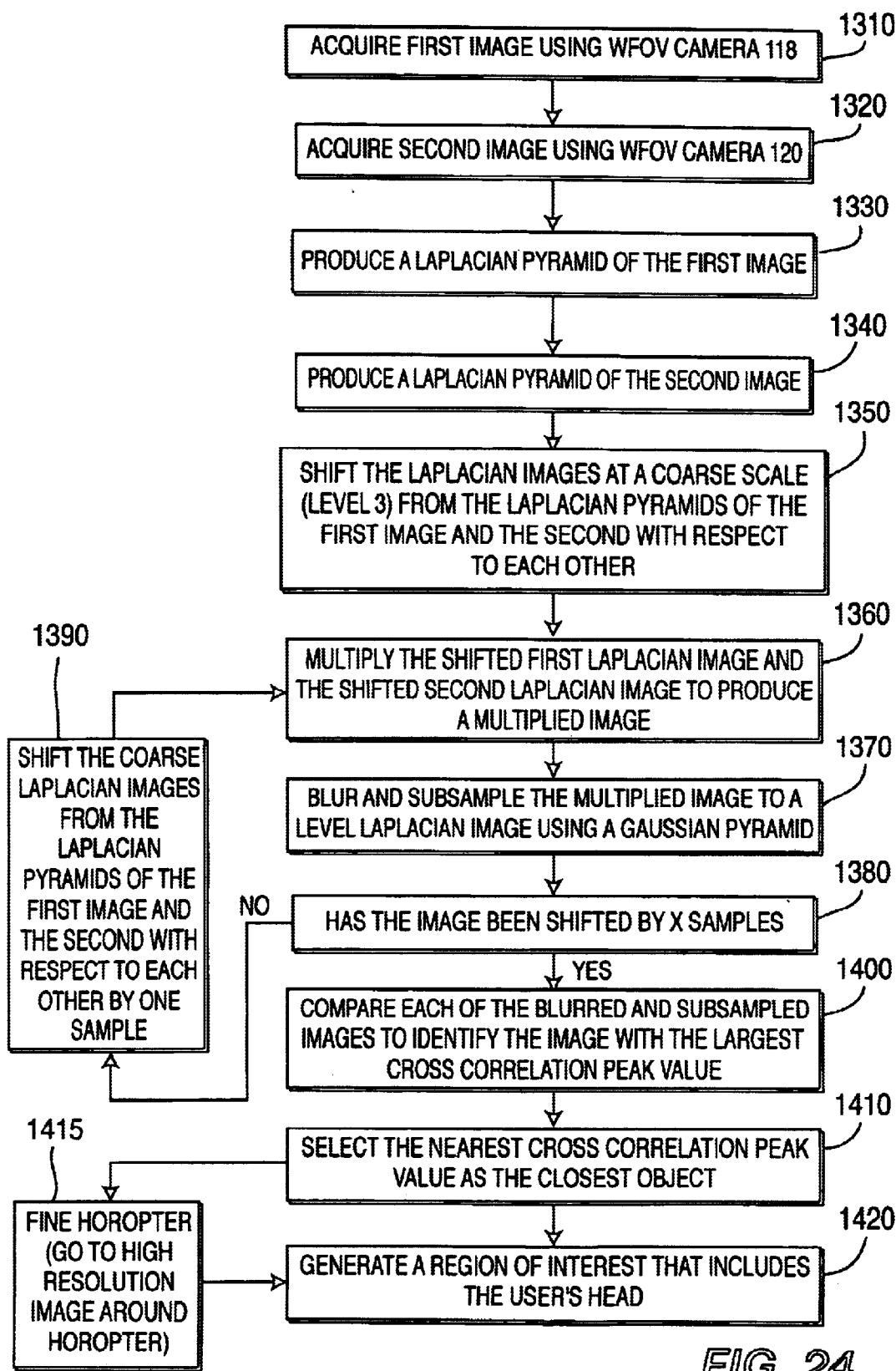
FIGS. 24 and 24b are flow chart which shows an exemplary method for locating the person who is to be identified using iris recognition and determining the distance that person is from the acquisition system.

The process demonstrated by the flow chart shown in FIG. 15 may augmented with a process shown in FIG. 24 to locate a person who is to be identified using iris recognition from a number of people in, for example, a line and determine the distance that person is from the system for adjustment of the NFOV imager.

The location of a person with respect to, for example, an ATM machine is located using the WFOV imagers 10 and 12. The process shown in FIG. 24 separates people in line at the ATM and finds the distance of the next person from the ATM machine in order to focus the lens of the NFOV imager 14. Stereo imaging is used to recover the depth and perform head finding. First, a horopter in located in the image by locating the nearest peak in a correlation surface. Alternatively, multiple horopters could be found to reduce false detections caused by backgrounds that produce a large number of false detections. By locating the nearest peak, the closest person in front of the ATM is selected even if there is a larger person standing behind the next person in line.

The process shown in FIG. 24 has two major functions: (1) to find the distance of the user's eye from the system and (2) to extract a region of interest (ROI) of the WFOV images containing the user's head. This region of interest (ROI) is used for eye-finding. The WFOV head-finding process has three major steps. The first step is to find a suitable horopter in the WFOV image, the second step is to compute a disparity map, and the third step is to locate the user's head.

Producing a disparity map using the WFOV images may be computationally intensive. In order to minimize the amount of search that must be performed, the inventors have determined that it is useful to know the approximate overall disparity of the object which is being mapped. By finding the approximate disparity of the user's face region, the search may be limited for correspondences to a small region around the horopter. Using pyramid processing, the horopter is found at low resolution, while the reduced-search disparity map is constructed at a higher resolution.

Potential horopters correspond to sufficiently large regions in which all pixels share similar disparities. As opposed to an image alignment approach which selects the horopters corresponding to the largest such region, in the exemplary embodiment, a horopter is selected that corresponds to the region of greatest disparity. In other words, the horopter of the closest object to the WFOV imager 10 and 12 (shown in FIG. 1*c*) is selected. This horopter generally corresponds to the current user's head. By reducing the disparity-map computation to disparities close to this horopter, the current user is separated from the queue of people waiting behind the user. This process works even if the current user occupies far less image area than someone else in the queue.

Based on the disparity associated with the horopter, a disparity map is produced at higher resolution. From the map, it may be determined which pixels in the image correspond to points at approximately the depth of the horopter. This is precursor to the head-finding step which segments these pixels. The disparity search region consists of small disparities around the nominal disparity shift corresponding to the horopter. In this way, the process accommodates large users for whom the horopter may correspond to some plane through the torso (a few inches in front of the face) rather than through the face. By keeping the search region small, the process effectively separates the user from the background.

The head-finding step accepts the disparity map as input and searches within the disparity map for a region with head-like properties. The corresponding region in image coordinate is passed to a template eye finding process described below with reference to FIGS. 18a through 18c.

The process of locating an individual shown in FIG. 24 begins at step 1310, WFOV imager 12 acquires a first image and, at step 1320, WFOV imager 14 acquires a second image. At steps 1330 and 1340, Laplacian pyramids of the first and second image are respectively produced. At step 1350, coarse Laplacian images of the first image and the second image are shifted with respect to each other by a nominal amount to ensure that the horopter search region corresponds to a 3D volume in which the user's head is expected. The images are bandpass filtered. At step 1360, the shifted first Laplacian image and the shifted second Laplacian image are multiplied to produce a multiplied image. At step 1370, the multiplied images are blurred and subsampled at a level five Laplacian image using a Gaussian pyramid. At step 1380, it is determined if the coarse Laplacian images have been shifted by X samples. X is ten to fifteen samples. For example, the images are shifted in the x direction in one pixel increments from −7 pixels through +7 pixels. For each shift, a product image is formed at step 1360. The result is a set of fifteen product images, each 80 pixels by 60 pixels.

If the coarse Laplacian images have not been shifted by X samples, than, at step 1390, the coarse Laplacian images of the first image and the second image are shifted with respect to each other by another sample. Step 1360 is repeated. Otherwise, at step 1400, all of the blurred and subsampled images are compared to identify the image with the greatest cross correlation peak. Sums of the pixels in each product image is produced yielding a 15-point 1D sampled correlation function. The sampled function is used to determine the nearest peak having a disparity corresponding to the desired horopter.

A "peak" is a sample point whose value is greater than its two neighbors. The peak should also satisfy the added constraint that the value at the peak is at least 25% greater than the mean value of the correlation function. This threshold is determined heuristically to eliminate peaks of small curvature that are results of noise on the correlation function. Once the appropriate peak has been located, the symmetric triangle interpolation method is used to determine the disparity of the horopter to the sub-pixel level equation (2) below.

$$\text{disparity of horopter} = -7 + i + \frac{f_{i+1} - f_{i-1}}{2(f_i - \min(f_{i+1}, f_{i+1}))} \quad (2)$$

i is the index of the peak in the range of, for example, zero through fourteen, and $f_i$ denotes the ith value of the sampled correlation function. The inventors have found that the symmetric triangle approach is superior to several other interpolation approaches such as quadratic splines in cases where the sampling rate of the correlation function is near critical.

The disparity of the horopter is refined to a Gaussian level 2 resolution: A coarse Gaussian level 3 disparity value is used as a nominal shift of one of the WFOV images to the other WFOV image. Product images are constructed by performing shifts of −1, 0, and 1 pixels at level 2 in both the x and y directions. The centroid of the resultant 9-point sampled correlation surface is used as the level 2 horopter disparity.

At step 1410, the greatest cross correlation peak is selected as the closest object. The result at each shift value is a cross-correlation value that indicates the similarity of the features of the images at a particular shift. Therefore, if the person is at a distance that results in a disparity of 12 pixels at Level 0, then the cross-correlation will yield a peak at $12/(2^2)=3$ pixels at Level 2. A sub-pixel interpolator allows sub-pixel disparities to be estimated. If a second user is at a further distance resulting in a disparity of 6 pixels at Level 0, then the cross-correlation will yield a peak at $6/(2^2)=1.5$ pixels at Level 2. If both users are present, then the system locates the peak corresponding to the nearest object which is the person having a cross correlation of 3.

Next, at step 1415, a higher resolution image is selected around the horopter. Finally, at step 1420, the selected cross correlation maintained to be used to access data in a look-up table and a region of interest containing the user's head is extracted from the WFOV images. Alternatively, the selected cross correlation is converted to a depth value. Once the disparity of the horopter through the user's face has been determined, the approximate distance z of the user's face from the WFOV imagers 10 and 12 may be produced using the equation below for nominally unveraed imagers.

$$\text{disparity} = \frac{a}{z} + b$$

a and b are constants and z is the distance between the user and the imagers.

The region of interest containing the user's head is determined by performing stereoscopic analysis on the WFOV images. Points in the image that exhibit disparities close to that of the horopter are identified to produce a disparity map. The region of the image that is examined to locate the disparities is limited to plus or minus four pixels at level 2 of a Gaussian pyramid with respect to the horopter. Each pixel shift, one pixel on either side of the horopter corresponds to approximately 1 inch of depth. The disparity map computation comprises two steps: (1) correlation and (2) flow estimation.

Correlation is performed in single pixel shifts at level 2 of the Gaussian pyramid. This yields nine product images, each 160 pixels by 120 pixels. Correlation surfaces are computed by integrating over 8 pixel by 8 pixel windows around each pixel. For example, this is performed by computing a Gaussian pyramid of the product images, down to level 5 double-density. This is accomplished by oversampling the resulting image. For example, if the resulting image produced is a 40×30×9 correlation surface, it is oversampled to produce a 80×60×9 surface.

Next, flow estimation is performed by finding the greatest peak in each 9-point sampled correlation function. In addition, a confidence value associated with the peak is produced based on the difference between the peak value and the next-highest non-neighboring value. The symmetric triangle method described above is used to interpolate the disparity to sub-pixel accuracy for peaks above the confidence value.

Figure 24A:
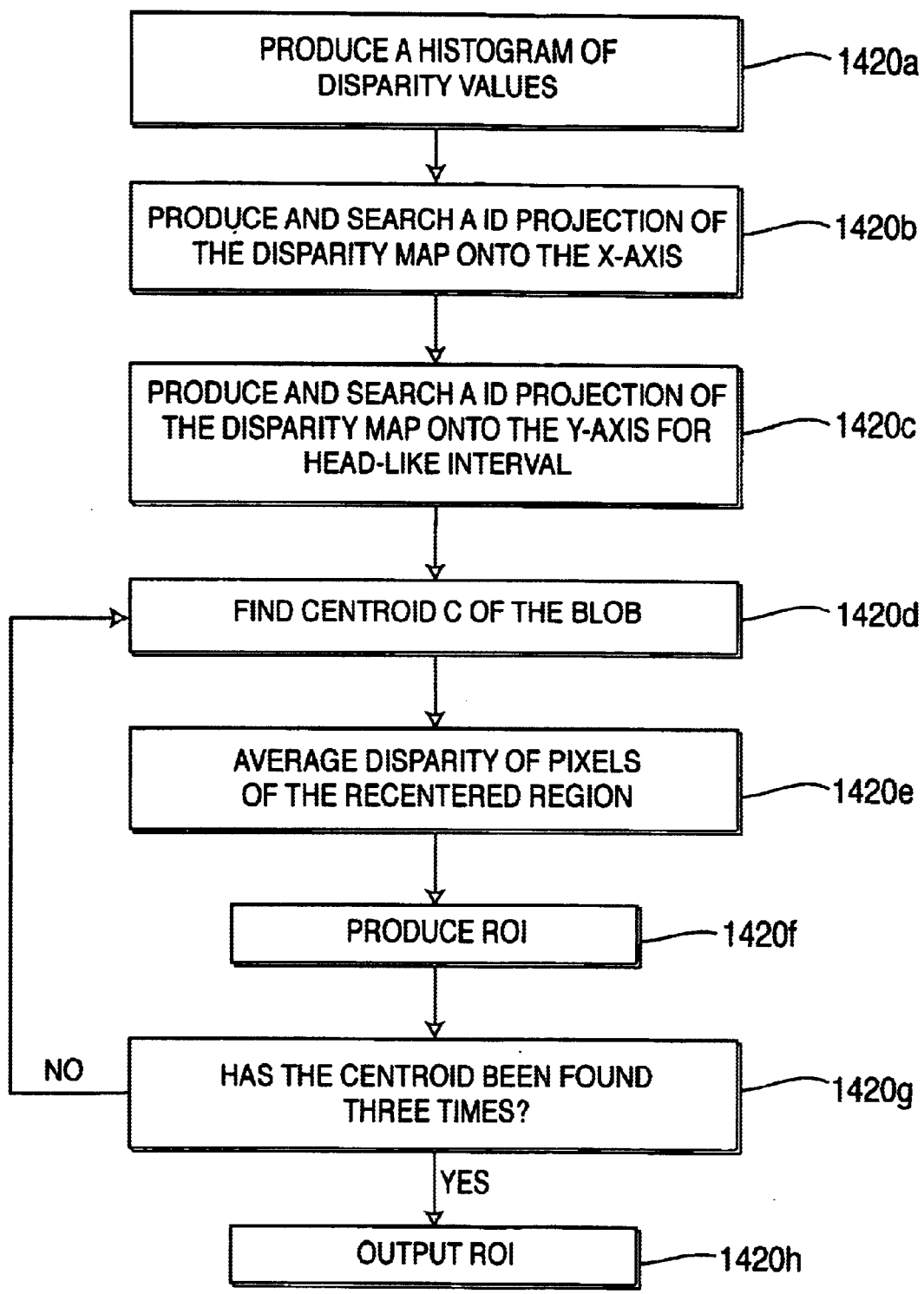
FIG. 24a is a flow chart which shows an exemplary method for producing a region of interest (ROI containing the user's head) for the step 1420 shown in FIG. 24.

The disparity map is used to locate the user's head in the image using the process shown in FIG. 24*a*. At step 1420*a*, a histogram of disparity values is produced. Each group in the histogram constitutes a disparity of 0.5 pixels. The closest, i.e. the highest disparity, group of pixels containing a minimum number of pixels is used as a fine-tuned estimate of the disparity of the face. This step is useful for cases in which the user has his arms stretched out towards the system or a second person in line is peering over the user's shoulder—i.e. in cases in which more than just the user's face falls within the disparity search region. This step limits the useable disparity range. If the threshold is set to the expected number of pixels on the of the user's face at level 5 of the Gaussian pyramid at double-density, then the user's face may be distinguished from among the clutter.

At step 1420*b*, a 1D projection of the disparity map onto the x-axis is formed. In other words, a histogram of pixel-count is computed in the x-direction, only for pixels within the fine-tuned disparity range. A horopter-dependent variable is computed as the expected size of the face in the x-direction. Similarly, a horopter-dependent threshold is computed as the expected number of pixels of a face. A window is then used to find candidate x locations for the head within the x-histogram. The total number of pixels in the window is checked to determine if it exceeds the horopter depended threshold.

At step 1420*c*, for each candidate x location of the head, a similar search for the face is performed in the y-direction. A y-histogram is constructed by projecting onto the y axis only those pixels within the fine-tuned disparity range and within the x-limits defined by the window of step 1420*c*. In this case, the expected height of the user's face in image coordinates is produced based on the expected number of pixels of a face in the y-direction. In other words, the expected height corresponds to the height of a user's head which may be determined from the height of an average user's head. Blobs of pixels which pass both the x-histogram and y-histogram steps are considered valid faces.

At step 1420*d*, the centroid c of the blob is found. Multiple iterations of centroid-finding are performed using c as the center and the region within the expected width and height of the user's face. This allows the user's face to be found with high accuracy. At step 1420*e*, the average disparity of pixels of the centered region is computed. This average is used to compute the z value (distance) of the user's eye. Next, at step 1420*f*, the ROI is produced by selecting the center c as the center of the user's face and extracting a region surrounding the center c as the ROI. A non-separable blob-detector could be used to detect the user's face in backgrounds that produce a high number of false matches. At step 1420*g*, it is determined whether the centroid has been found three times. If not, step 1420*d* is repeated. Otherwise, at step 1420*h*, the ROI is provided as an output.

Figure 25:
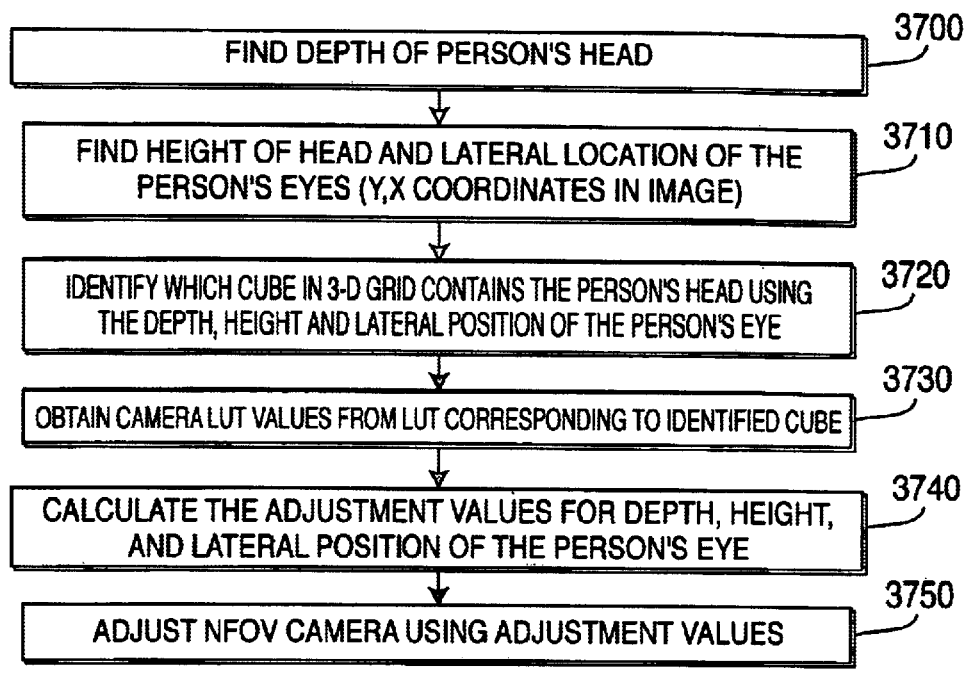
FIG. 25 is a flow chart which shows an exemplary method for using the depth acquired using the method shown in FIG. 24 to adjust the NFOV imager on the user.

The depth value is used to locate the person's head in a 3-D space and focus the NFOV imager on user. FIG. 25 illustrates the process of locating the user's head. Once the user's head has been located, this data may be used to retrieve adjustment values from a LUT to adjust the NFOV imager. As is shown in FIG. 25, at step 3700, the depth of the user's head is found. At step 3710, the height of the person's head and lateral location of the person's head are identified. At step 3720, the depth, height and lateral position of the person's head are used to identify which cube in a 3D space in front of the WFOV imagers contains the person's head. Once the cube has been identified, at step 3730, LUT values are obtained from the LUT which correspond to the identified cube. At step 3740, adjustment values for the depth, height, and lateral position of the person's head are calculated. Then, at step 3750, the NFOV imager is adjusted using the adjustment values.

For example, for a height of one hundred (x=100), a lateral position of two hundred (y=200) and a depth of nine hundred (z=900); the exemplary adjustment values generated using retrieved values from the LUT are focus=1200; zoom=600; ptu_tilt=2056; ptu_pan=100 (ptu is the pan and tilt unit). For x=105; y=250; and z=920: the exemplary adjustment values are focus=1179; zoom=605; ptu_tilt=4134; and ptu_pan=95. For the values x=95; y=305; and z=880; the exemplary adjustment values are focus=1220; zoom=590; ptu_tilt=6250; and ptu_pan=107. The expected size of the user's iris may also be stored in and provided by the LUT.

Figure 24B:
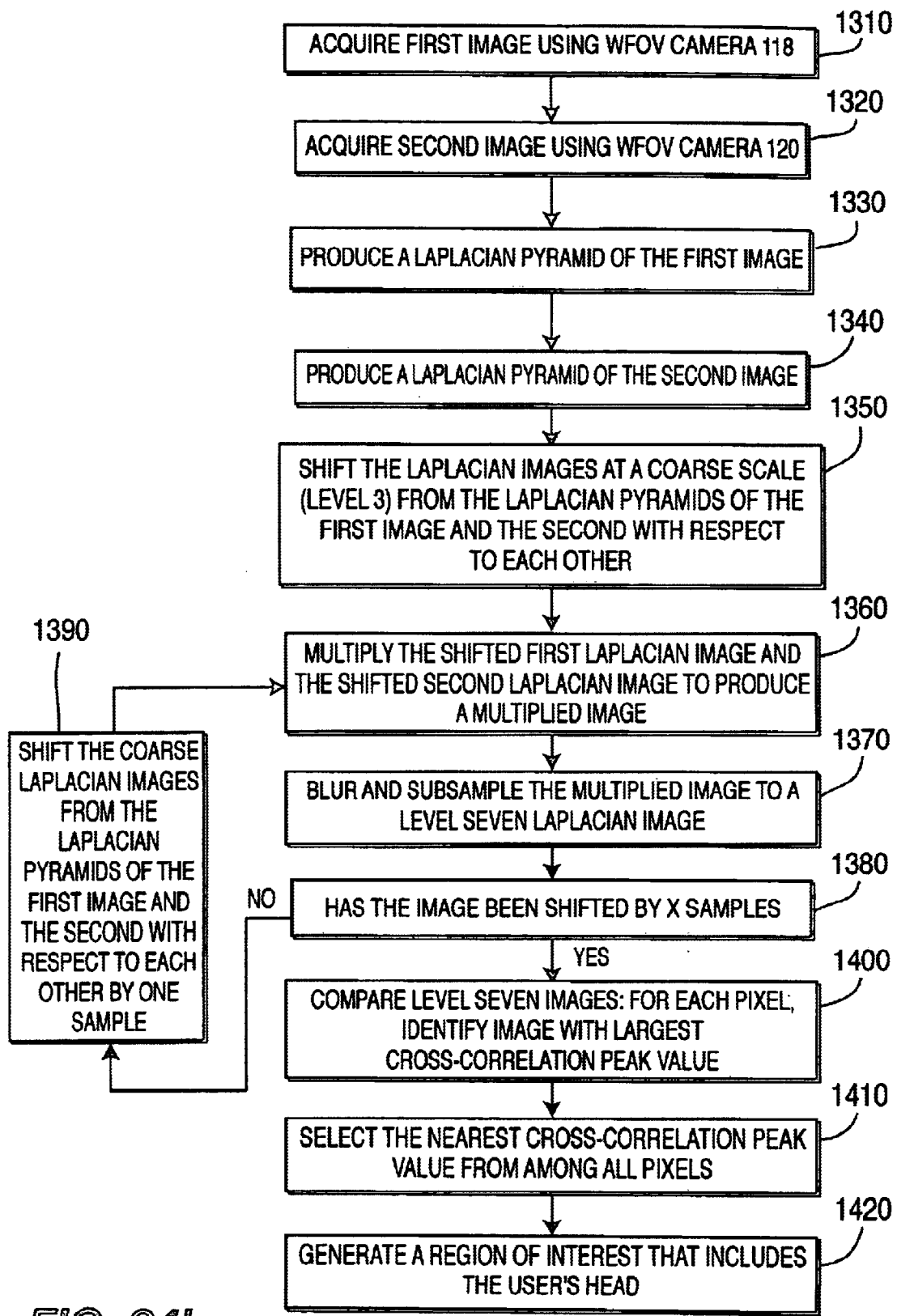

FIG. 24*b* shows an alternative process for the process shown in FIG. 24. These processes are the same except for steps 1370, 1400, and 1410 which processes the image at a lower resolution.

Alternatively, a process could be used that measures the distance between specularities that are present on the user's eye to determine the distance the user is from the system. In this embodiment, light sources are provided to project light that would create, for example, horizontal lines, i.e. specularities, that appear on the user's cornea. The distance between the lines on the user's cornea varies in relation to the distance that the user is from the system. Because the distance between the light sources is known and constant, the system may measure the difference between the lines that appear on the user's cornea to determine the distance between the user and system. The system may be calibrated by placing an object at a known distance from the system and measuring the difference between the lines created by the light sources on the object. This data is then stored in a LUT that is used to convert the measured distance between the lines into a depth value.

The values stored in the LUT are captured in a calibration process. In the calibration process, a mannequin or other target is placed in different locations within an 3D grid at points in front of the ATM. In the example below, three points are given. In practice, up to 96 points may be taken during the calibration process. The mannequin or target is positioned at points traversing in the x direction (height) keeping the other parameters approximately constant. The mannequin or target is located at a point x, y, z which is at an approximate 3D grid point. The pan tilt unit is moved until the right (or left) eye of the mannequin is in view. The image is focused and zoomed so that the iris of the mannequin or target is at a desired value. For example, the image is zoomed and focused so that the iris comprises approximately 200 pixels in diameter of the image. This is repeated for all points.

The eight points that are at the corners of each cube in the 3D grid are processed to fit a linear equation to locate x, y, and z with focus as the output. The equation minimized is:

$$\text{error} = ((a+bx+cy+dz+exy+fxz+gyz+hxyz) - \text{focus\_measured})^2$$

where (1) a, b, c, d, e, f, g, and h are parameters recovered in the minimization and which are stored in the LUT after they are determined, (2) x, y, and z, are coordinates in the 3-D space, and (3) the focus_measured is the measured focus at the 3-D coordinate. Based on the above equation, the equation (3) below is derived:

$$\text{focus\_estimate} = a+bx+cy+dz+exy+fxz+gyz+hxyz \quad (3)$$

The above equation is used in real time by the system to estimate the focus anywhere in the cube. The focus_estimate is the calculated focus for coordinates x, y, and z and a, b, c, d, e, f, g, and h retrieved from the LUT once it has been determined which 3-D cube contains the coordinates x, y, and z.

The calibration of the imager described above is repeated for zoom, pan_tilt, pan_zoom, and iris aperture if necessary. This results in an equation for each x, y, and z cube for focus, zoom, pan_tilt, pan_zoom, and iris aperture.

Figure 26:
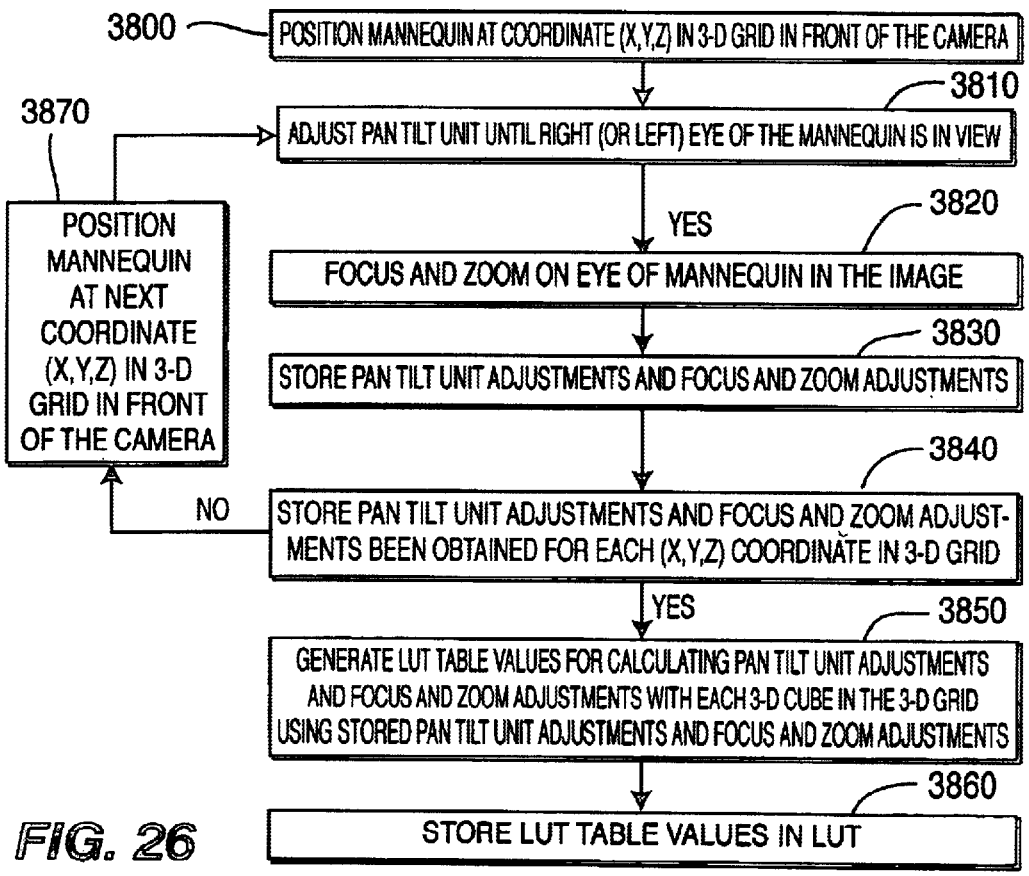
FIG. 26 is a flow chart which shows an exemplary method for calibrating the system and generating the values stored in the LUT described in FIG. 25.

The calibration process is illustrated in FIG. 26. At step 3800, the mannequin is positioned at a coordinate (XYZ) in a 3-D grid in front of the imager. At step 3810, the pan tilt unit is adjusted until the right (or left) eye of the mannequin is in view of the imager. At step 3820, the focus and zoom of the imager is adjusted on the eye of the mannequin. At step 3830, the pan tilt unit adjustments and focus and zoom adjustments are stored. In addition, other adjustment values may be stored as required.

At step 3840, it is determined whether the pan tilt unit adjustments and focus and zoom adjustments have been obtained for each (x, y, z) coordinate at the 3-D grid. At step 3870, the mannequin is repositioned to the next coordinate (x, y, z) in the 3-D grid in front of the imager if all of the adjustments have not been obtained for each point. Otherwise, at step 3850, LUT table values for calculating pan tilt unit adjustments and focus and zoom adjustments with each 3-D cube in the 3-D grid is generated using the stored pan tilt adjustments and focus zoom adjustments using the equations described above. Once these LUT table values have been generated, at step 3860, the LUT table values are stored in the LUT. Once calibration is done for a given configuration it may be used in all ATM's having the same configuration.

This process may be automated. There are seven components to be calibrated in the system 5. These include WFOV imager point-finding, NFOV imager pan tilt mirror point-finding, autofocus, autozoom, autoaperture, iris-size measurement, and point identification. For example, a calibration chart is placed in front of the system. The WFOV imager point-finding. NFOV imager pan tilt mirror point-finding, autofocus, autozoom, autoaperture, iris-size measurement, and point identification are manually aligned for four points on the chart: top-left, top-right, bottom-left and bottom-right. An auto calibration procedure then aligns the remaining twenty one points on the chart.

For example, the WFOV imagers are calibrated based on the WFOV image locations of the four points. The image coordinates of the remaining twenty one points may be estimated using linear interpolation. This yields a region of interest in which coarse-to-fine positioning may be performed. Standard correlation and flow estimation may be performed relative to an artificial reference image comprised of an array of small black disks on a white background. The input from one of the WFOV imagers is replaced by an artificial image. The output from the other WFOV imager is the position of the black disks to sub-pixel resolution.

The pan-tilt mirror is calibrated using an exhaustive search: The pan tilt mirror panned and tilted in small steps such that the NFOV imager tiles a region large enough to guarantee capture of the point concerned, but not so large as to include any other points. Alternatively, the NFOV imager is zoomed out to form a MFOV image large enough to guarantee capture of the point concerned, but not so large as to include any other points. For either approach, it may prove to be difficult to guarantee that only one point is captured on the chart. To ensure that the proper point is captured, each point be individually bar-coded for identification. For example, a spiral bar-code within the black disk may be used a bar code. In this case, the iris identification system may be used to differentiate among points.

Once a point has been captured, a spoke-detector may be used to acquire and center the disk within the NFOV. A coarse autofocus process may be added before using a spoke detection process. Autofocus, centering, and re-zooming may be interleaved to adjust the NFOV imager.

Figure 16:
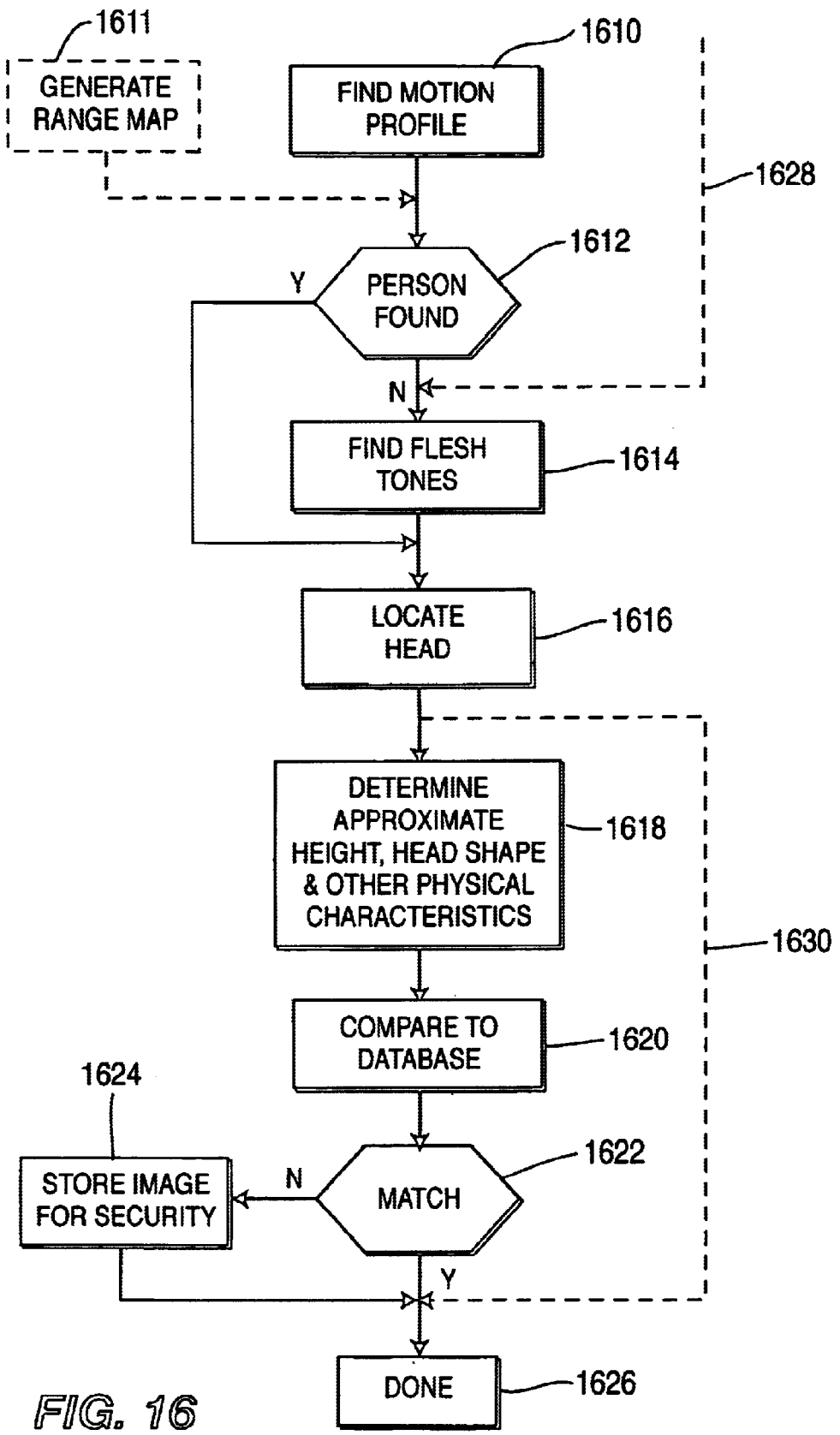
FIGS. 16 is a flow chart which shows details of the process step in FIG. 15 which locates the head in the image.

FIG. 16 is a flow chart which shows an exemplary process that may be used to implement the Locate Head step 1512 of FIG. 15. The process shown in FIG. 16, via the dashed-line arrows 1628 and 1630, illustrates multiple alternative processes for locating the user's head. In the first step 1610 of the process, the stereo module 316 generates a motion profile for the WFOV image. In the exemplary embodiment of the invention, the motion profile is generated from two successive WFOV images. A difference image is derived by subtracting the second image from the first image. The individual pixel values are then squared and the stereo module 316 finds subsets of the image, which are defined by rectangles that surround any large groups of changed pixel values. The coordinates that define these rectangular subsets are used to obtain possible head images from the WFOV image. Instead of using two successive images obtained by the WFOV imager, it is contemplated that the system may generate the difference image by subtracting the WFOV image obtained at step 1510 (shown in FIG. 15) from the WFOV imager from a previously obtained image which was captured when it was known that no person was in the field of view of the WFOV imager 10.

As an alternative to step 1610, step 1611 may be executed to locate a person in the WFOV image. This step uses stereoscopic images provided by the two WFOV imagers 10 and 12 to generate a range map for the scene that is within the field of view of the imagers 10 and 12. To generate this map, corresponding pixels in each of the two images are examined and depth information is assigned to each object in the image based on the respective pixel positions of the object in the two images. Once the depth map is generated, it is relatively easy to locate the customer by her body shape and relatively close position to the imagers 10 and 12. Her head is at the upper portion of her body.

If, at step 1612, the stereo module 316 determines from the size and shape of the motion image or of a body image found in the range map, and from the location of the found image in the WFOV image, that one of the potential head images has a high probability of being the user's head, control is transferred from step 1612 to step 1616. Otherwise, control is transferred to step 1614. Step 1614 scans each of the target head images for flesh-tone pixels. At step 1616, the groupings of flesh-tone pixels are compared.

The portion of the image corresponding to the grouping that most closely corresponds in its shape, size and position in the image to a nominal head profile is identified as the user's head.

The next step in the process, step 1618, analyzes the WFOV image at the area selected as the user's head to determine various physical characteristics, such as height, head shape, complexion and hair color. These characteristics can be readily determined given the location of the head in the image and approximate range information determined by the range map from step 1611 or the sonic rangefinder 332. At step 1620, these characteristics are compared to stored characteristics for the user who recently placed her card into the ATM. If several of the determined characteristics do not match the stored characteristics, the captured image, at step 1624, is stored in the internal database as that of a possible unauthorized user. Because these characteristics can change and because the user may lend her card to another, at least at this stage, the identification process cannot be used to prevent access to the ATM. Accordingly, after step 1622 or after step 1624, the Locate Head process is complete at step 1626.

As shown by the dashed-line arrow 1628, it is contemplated that the generation and analysis of the motion profile may be eliminated from the Locate Head process. In addition, as shown by the dashed-line arrow 1630, it is contemplated that the security analysis steps 1618 through 1624 may be eliminated.

Figure 17:
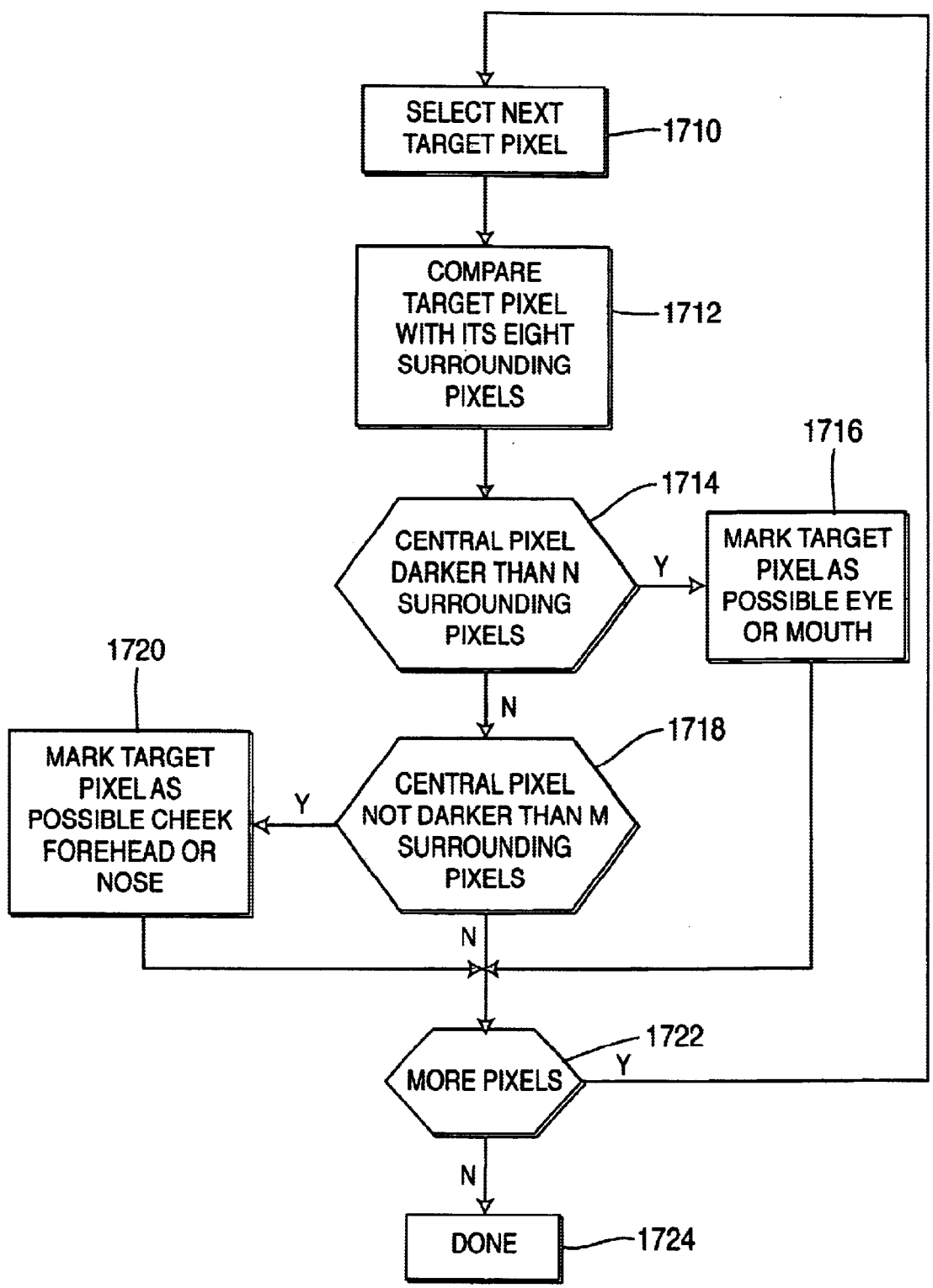
FIG. 17 is a flow chart which shows an exemplary implementation of the process step in FIG. 15 which identifies possible facial features.

FIG. 17 is a flow chart which shows a possible implementation of the step 1516 of FIG. 15 in which possible facial features are identified in the head portion of the WFOV image. As described above, the input image to this process is one in which the luminance component of each pixel value is replaced by an average of the pixel and its eight neighboring pixels.

In the first step 1710 of this process, the stereo module 316 selects a first pixel from the luminance averaged image as a target pixel. Next, at step 1712, the target averaged pixel value is compared with its eight surrounding averaged pixel values. At step 1714, if the luminance level of the target pixel is less than that of a number N of its surrounding pixel values then, at step 1716, the target pixel is marked as being a possible eye or mouth. If, at step 1714, the luminance level of the target pixel is not less than the luminance levels of N of its surrounding pixels, then control passes to step 1718 which determines if the luminance level of the target pixel is greater than or equal to the luminance levels of M of its surrounding pixels. If this test is met then, at step 1720, the pixel is marked as being a possible cheek, forehead or nose. In the exemplary embodiment of the invention, N is six and M is seven. After step 1716, if the condition is false, step 1722 is executed which determines if all of the pixels in the image have been processed for feature extraction. If more pixels remain to be processed, control is transferred to step 1710 to select a next target pixel. If no more pixels remain, then control transfers to step 1724 and the Identify Possible Facial Features process is complete.

Figure 18A:
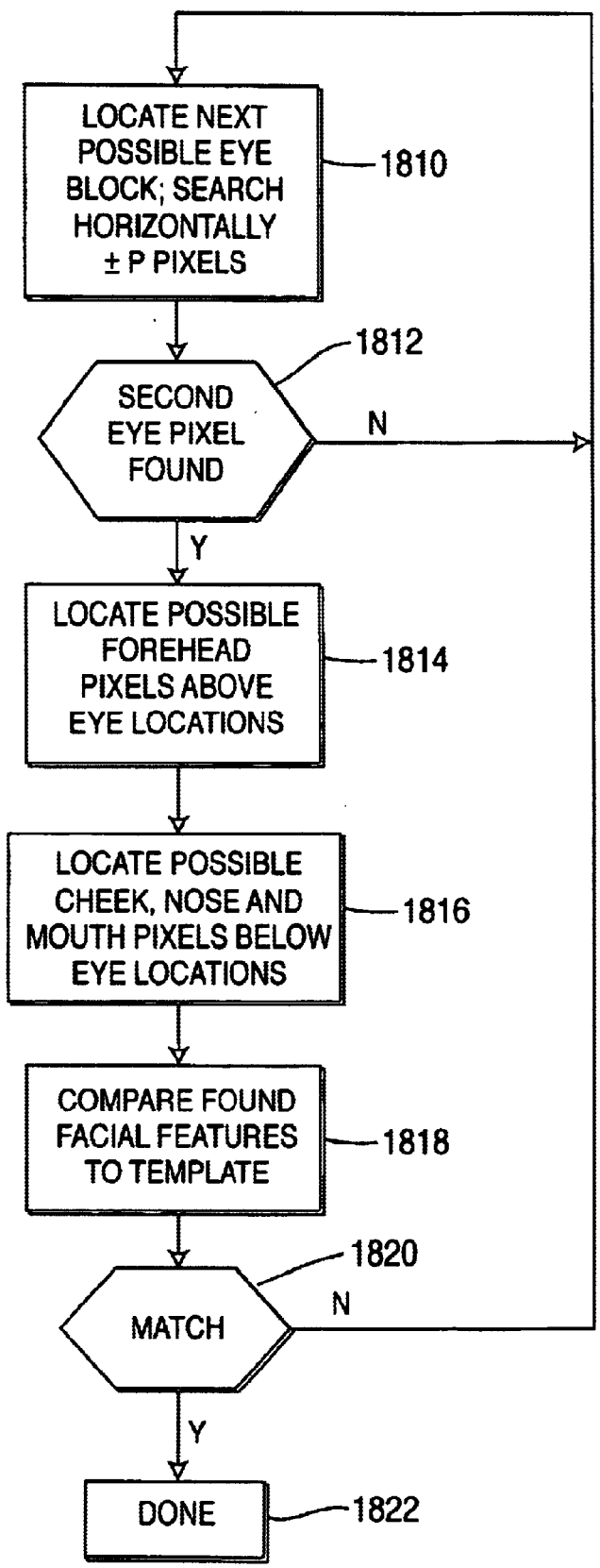
FIG. 18a is a flow chart which illustrates an implementation of the symmetry analysis block shown in FIG. 15.

FIG. 18a is a flow chart which shows an exemplary implementation of step 1518 of FIG. 15, Locate Eyes by Symmetry Analysis. This process is part of the stereo module 316, shown in FIG. 3. The first step in this process, step 1810, identifies, as a target eye pixel position, the first possible-eye pixel position as determined by the feature identification process, described above with reference to FIG. 17. Step 1810 also scans the image in a horizontal direction to determine if the image contains another possible eye pixel, displaced from the target pixel by P pixel positions, ±Q pixel positions. In the exemplary embodiment of the invention, values for P and Q are determined by the distance between the customer and the imager and by the decimation of the averaged WFOV image. If a second possible eye pixel is not found within the search area, control returns to step 1810 to choose another possible eye pixel position as the target pixel position.

If, however, a second eye pixel position is found at step 1812, control is transferred to step 1814 and the portion of the image representing points higher on the face than the eye pixel positions is searched for possible forehead pixel positions. Next, at step 1816, the portion of the image representing points lower on the face than the eye positions is searched to locate possible cheek, nose and mouth pixel positions. Whatever corresponding features are found by the steps 1814 and 1816 are compared to a generic template in step 1818. This template defines a nominal location for each of the facial features and an area of uncertainty around each nominal location. If some subset of the identified features is found to fit the generic template at step 1820, the target eye location and its corresponding second eye position are identified as corresponding to the user's eyes at step 1822.

Figure 18B:
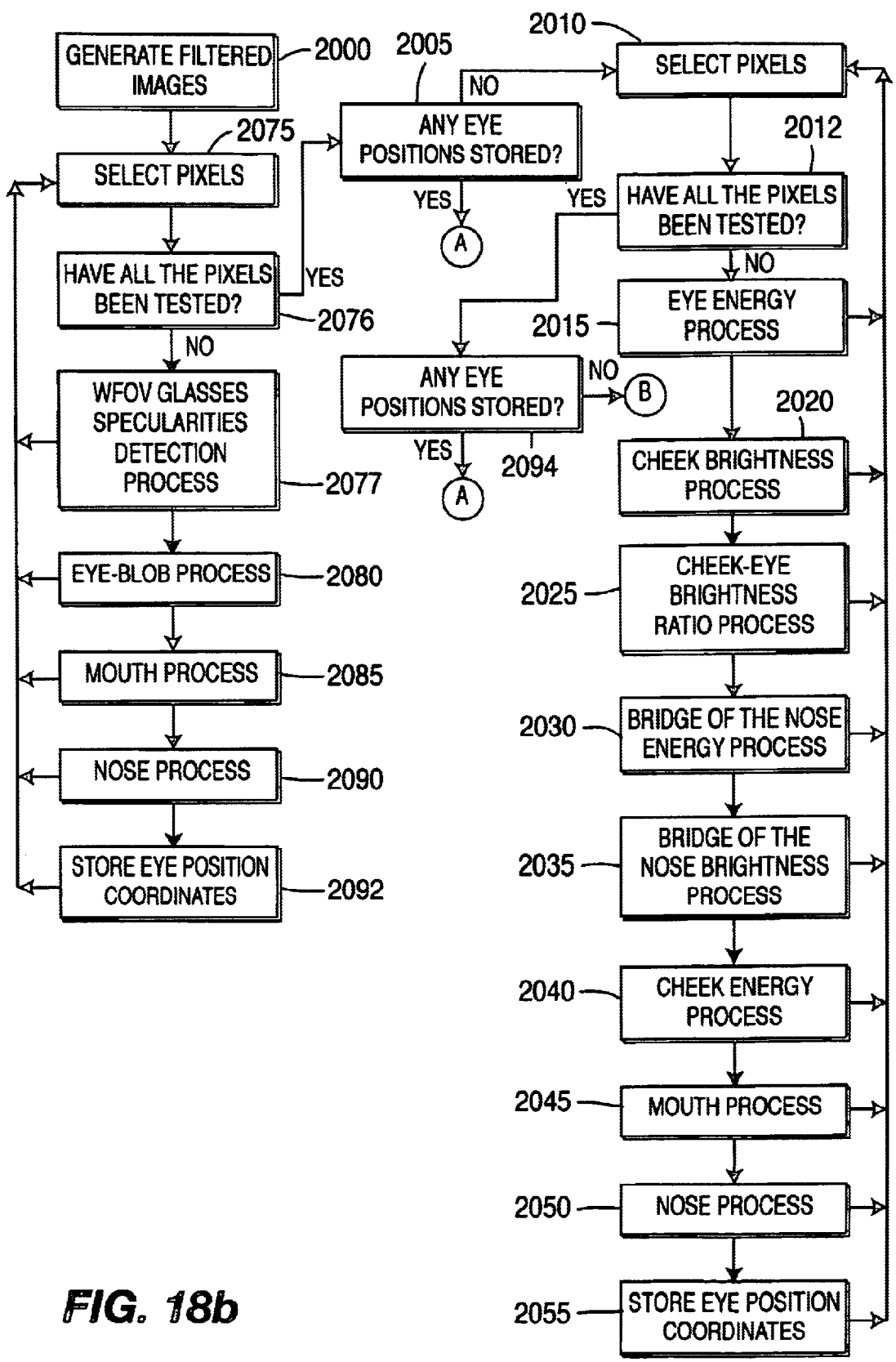
FIGS. 18b, 18c, 18e through 18k and 18m, 18n, 18r, and 18v are flow-chart diagrams which illustrate an alternative exemplary method for locating the user's eyes in the WFOV images.
Figure 18C:
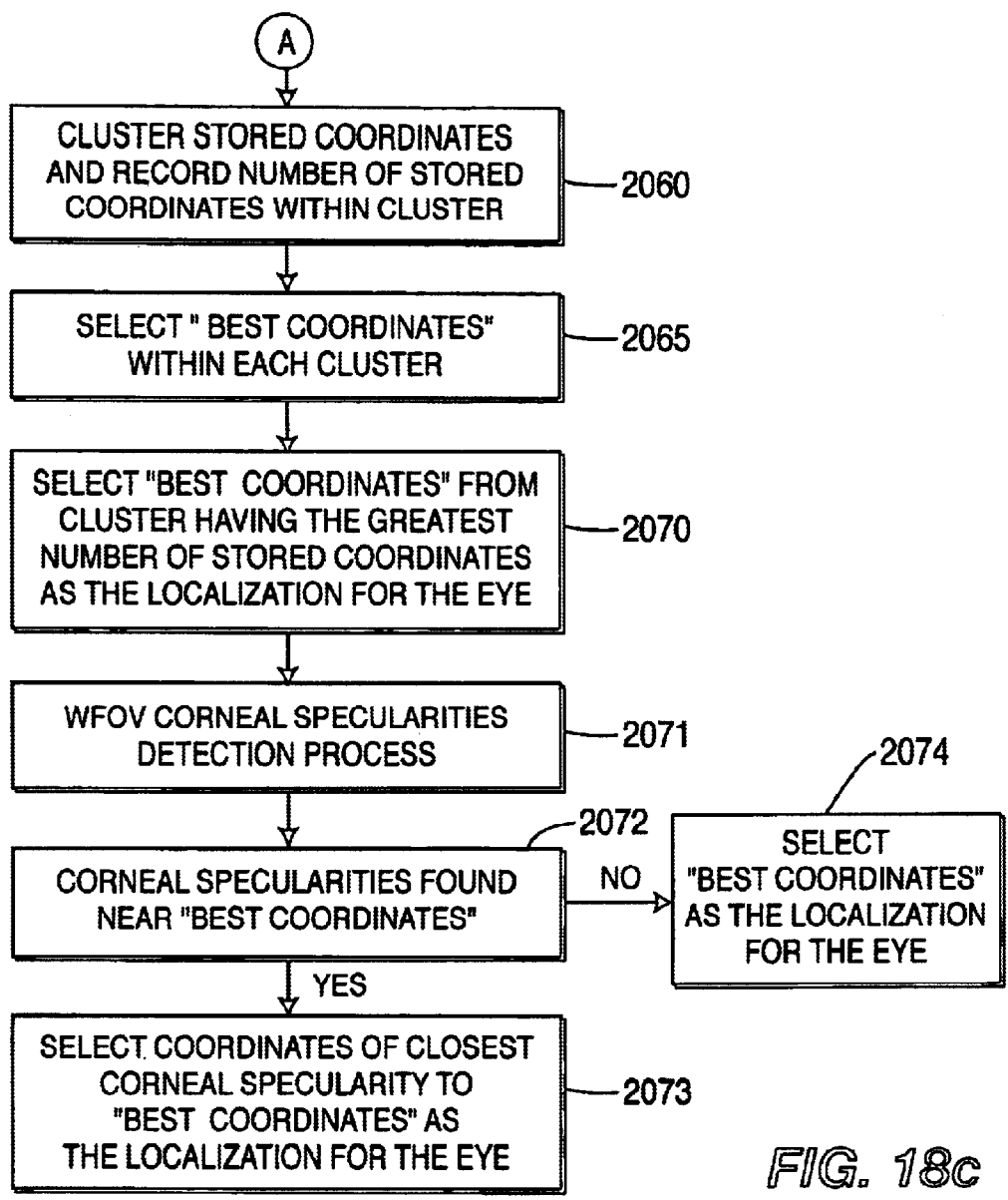

FIGS. 18b and 18c illustrate an alternative template process for locating the user's head and eye. The template process may used to implement step 1412 shown in FIG. 14 or as a replacement for steps 1514, 1516, and 1518 shown in FIG. 15. The template process locates the coordinates of the user's eyes from the ROI containing an image of the user's head. The template process uses a template-based approach and information from various filter kernels. The templates are designed to be scaleable to allow eye-finding for varying head sizes and varying distances from the imager.

Each of the templates is scaled in proportion to the size of the face region being processed. This is accomplished using a disparity process that provides a disparity measure from which the approximate distance of the person from the imager may be calculated. Alternatively, the disparity may be used to access a database to provide this information without converting the disparity to a depth value. The distance between the user and the WFOV imagers 10 and 12 (shown in FIG. 1c) is used to calculate a disparity value which is subsequently used to produce a scaling factor to scale the template based on the user's distance from the system 5.

The template process has two processing paths (1) an eye-finder process for when the user is not wearing glasses and (2) an eye-finder process for when the user is wearing glasses. The template process is divided into two processing paths because the response caused by the user's glasses often interferes with the detection of the user's facial features. The template process first attempts to locate the user's face assuming the user is wearing glasses. If no face is located, then the template process attempts to locate the user's face assuming the user is not wearing glasses.

Once the various filter outputs are available, the processes 2075 through 2092 and 2010 through 2055 are performed in order for templates that are moved around over the entire image pixel by pixel and all positions passing all processes (tests) are recorded. As soon as one position fails one procedure the remaining procedures are not performed at the same position. The procedures are in roughly increasing order of computational complexity and decreasing order of power of selectivity. As a result, the overall process for localizing the user's eyes may be performed with less computation time. Although in the current exemplary embodiment all of the processes need to be passed in order for a face to be detected, it is contemplated that a subset of the processes may be performed. It is also contemplated that all or a subset of the procedures may be performed and that the pass/fail response of each of the processes will be considered as a whole to determine if a face has been detected.

Returning to FIGS. 18b and 18c, the images from the WFOV imagers 10 and 12 are filtered at step 2000 to generate filtered images. The filtered images are derived from an image I that is a reduced-resolution version of the image from the WFOV imagers 116 and 118, obtained via blurring and subsampling using an image pyramid process as described in U.S. Pat. No. 5,539,674 entitled PYRAMID PROCESSOR INTEGRATED CIRCUIT by van der Wal. This patent is incorporated herein by reference for its teachings on pyramid processing. This process decreases the spatial frequencies contained in the filtered images, and improves the computational tractability of the filtering process. In this exemplary embodiment, the WFOV images are reduced by a factor of four in both the X and Y dimensions.

The filtered images include (1) a Laplacian filtered image L, a second derivative in both the x and y directions, of the WFOV images (2) an X-Laplacian image Lx, a second derivative in the x-direction, of the WFOV images; (3) a Y-Laplacian image Ly, a second derivative in the y-direction, of the WFOV images; (4) first derivative images Dx and Dy in both the x and y directions of the WFOV images; (5) orientation maps ORIEN of the WFOV images; and (6) thresholded squared Y-Laplacian images (Ty2) of the WFOV images.

The Gaussian filter coefficients to be used in the equations below are set forth in relation (4) below. In the notation below G(x) refers G(.) oriented in the x, (horizontal) direction, and G(y) refers to G(.) oriented in the y (vertical) direction.

$$G(.)=[1/16, 2/8, 3/8, 2/8, 1/16] \quad (4)$$

The Laplacian filtered images L are constructed by taking the difference between image I and the corresponding Gaussian filtered version of I according to equation (5) below.

$$L=I-I*G(x)*G(y) \quad (5)$$

The X-Laplacian filtered images Lx are produced by taking the difference between the images I and the Gaussian filtered image in the x-direction G(x) according to equation (6) below.

$$Lx=I-I*G(x) \quad (6)$$

The Y-Laplacian filtered images Ly are produced by taking the difference between the image I and the Gaussian filtered image in the y-direction G(y) according to equation (7) below.

$$Ly=I-I*G(y) \quad (7)$$

The first filtered derivative images in the x-direction Dx and the y-direction Dy are each produced using a 5-tap filter having the coefficients set forth below.

$$D(.)=[1/8, 1/4, 0, -1/4, -1/8]$$

For the x-direction first derivative images Dx, the images I are filtered in the x-direction using the 5-tap filter defined above to produce D(x) and filtered in the y-direction using the Gaussian filter coefficients in relation (4) to produce G(y). The x-direction first derivative image Dx is produced according to equation (8) below $$Dx=I*D(x)*G(y) \quad (8)$$

For the y-direction first derivative images Dy, the WFOV images are filtered in the y-direction using the 5-tap filter defined above to produce D(y) and filtered in the x-direction using the Gaussian filter coefficients of relation (4) to produce G(x). The y-direction first derivative images are produced according to equation (9) below.

$$Dy=I*D(y)*G(x) \quad (9)$$

The orientation maps ORIEN are computed using equation (10).

$$ORIEN=\arctan(2*Dx*Dy/(Dx*Dx-Dy*Dy)) \quad (10)$$

Equation (10) is computed in two steps. First, two image maps j1map and j2map are produced according to equations (11) below.

$$j1map(.)=2Dx(.)Dy(.)$$
$$j2map(.)=Dx(.)Dx(.)-Dy(.)Dy(.) \quad (11)$$

Then the orientation map is produced according to equation (12) below.

$$ORIEN=a\tan 2(j1map(.), j2map(.))/2 \quad (12)$$

The thresholded squared Y-Laplacian images Ty2 of the WFOV images are obtained by squaring the Y-Laplacian filtered images Ly and thresholding all values less than, for example, sixteen. In others words, all values below the threshold are changed to, for example, zero.

Returning to FIGS. 18b and 18c, the WFOV glasses specularities detection process determines if the user is wearing glasses. As discussed above, the presence of glasses can cause false detection of the user's facial features. For example, the frame of the user's glasses can provide more energy to the check brightness process 2020, described below, causing process 2020 to produce an erroneous result.

The WFOV glasses specularities detection process 2077 detects and localizes the position of the specularities from the user's glasses caused by the reflection of light incident from the light sources. The glass specularities are detected to determine if the user is wearing glasses, estimate the location of the user's eyes using the detected specularities, and determine what portion of the user's eyes may be occluded by the specularities.

Figure 18V:
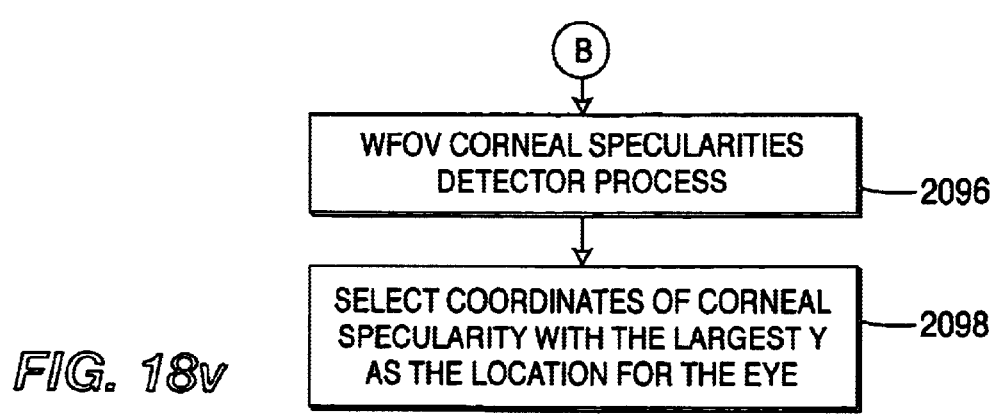
Figure 18D:
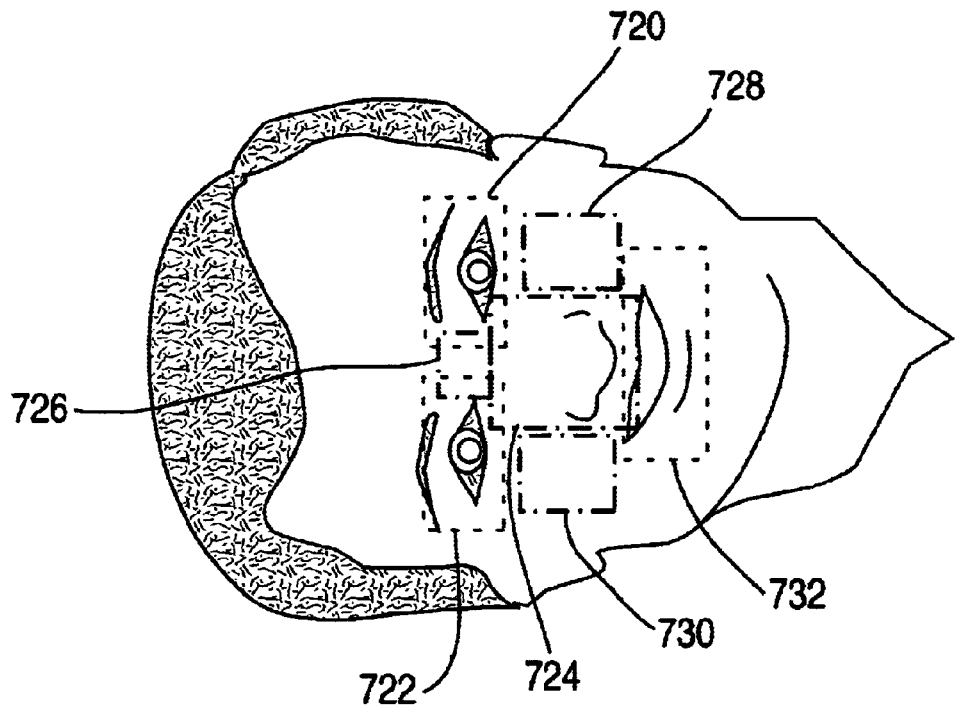
FIG. 18d is a drawing representing a human head that is useful for describing the exemplary method for locating the user's eyes.
Figure 18E:
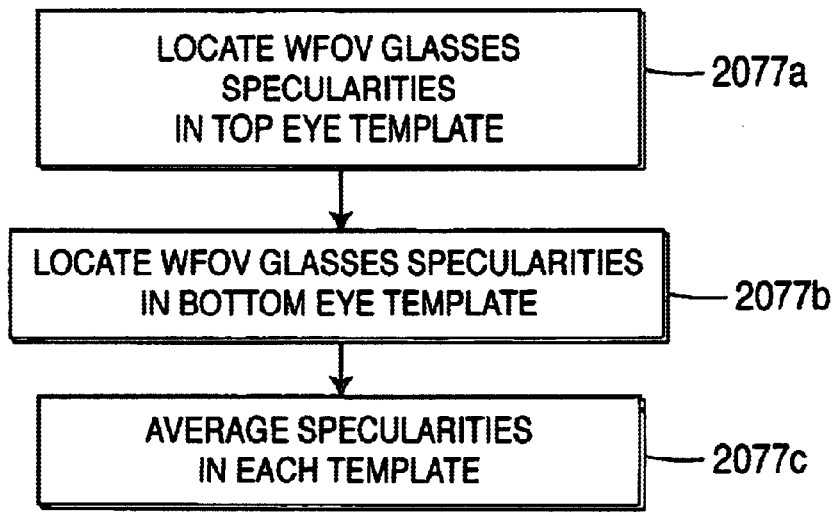

The WFOV glasses specularities detection process 2077 is explained with reference to FIGS. 18d and 18e. First, at step 2077a, shown in FIG. 18e, the right or top eye template is processed to detect specularities. The top eye template and the other templates are shown in FIG. 18d.

The templates used in these processes include a number of templates oriented with various regions of a person's face. The templates include (1) left and the right eye templates 720 and 722, (2) nose template 724, (3) bridge of the nose, mid-eye, template 726, (4) left and right cheek templates 728 and 730, and (5) mouth template 732. The bridge-of the nose or mid-eye template 726 is a small template lying in the middle of the user's two eyes. In the exemplary embodiment, the WFOV imagers 10 and 12 (shown in FIG. 1c) are horizontally oriented resulting in facial images being rotated by ninety (90) degrees. The template is designed for this orientation of the user's face. If the image of the user's face is not rotated, the templates are rotated by ninety degrees to compensate for the different orientation of the user's face produced by the WFOV imagers 10 and 12.

The various templates and corresponding nomenclature for each template is provided in the table below.

| User's Feature | Reference Description |
| --- | --- |
| right eye template 720 | top eye |
| left eye template 722 | bottom eye |
| right cheek template 728 | top cheek |
| left cheek template 730 | bottom cheek |
| nose template 724 | nose |
| mouth template 732 | mouth |
| bridge-of the nose template 726 | mideye |

The sizes of the templates were chosen by warping a set of sample images from ten people on top of each other so that the eyes were all aligned and then measuring the separation of the two eyes and other features of the face. At a mean distance of about two feet from the WFOV imagers 10 and 12 (shown in FIG. 1c) the eye separation of an average user was found to be about seventeen pels in the subsampled imagery used by the template matching process. This assumes an operation range of the system 5 of one to three feet from the WFOV imagers 10 and 12.

There are two different sets of templates: one for when the user is wearing glasses (the glass template set) and one for when the user is not wearing glasses (the no glass template set). The templates in these sets are not the same because the process for detecting the user's eyes when the user is wearing glasses is different from the process for detecting the user's eyes when the user is not wearing glasses. As a result, not every template is needed for both sets of procedures.

Further, the top and bottom eye templates 720 and 722 are larger in the glasses template than the no glasses template because two specularities can appear on each lens of the user's glasses which may be larger than the user's eye. As is described above, two specularities may be detected because two light sources 126 and 128 may be used to illuminate the user's face. In order to detect these specularities, the size of the eye templates 720 and 722 is increased.

The template definition used when the user is wearing glasses is defined in the tables below.

Glasses Template Set Sizes (WHEN THE USER IS WEARING GLASSES)

| TEMPLATE | TEMPLATE SIZE (in pixels and rows by columns) |
| --- | --- |
| right eye template 720 | 12 by 3 |
| left eye template 722 | 12 by 3 |
| mouth template 732 | 12 by 10 |
| nose template 724 | 6 by 8 |

Glasses Template Set Offsets Relative to the Selected Pixel (WHEN THE USER IS WEARING GLASSES)

| TEMPLATE | OFFSET (in pixels) |
| --- | --- |
| left eye X offset | 2 |
| left eye Y offset | 22 |
| right eye X offset | 2 |
| right eye Y offset | 0 |
| mouth X offset | 18 |
| mouth Y offset | 11 |
| nose X offset | 5 |
| nose Y offset | 14 |

The template definition for the user without glasses is in the tables below.

No Glasses Template Set Sizes (WHEN THE USER IS NOT WEARING GLASSES)

| TEMPLATE | TEMPLATE SIZE (in pixels and rows by columns) |
| --- | --- |
| right eye template 720 | 6 by 3 |
| left eye template 722 | 5 by 3 |
| right check template 728 | 6 by 8 |
| left cheek template 730 | 5 by 8 |
| nose template 724 | 6 by 8 |
| mouth template 732 | 12 by 10 |
| bridge-of the nose template 726 | 6 by 3 |

No Glasses Template Set Offsets Relative to the Selected Pixel (WHEN THE USER IS NOT WEARING GLASSES)

| TEMPLATE | OFFSET (in pixels) |
| --- | --- |
| left eye Template X offset | 2 |
| left Eye Template Y offset | 17 |
| right Eye Template X offset | 2 |
| right Eye Template Y offset | 0 |
| nose Template X offset | 5 |
| nose Template Y offset | 9 |
| left Cheek Template X Offset | 8 |
| left Cheek Template Y offset | 17 |
| right Cheek Template X offset | 8 |
| right Cheek Template Y offset | 0 |
| mouth Template X offset | 18 |
| mouth Template Y offset | 5 |
| mid Eye Template X offset | 2 |
| mid Eye Template Y offset | 9 |

Returning to FIG. 18e, at step 2077a, each of the pixels located in the top eye template 720 is processed to locate two by two pixel regions, four pixels, which have large Laplacian values. For example, values above a threshold value of twenty are determined to be large. If no specularities are detected in the top eye template 720, the next pixel is selected at step 2075 and step 2077 is repeated if it is determined at step 2076 that all the pixels have not already been tested. Otherwise, at step 2077b, the bottom eye template 722 is processed to detect specularities. If specularities are not detected in the bottom eye template, then the next pixel is selected at step process 2075 and step 2077 is repeated. By detecting a specularity in each lens of the user's glasses, false detection of specularities caused by the tip of the user's nose may be prevented.

At step 2077*c*, if two specularities are detected in the right and left eye templates 720 and 722, then the mean position of the two specularities in each eye template 720 and 722 is designated as the location of the user's eye. This position is designated as the location of the user's eyes because the positioning of the two light sources 126 and 128 (shown in FIG. 1*c*) causes the specularities to occur on either side of the user's eye in the eye glass. If one specularity is detected, then its position is designated as the estimated location of the user's eye.

Returning to FIG. 18*b*, the next process, the eye blob process 2080, detects the position of the user's eye. Because a portion of the user's eye may be occluded by the specularities from the user's glasses, the eye-blob process 2080 examines portions of the image of the user's eye which are not occluded. In other words, positions other than the location of the detected specularities are examined. The eye blob process 2080 examines a ten by ten pixel region of the Laplacian filtered image L surrounding the location of the specularities detected by process 2077. A two-by-two pixel template is used to examine the ten-by-ten region of the Laplacian filtered image L to locate negative Laplacian values, for example, values less than negative one. Values less than negative one are considered to be a location corresponding to the user's eye. The location of the Laplacian values smaller than negative one in each eye template 720 and 722 are clustered and averaged to produce an estimated location for each of the user's eyes.

The response of the user's eye glass frames in the Laplacian filtered image L is similar to that of the user's eyes. Further, the distance of the eye glass frame from the detected specularities is similar to the distance of the user's eyes from the specularities. Thus, to overcome difficulties that may be caused by detection of the frames, the detected portions of the frames and the detected portions of the eye are used in combination to determine the average position of the user's eye. The eye glass frames may be used in combination because the frames are generally symmetrical about the users eyes and, as a result, do not affect the average position of the user's eye.

If the locations of the user's eye can not be detected in each of the templates 720 and 722 at step 2080, step 2075 is repeated. Otherwise, the mouth process 2085 is implemented.

The mouth process 2085 uses the expected orientation of the user's mouth to determine if the user's mouth is detected in the mouth template 732. Thus, false positive detections caused by, for example, the side of the user's head are detected. The mouth process 2085 uses a movable template because the position of a person's mouth varies widely with respect to the user's eyes and nose from person to person. The mouth template 732 (shown in FIG. 18*d*) may be moved in a direction towards or away from the position of the user's eyes to account for this variability. Although the mouth template 732 may move, the mouth template should not be moved to overlap or go beyond the pixel border columns of the image. The pixel border columns are the pixels located at the edge of image. Thus, for example, the mouth template should not be moved to overlap the two pixel border columns located at the edge of the image. The pixel border columns are avoided because of the border effects caused by the size of the filter kernels.

The mouth process 2085 calculates the average orientation of pixel values in the mouth template 732 by averaging the j1map and the j2map images over the mouth template region and using the resulting average j1map and j2map to compute the orientation using equation (12). The mouth process 2085 then determines if the average position is no greater than, for example, ten degrees on either side of a horizontal reference line. The horizontal reference line is with reference to an upright orientation of the user's face. In the ninety degree rotated version of the user's head acquired by the WFOV imagers 10 and 12 (shown in FIG. 1*c*), the horizontal line corresponds to a vertical reference line. If the average position is greater than ten degrees, the mouth template is moved and the test is repeated. The mouth template 732 is moved until the user's mouth is detected or each of the possible positions of the mouth template 732 is processed to detect the user's mouth. If the user's mouth is not detected, then process 2075 is repeated. Otherwise, the nose process 2090 is implemented.

Figure 18F:
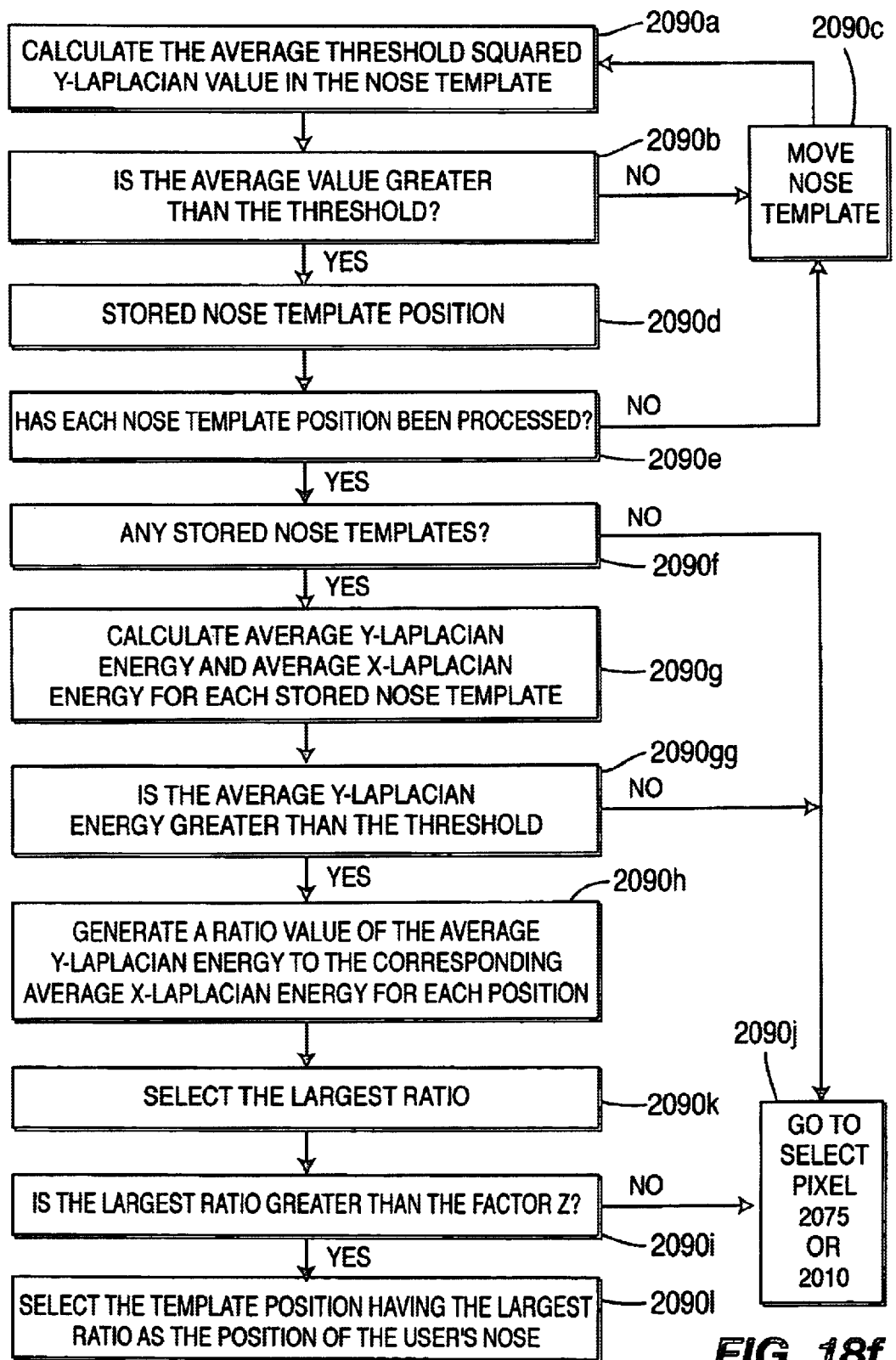
Figure 18G:
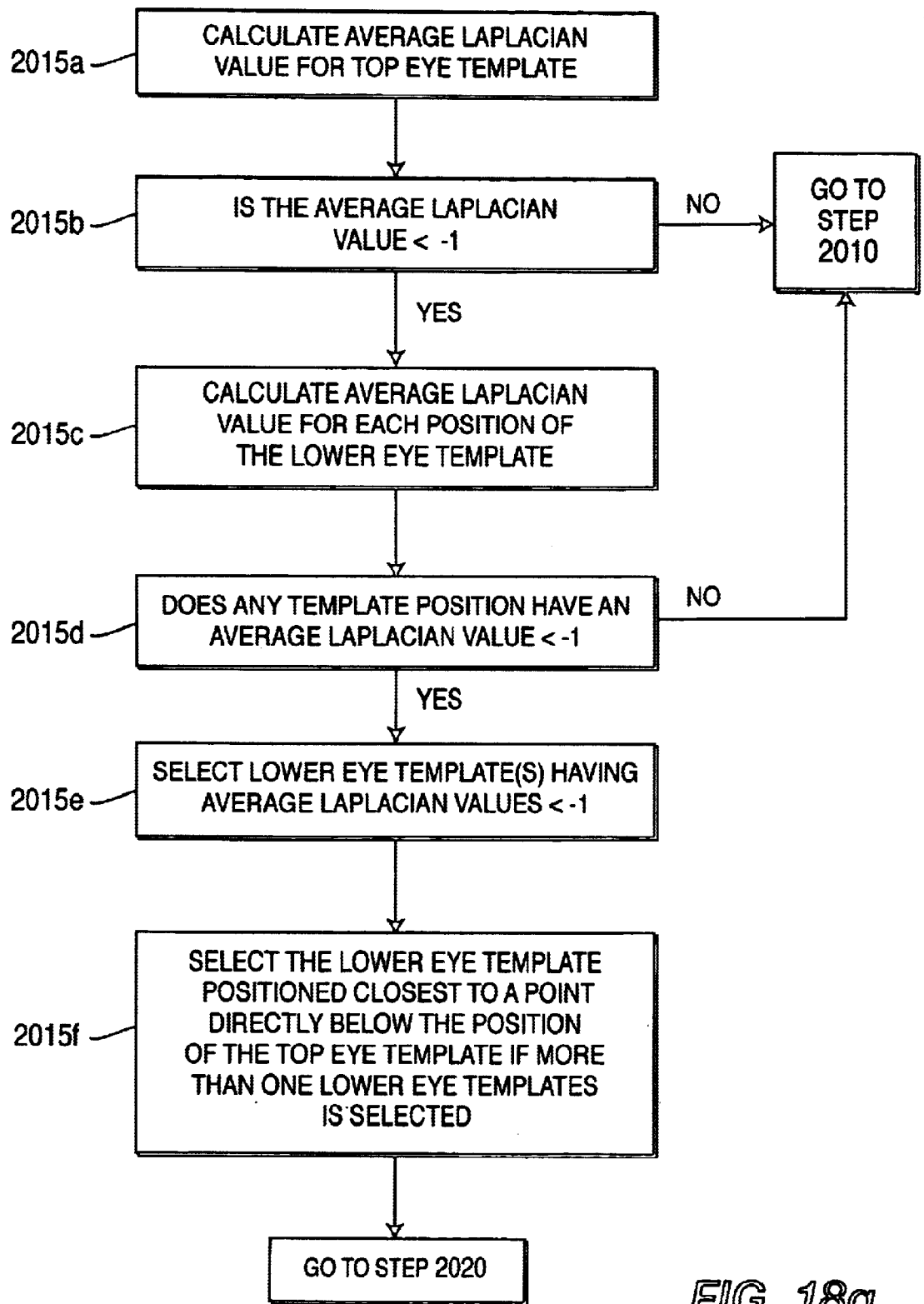
Figure 18H:
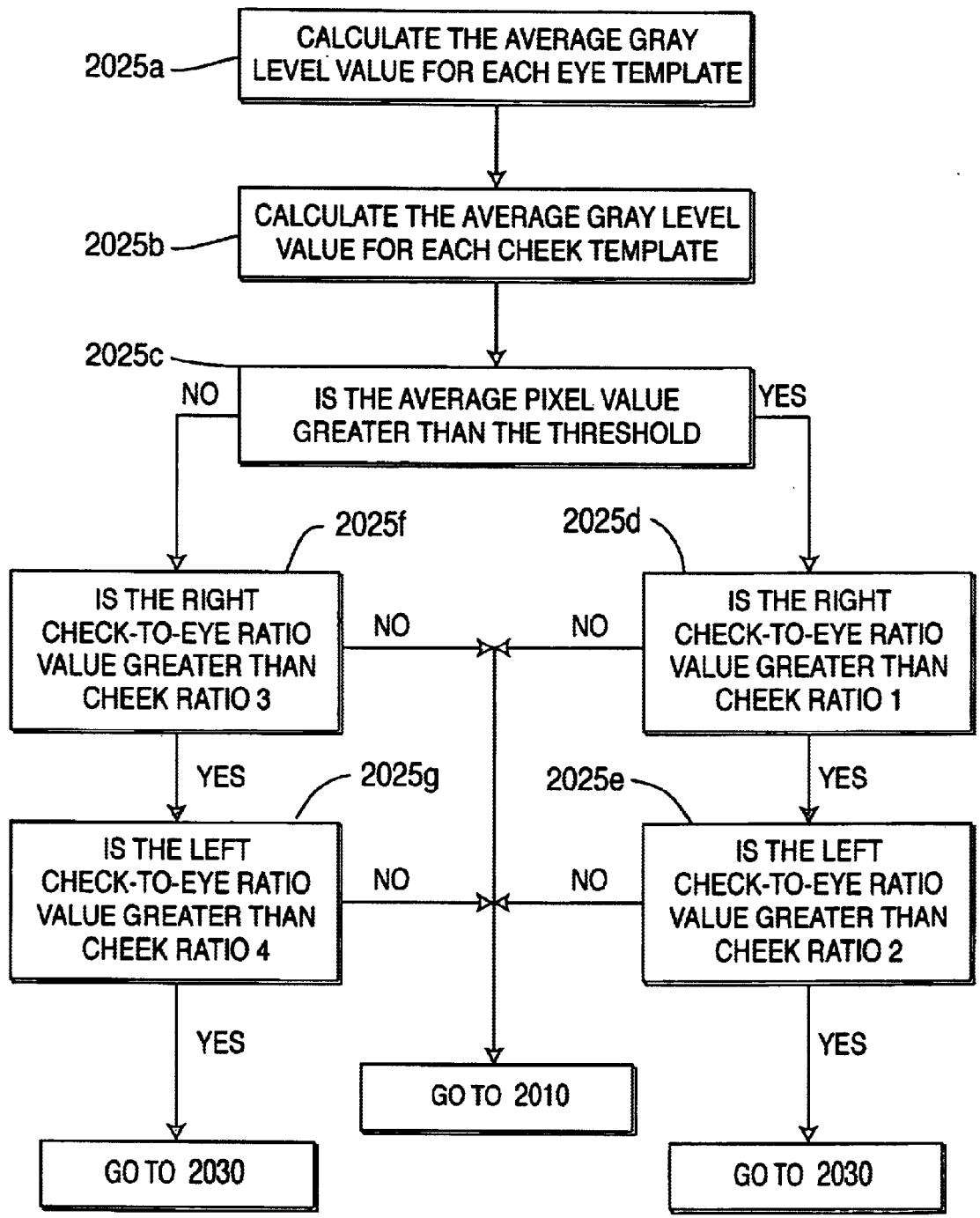
Figure 18I:
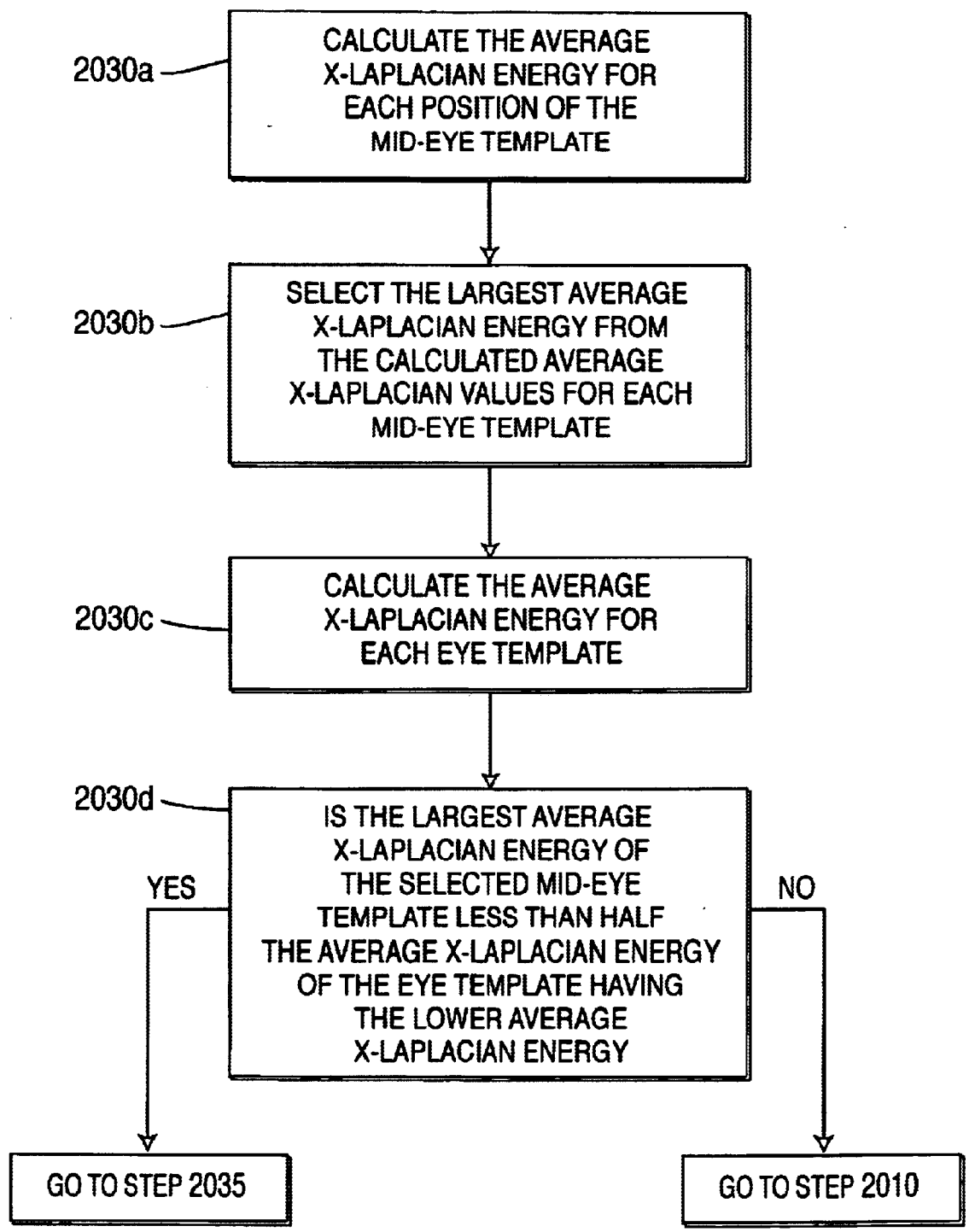
Figure 18J:
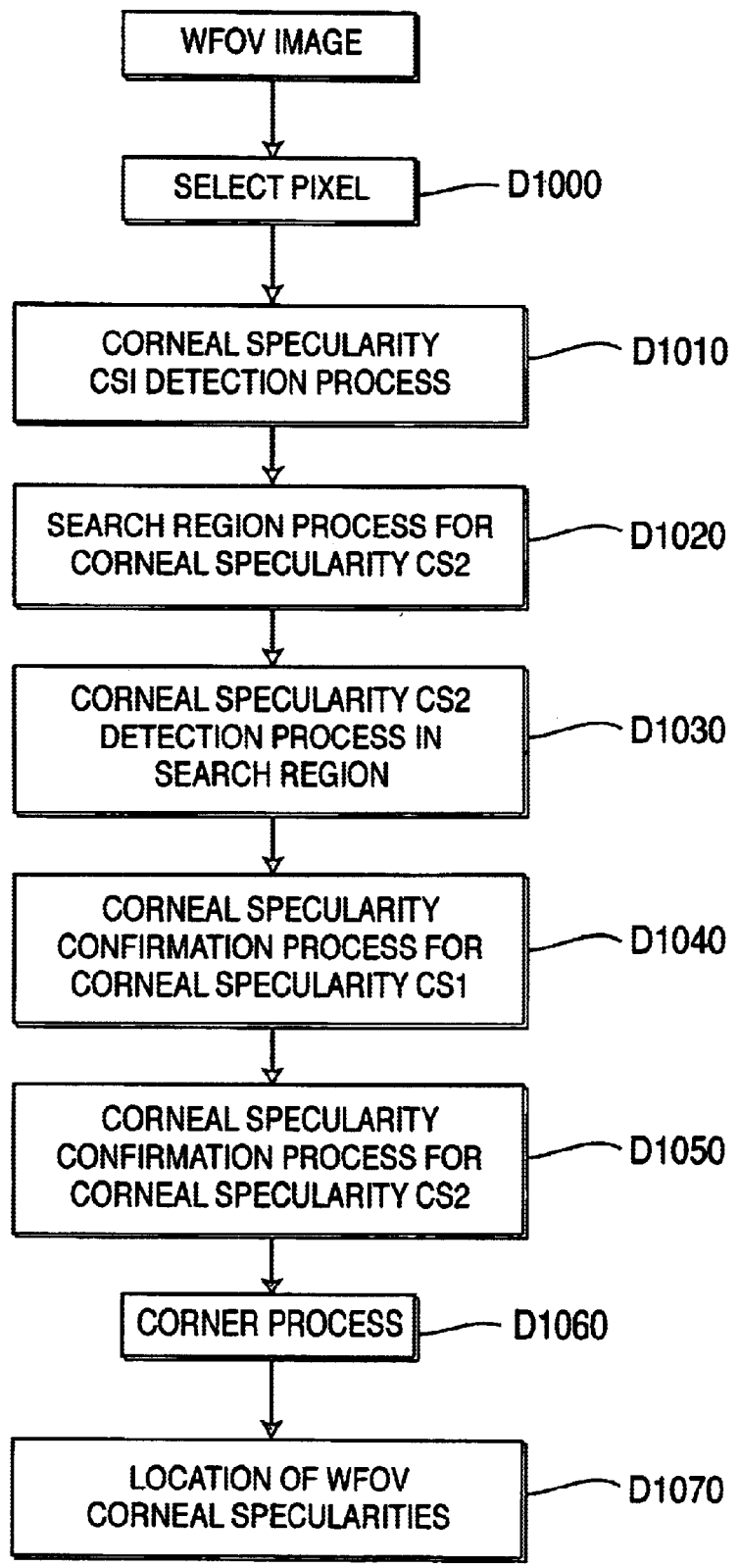
Figure 18K:
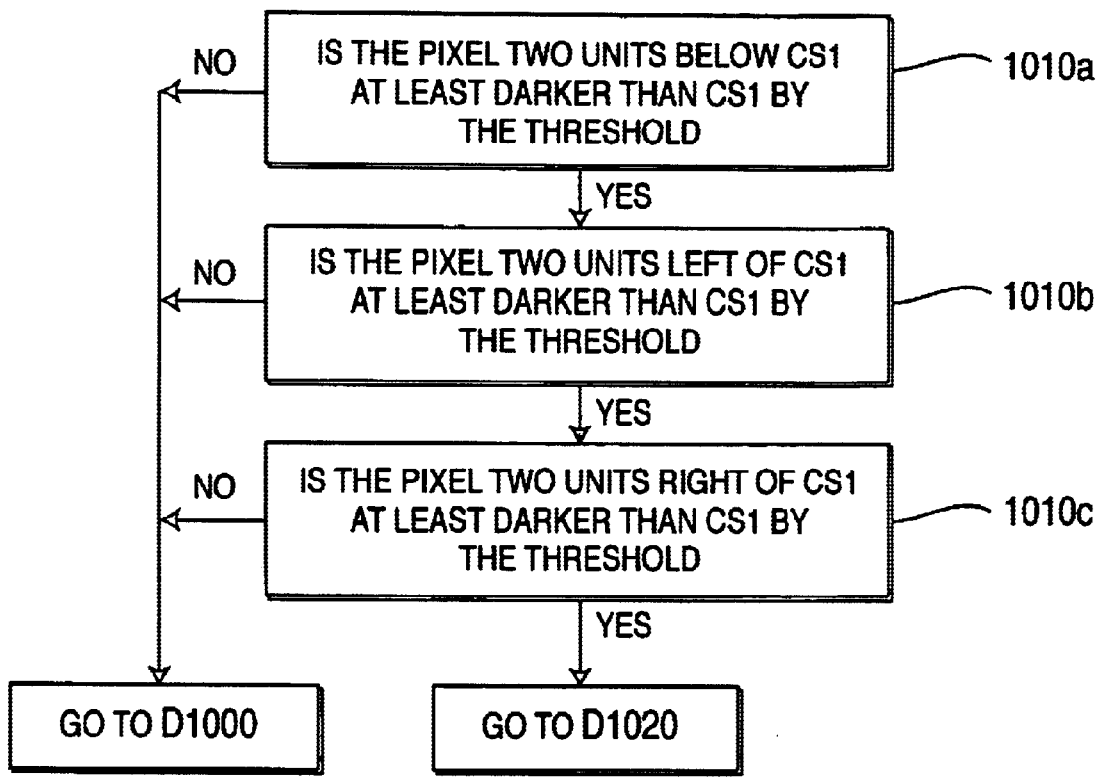

The nose process 2090 is described with reference to FIG. 18*f*. Steps 2090*a* through 2090*f* impose a minimum energy constraint before further processing in steps 2090*g* through 2090*l*. At step 2090*a*, a thresholded squared Y-Laplacian image Ty2 is produced and averaged. The thresholded squared Y-Laplacian image Ty2 is produced by squaring each of the values in the nose template 724 and eliminating the squared values below sixteen. Then the remaining squared thresholded Y-Laplacian values are averaged over the extent of the template. At step 2090*b*, it is determined whether the averaged value is greater than a threshold of, for example, 45. This process ensures that a minimum number of pixels in the Y-Laplacian image Ly have a magnitude greater than four. Pixels having values below four are not considered. At step 2090*c*, the nose template 724 is moved if the average value is less than the threshold. The nose template 724 is movable in both the horizontal and vertical directions. At step 2090*c* the nose template is allowed to move four pixels vertically on either side of the image now halfway between the two eyes, the first direction.

At step 2090*d*, the nose template position is stored if the average value is greater than the threshold. At step 2090*e*, if each of the positions of the nose template 724 has been processed, than processing passes to step 2090*f*. Otherwise, step 2090*c* is repeated. At step 2090*f*, if none of the nose templates 724 positions is stored and do not satisfy the minimum energy constraint, than processing passes to process 2075, shown in FIG. 18*b*.

Otherwise, at step 2090*g*, for each nose template 724 position that satisfies the initial nose energy criterion, the average Y-Laplacian energy and the average X-Laplacian energy is computed. In this implementation, this is done by averaging Ly×Ly and Lx×Lx, respectively, over the extent of the template. Other energy measures such as absolute value could also be used. At step 2090*gg*, if the Y-Laplacian energy is greater than a threshold, than step 2090*h* is implemented, otherwise step 2090*j* is implemented. At step 2090*h*, each of the average Y-Laplacian energies is compared to a corresponding average X-Laplacian energies for each stored template position. At step 2090*k*, the nose template position having the largest ratio of the average Y-Laplacian energy to the average X-Laplacian energy is selected. Steps 2090*g* through 2090*i* are repeated for each of the nose template 724 positions along a second direction moving horizontally towards and away from the user's eyes at positions corresponding to the stored nose templates 724.

At step 2090*i*, it is determined for the largest ratio whether the average Y-Laplacian energy is greater by a factor of Z than the average X-Laplacian energy. The factor Z is, for example, 1.2. The user's nose is expected to have a higher Y-Laplacian filtered image Ly response than an X-Laplacian filtered image Lx response because of the vertical orientation of the user's nose. In the oriented image, the x-direction extends from the user's chin through his nose to the top of his head.

Returning to FIGS. 18b and 18c, if none of the templates has a ratio greater than the factor Z, then processing passes to process 2075. Otherwise, at step 2090l, the template position having the largest ratio is selected as the position of the user's nose.

At step 2092, after each process 2075 through 2090, the positions of the templates are stored in a data structure keeping track of all template positions obtained. Steps 2075 through 2090 are repeated for different template positions. As a result, there may be more than one detected position for the user's eyes. At step 2005, after all of the pixels have been tested, it is determined if any eye positions have been stored at step 2092. If so, at step 2060, the detected positions are clustered to more accurately localize the position of the user's eyes.

The detected positions are clustered according to the following process. The positions within a certain radius are considered to belong to the same cluster. First, a center of the cluster is selected and each detected position is added to the cluster within a specified radius of the cluster. The specified radius is, for example, one fourth of the separation of the extreme ends of the two eye templates 720 and 722 (shown in FIG. 18d). New clusters are seeded and the process is repeated. The number of positions located within each cluster is stored in a database.

At step 2065, the position having the best coordinates is determined and stored for each cluster. The best coordinates are the coordinates that have x-coordinate closest to the user's mouth. In other words, the lowest point in an upright image. By using this measure, bad localization of the center of the user's eye caused by a large number of detections on the user's eyebrows when the eyebrows are close to the user's eyes is reduced. The y-coordinate is set to be the same as the center of the cluster. Finally, at step 2070, the location of the user's eye is selected as the "best coordinates" of the cluster that has the greatest number of members in the cluster. Alternatively, more than one, for example, three of the clusters having the greatest number of members may be stored for further processing.

Next, at step 2071, the WFOV corneal specularities detection process is implemented. Process 2071 refines the position estimated by the template-based eye finding algorithm. Such a refinement is important because the template-based algorithm, as described above, extracts eye coordinates in a reduced-resolution version of the WFOV image. This reduction in resolution means that the eye is not localized in the WFOV image as precisely as possible. Therefore, the WFOV corneal specularities detection process detects specularities on the cornea in the full-resolution WFOV image and uses these to refine the position of the template-extracted eye. Process 2071 is described below with regard to FIG. 18j. At step D1000, a pixel CS1 is selected from the WFOV image. Next, at step D1010, the corneal specularity CS1 coarse detection process is implemented. Process D1010 is described below with reference to FIG. 18k.

Process D1010 determines whether pixel CS1 is likely to be a small specularity of the user's eye. It does so by testing whether the pixel is brighter than its neighbors on three of its sides. Specifically, at step D1010a, it is determined whether the pixel two units below CS1 is at least darker than the selected pixel CS1 by a threshold. If not, processing passes to step D1000. Otherwise, at step D1010b, it is determined if the pixel two units to the left of the selected pixel CS1 is darker than the selected pixel by a threshold. If not, processing passes to step D1000. Otherwise, at step D1010c, it is determined if the pixel two units to the right of the selected pixel CS1 is darker than the selected pixel by a threshold. If so, processing passes to step D1020 shown in FIG. 18j.

In the preferred implementation, there are multiple bright illumination sources. Each of these sources produce a specularity on the user's cornea. Therefore, the corneal specularity detector searches for multiple specularities rather than just one to reduce the number of false detections. Furthermore, because of the known approximate orientation of the user's face in the WFOV imagery, and the knowledge of the position of the illuminators, the expected geometric configuration of the specularities is known and can be used to make the WFOV corneal specularity detector more selective. In the exemplary embodiment, there are two illuminators spaced horizontally, Therefore, the WFOV corneal specularity detector, after finding one potential specularity CS1, attempts to find a second specularity positioned below it.

Figure 18L:
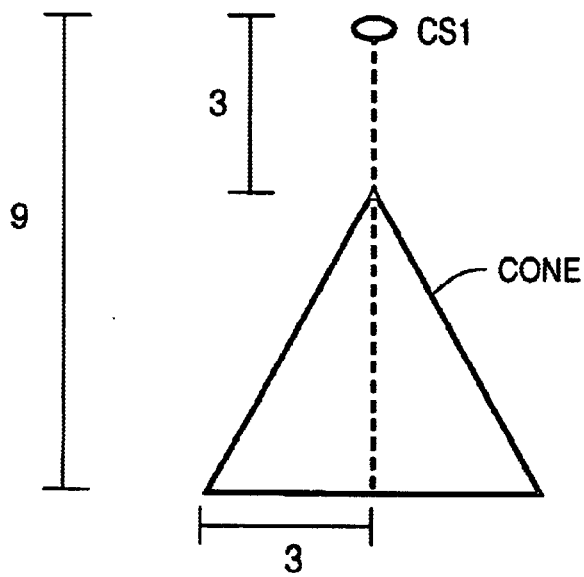
FIG. 18l is a drawing of a cone shaped search region for the specularity process.
Figure 18M:
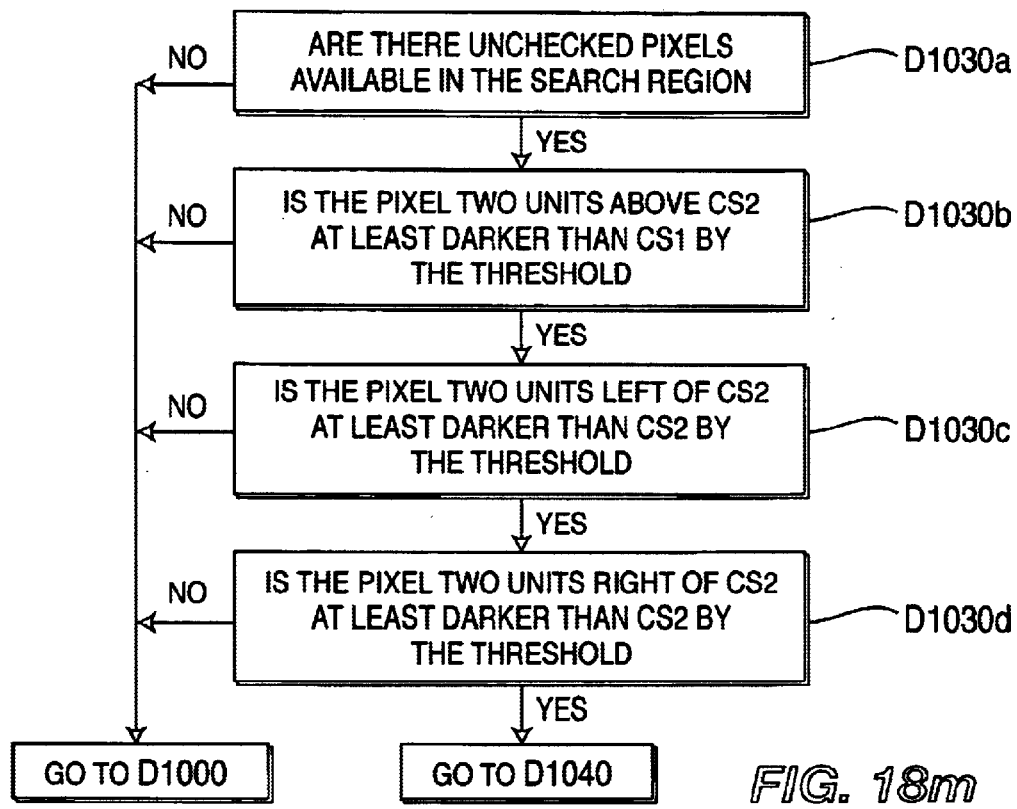
Figure 18N:
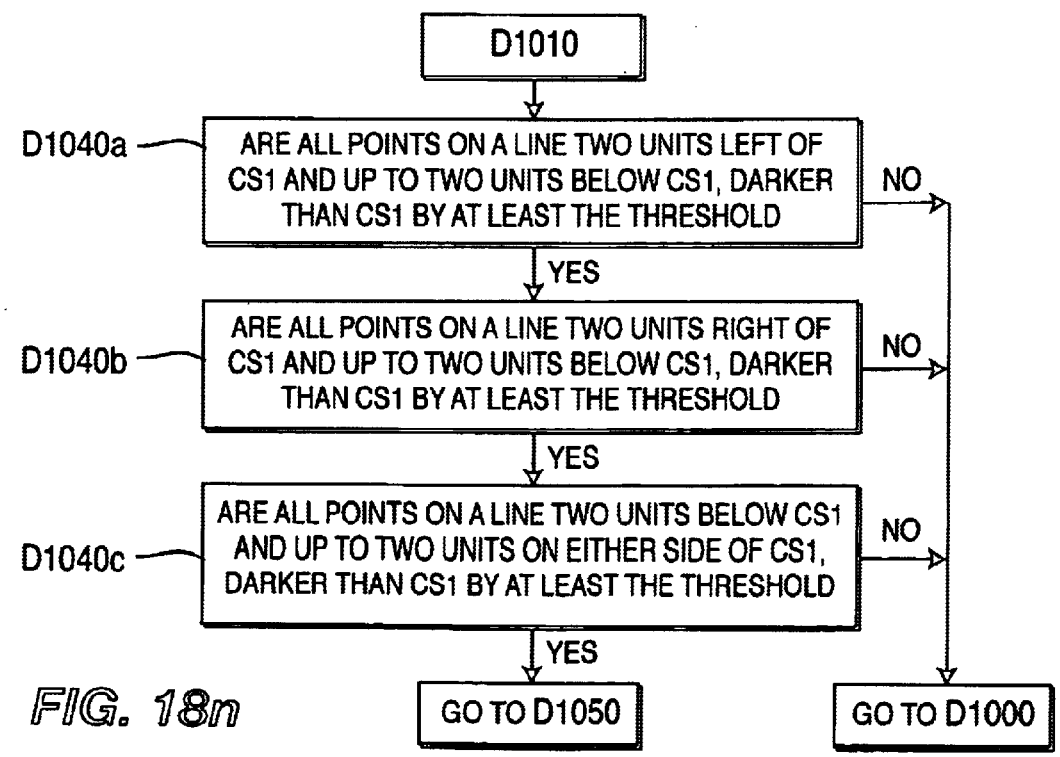

Specifically, at step D1020, a cone shaped search region is selected with respect to pixel CS1 for searching for another pixel CS2 that corresponds to a second specularity in the WFOV image. The cone shaped region CONE is shown in FIG. 18l. Next, at step D1030, the corneal specularity CS2 coarse detection process is implemented in the cone search region as described below with regard to FIG. 18m. At step D1030a, it is determined if there are any pixels in the cone shaped region remain to be processed. If not, step D1000 (shown in FIG. 18j) is repeated. Otherwise, at step D1030b, it is determined whether the pixel two units above CS2 is at least darker than the selected pixel CS2 by a threshold. If not, processing passes to step D1030a. Otherwise, at step D1030c, it is determined if the pixel two units to the left of the selected pixel CS2 is darker than the selected pixel CS2 by a threshold. If not, processing passes to step D1030a. Otherwise, at step D1010d, it is determined if the pixel two units to the right of the selected pixel CS2 is darker than the selected pixel CS2 by a threshold. If so, processing passes to step D1040 shown in FIG. 18j. Otherwise, step D1030a is repeated.

Figure 18O:
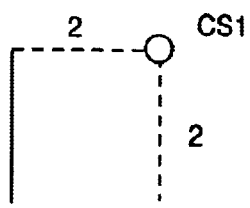
FIGS. 18o–18q and 18s–18u are diagrams useful for explaining the specularity detection process.
Figure 18P:
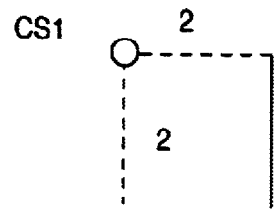
Figure 18Q:
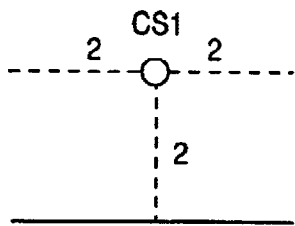

Processes D1040, D1050, and D1060 further verify that pixels CS1 and CS2 are corneal specularities, i.e. bright points rather than bright lines. Process D1040 is described below with reference to FIG. 18n. At step D1040a, it is determined whether all pixels on a line two units to the left of and up to two units below the pixel CS1 from the coarse detection process D1010 (shown in FIG. 18j) are darker than pixel CS1 by at least the threshold. The line is shown in FIG. 18o. If not, step D1000 (shown in FIG. 18j) is implemented. Otherwise, at step D1040b it is determined whether all pixels on a line two units to the right of and up to two units below the pixel CS1 are darker than pixel CS1 by at least the threshold. The line is shown in FIG. 18p. If not, step D1000 (shown in FIG. 18j) is implemented. Otherwise, at step D1040c it is determined whether all pixels on a line two units two units below and up to two unit on either side of the pixel CS1 are darker than pixel CS1 by at least the threshold. The line is shown in FIG. 18q. If not, step D1000 (shown in FIG. 18j) is implemented. Otherwise, the corneal specularity process for pixel CS2 D1050 is implemented.

Figure 18S:
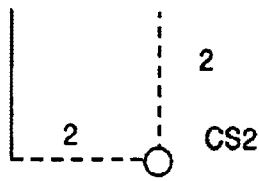
Figure 18T:
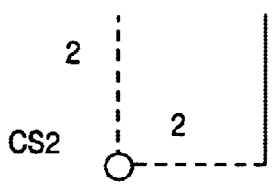
Figure 18U:
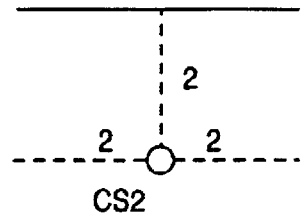
Figure 18R:
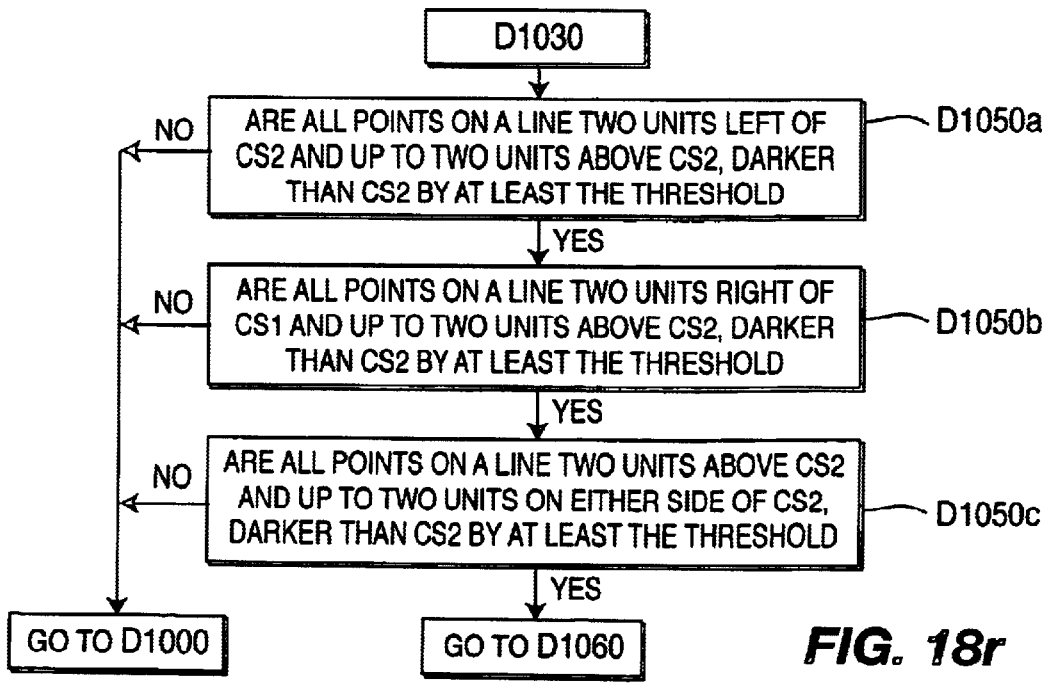

Process D1050 is described below with reference to FIG. 18r. At step D1050a, it is determined whether all pixels on a line two units to the left of and up to two units above the pixel CS2 from the coarse detection process D1020 (shown in FIG. 18*j*) are darker than pixel CS2 by at least the threshold. The line is shown in FIG. 18*s*. If not, step D1000 (shown in FIG. 18*j*) is implemented. Otherwise, at step D1050*b* it is determined whether all pixels on a line two units to the right of and up to two units above the pixel CS2 are darker than pixel CS2 by at least the threshold. The line is shown in FIG. 18*t*. If not, step D1000 (shown in FIG. 18*j*) is implemented. Otherwise, at step D1050*c* it is determined whether all pixels on a line two units two units above and up to two unit on either side of the pixel CS2 are darker than pixel CS2 by at least the threshold. The line is shown in FIG. 18*u*. If not, step D1000 (shown in FIG. 18*j*) is implemented. Otherwise, the corner process D1060 is implemented.

Many unwanted specularities come from the rims of glasses. In general these specularities lie on image structures that are linear or edge-like in a direction over the local image region. Specularities off the cornea however are usually isolated and form a corner type structure.

Corner process D1060 differentiates edges from corners. Consider the Matrix:

Ixx Ixy
Ixy Iyy where Ixx is the sum of Ix*Ix over a five by five region, Ixy is the sum of Ix*Iy over a five by five region, and where Iyy is the sum of Iy*Iy over a five by five region where the Ix and Iy are the image gradients in the horizontal and vertical edges computed by convolving with a (−1, 0, −1) filter. The determinant of this matrix is zero in two cases: (1) when there is no structure and (2) when there is linear image structure. When there is corner like structure then the determinant is large. The determinant is:

(Ixx*Iyy−Ixy*Ixy).

The corner process D1060 uses these principles and performs a corner detector process at all positions where specularities are detected by calculating determinants. Process D1060 rejects those specularities where the determinant is less than a threshold which suggests that the specularities lie on the rims of the glasses and not in the cornea.

Finally, at step D1070, location of the corneal specularities is selected as the positions of pixels CS1 and CS2.

Returning to FIG. 18*c*, at step 2072, if it is determined that the positions of the corneal specularities are near the "best coordinates" from step 2070, then at step 2073, the corneal specularities closest to the "best coordinates" are selected as the localization, i.e. positions, of the user's eyes. Thus, the "best coordinates" obtained from the template matching process that uses low resolution WFOV imagery, are refined by the WFOV corneal specularity detector that uses high resolution WFOV imagery. Otherwise, at step 2074, the "best coordinates" are selected as the localization, i.e. positions, of the user's eyes.

Returning to FIG. 18*b*, if it is determined at step 2005 that no eye positions are stored then processes 2010 through 2055 are implemented. Process 2010 selects a starting position in the image. Each time process 2010 is repeated, a new pixel in the image is selected to determine the location of the templates within the image. The eye energy process 2015 detects the user's eyes in the top and lower eye templates 720 and 722. The eye energy process is described below with reference to FIG. 18*g*.

At step 2015*a*, the average Laplacian value of the Laplacian image L in the top eye template is calculated. At step 2015*b*, it is determined whether the average Laplacian value is less than negative one which indicates the presence of the user's eye in the top eye template 720. The user's eye regions are expected to yield a negative Laplacian response because the eye regions are isolated dark blobs. Other spurious noise responses which could be detected are eliminated by averaging the Laplacian values over each of the eye templates 720 and 722. If the user's eye is not detected in the top eye template, another position is selected at step 2010 (shown in FIG. 18*b*).

Returning to FIG. 18*g*, at step 2015*c*, once the user's eye has been detected in the top eye template 722, the average Laplacian value of the Laplacian image L of the lower eye template is calculated. At step 2015*d*, it is determined whether the average Laplacian value is less than negative one which indicates the presence of the user's eye in the lower eye template 722. If the user's eye is not detected in the lower eye template, another position is selected at step 2010 (shown in FIG. 18*b*).

Returning to FIG. 18*g*, the lower eye template 722 is adjustable to allow a degree of freedom on either side of the position of the top eye template 720. This accounts for slight variations in the natural poses of the user's head. As a result, more than one possible position of the user's left eye may be detected. Step 2015*e* selects the lower eye templates 722 having an average Laplacian value less than negative 1. At step 2015*f*, if there are two or more selected lower eye templates 722, then the lower eye template that is positioned closest to a point directly below the position of the top eye template 720 is selected as the position of the user's left eye. The positions of the user's right and left eyes are stored in a database if they are detected in the upper and lower eye templates 720 and 722.

Returning to FIG. 18*b*, if the user's eyes are detected, then the cheek brightness process 2020 is performed. Because the user's cheeks are usually bright textureless regions, the cheek brightness process 2020 determines whether the cheek templates 728 and 730 have a minimum average brightness value. The average gray level value is calculated for each check template and compared to a brightness threshold. The brightness threshold for the upper check template 728 is, for example, forty five and the brightness threshold for the lower cheek template is, for example, 30. The average brightness value for the lower and the upper cheek templates 728 and 730 is different because the position of the rotated WFOV imagers 10 and 12 is closer to the user's right eye in the right eye or upper eye template 720 than to user's left eye in the left eye or lower eye template 722. Thus, the minimum average brightness value for the lower check template 730 is lowered.

If the cheek brightness process 2020 passes, then the cheek-eye brightness ratio process 2025 determines if the ratio of the left and right cheek templates 728 and 730 to the respective eye templates 720 and 722 exceed a threshold value. This process accounts for the fact that the user's cheeks are brighter than his eyes. Process 2025 is described below with reference to FIG. 18*h*. At step 2025*a*, the average gray level value for each of the eye templates 720 and 722 is calculated. At step 2025*b*, the average gray level value for each of the cheek templates 728 and 730 is calculated. Alternatively, step 2025*b* does not need to be performed if the average gray level calculated for the check templates at process 2020 is used. Next at step 2025*c*, it is determined if the average pixel value is greater than a threshold of, for example, 250. In very bright lighting, the cheek-eye ratio becomes smaller due to imager saturation. Thus, step 2025*c* determines if the lighting is very bright by determining if the average pixel value is above the threshold.

At steps 2025*d* and 2025*e*, if the lighting is bright, it is determined if the check-eye ratio value is greater than a CHEEKRATIO1 threshold of, for example, 1.25 for the right eye and cheek templates and greater than a CHEEKRATIO2 threshold of, for example, 1.1 for the left eye and cheek templates. At steps 2025f and 2025g, if the lighting is not bright, it is determined if the check-eye ratio value is greater than a CHEEKRATIO3 threshold of, for example, 1.4 for the right eye and cheek templates and greater than a CHEEKRATIO4 threshold of, for example, 1.2 for the left eye and cheek templates. If the check-eye ratio satisfies these criteria, process 2030 is performed. Otherwise, process 2010 is performed.

The bridge of the nose energy process 2030 determines if the average X-Laplacian energy (squared X-Laplacian value) of the mid-eye or bridge of the nose template 726 (shown in FIG. 18d) is at most, for example, half of the X-Laplacian energy of the eye template 720 or 722 that has lower X-Laplacian energy (shown in FIG. 18d). This process looks for a texture free region between the eyes. Hence, the bridge of the nose energy process 2030 is useful for eliminating false detection of eye pairs from the user's hair or other regions having high texture. As with the lower eye template 722, the mid-eye template 726 may be varied. The bridge of the nose energy process 2030 is described below with reference to FIG. 18i.

At step 2030a, the mid-eye template 726 is moved three pixels towards and away from the mouth template 732 and the average X-Laplacian energy is calculated for each position of the mid-eye template 726. At step 2030b, the mid-eye template that has the largest average X-Laplacian energy is selected. At step 2030c, the average X-Laplacian energy for each of the eye templates 720 and 722 are calculated. At step 2030d, if the largest average X-Laplacian energy of the selected mid-eye template is less than half the average X-Laplacian energy of the eye template 720 and 722 that has the lower average X-Laplacian energy of the two eye templates, then process 2035 is performed. Otherwise, process 2010 is implemented.

Returning to FIG. 18b, the bridge of the nose brightness process 2035 determines whether the brightness of each of the eye templates 720 and 722 (shown in FIG. 18c) is no greater than, for example, 0.8 times the brightness of the bridge of the nose template 726 (shown in FIG. 18c). The average gray level value is calculated for the bridge of the nose template 726 selected in step 2030b shown in FIG. 18i. The average gray level value may also be calculated when the average X-Laplacian values are calculated at step 2030a shown in FIG. 18i. The average gray level value is also calculated for each of the eye templates 720 and 722. Then, it is determined whether the average gray level value for each of the eye templates 720 and 722 is no greater than 0.8 times the average gray level value for the bridge of the nose template 726. If this criteria is satisfied, process 2040 is implemented. Otherwise, processing passes to process 2010.

The cheek energy process 2040 determines if the energy of level of the cheek templates is below a maximum. First, the Laplacian values for each of the cheek templates 728 and 720 (shown in FIG. 18c) are computed and squared. Then the average of the squared values is computed and it is determined if the average value is below a threshold value of, for example, 45. In the exemplary embodiment, given the placement of the light sources, the threshold for the upper cheek template 728 is 40 and the threshold for the lower cheek template 730 is 80. The threshold for the lower cheek template 730 is higher than the threshold for the upper cheek template 728 because of the reduced illumination in the area of the lower cheek template 728. If this criteria is satisfied, process 2045 is implemented. Otherwise, processing passes to process 2010.

The mouth process 2045 is the same process 2085. If the criteria of the mouth process 2045 is satisfied, process 2050 is implemented. Otherwise, processing passes to process 2010. The nose process 2050 is the same process 2090. The eye position coordinates are stored at step 2055.

At step 2094, if any eye positions are stored at step 2055, steps 2060 through 2074 are implemented as described above. Otherwise, as shown in FIG. 18v, the WFOV corneal specularities detector process 2096 is implemented. This is done because in certain situations, the template-based face finder may fail when, for example, the user is wearing a face mask covering the nose and the mouth. In such situations, the system falls back to an alternative scheme of WFOV eye-localization based on WFOV corneal specularities.

Process 2096 is the same as process 2071 described above. Next, at step 2098, the coordinates of the detected corneal specularities having the largest Y coordinate value is selected as the localization, the position of the user's eye. The corneal specularity having the largest Y coordinate value is most likely on the user's right eye.

Figure 28:
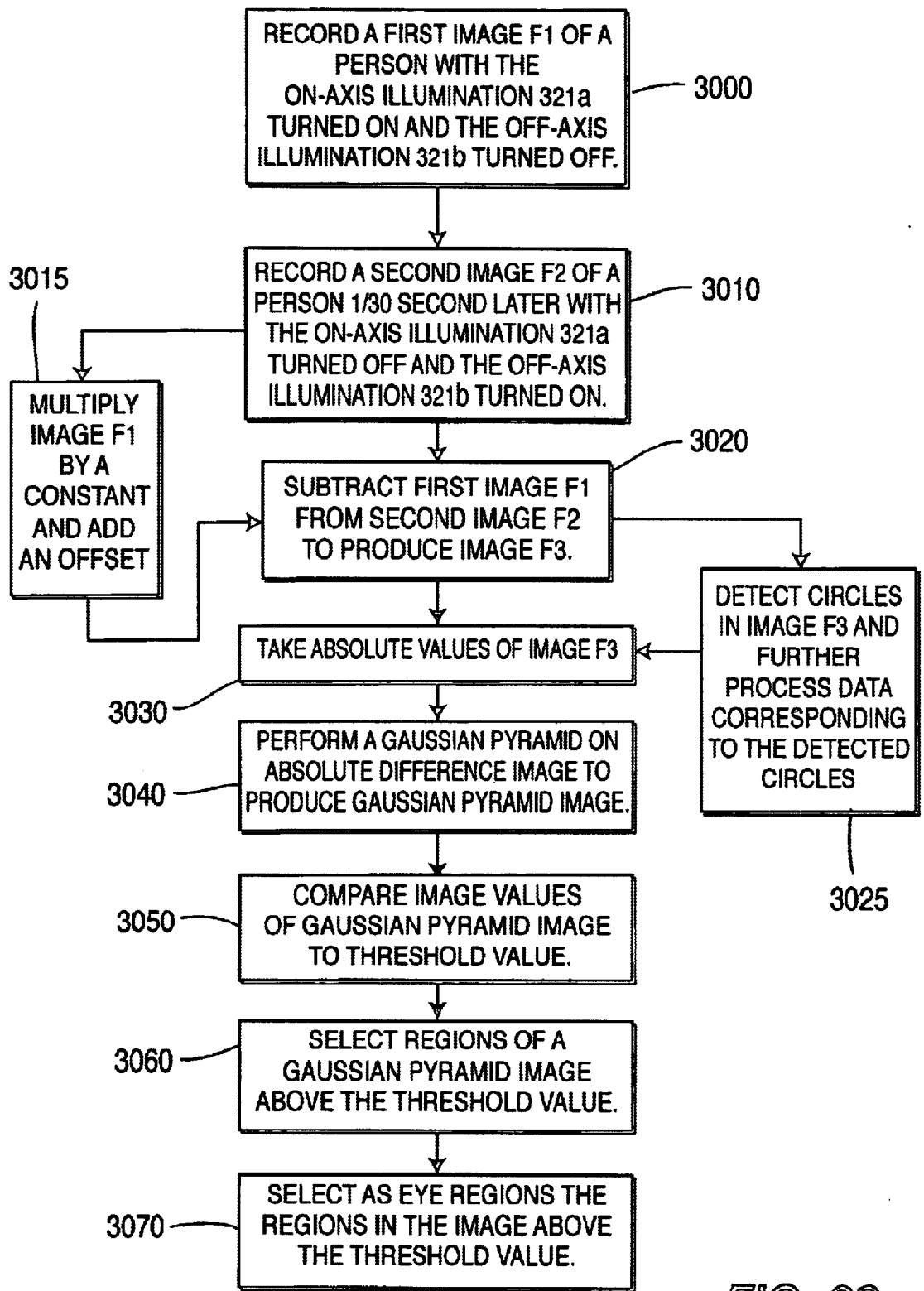
FIG. 28 is a flow chart which shows an exemplary method for detecting the user's eyes using reflection off the back of the eye and the occluding properties of the iris/pupil boundary.

FIG. 28 shows another process for detecting eyes using reflection off the back of the eye and the occluding property of the iris/pupil boundary. The problem is to uniquely locate the position of an eye in both WFOV imagery and NFOV imagery. An example of WFOV imagery in this context is when the head of a person occupies approximately ⅓ of the width of the image. An example of NFOV imagery in this context is when the iris in the eye occupies approximately ⅓ of the width of the image.

The procedure combines two constraints. The first constraint is that the retina reflects light directed towards it. This is popularly known as the "red-eye" effect in visible light. The second constraint uses the geometry of the eye. Particularly, the occluding property of the iris-pupil boundary is used. The "red-eye" effect occurs when light is directed through the pupil and reflected off the retina and straight back in the same direction as the illumination into an observing imager. The three dimensional geometry of the eye is such that if the illumination is placed slightly off-axis compared to the imager, the light is reflected off the retina onto the back of the iris rather than back through the pupil. As a result, no or little light is returned. Small changes in illumination direction cause relatively large changes in the response from the eye. Further, the geometry of other features in the image is usually such that small changes in illumination direction has very little impact on the illumination returned to the imager. This property is used to differentiate bright points from the "red-eye" effect from bright points elsewhere.

At step 3000, shown in FIG. 28, a first image F1 of a person is acquired using a imager with on-axis illumination 321a, shown in FIG. 5c, turned on and the off-axis illumination 321b, shown in FIG. 5c, turned off. At step 3010, a second image F2 of the person is recorded ⅓₀ second later with the on-axis illumination 321a turned off and the off-axis illumination 321b turned on. Next, at step 3015, the image F1 is multiplied by a constant and an offset is added to account for variations between the two images. At step 3020, the first image F1 is subtracted from the second Image F2 to produce image F3. At step 3025, a circle detecting procedure is implemented to detect portions of the image which may be the eye. A spoke detecting algorithm may be used. The detected portions of the image are then processed in the remaining steps of the procedure. At step 3030, the absolute value of Image F3, the remaining portions, is generated. At step 3040, a Gaussian pyramid of the absolute difference image is generated to produce a Gaussian pyramid image. At step 3050, the values in the Gaussian pyramid image are compared to a threshold value. At step 3060, the regions of the Gaussian pyramid image above the threshold value are selected. At step 3070, the selected regions in the image above the threshold value are designated as regions corresponding to the user's eye.

When the images are subtracted at step 3020 the pupil effect is increased. The pupil effect is strong with on axis illumination. There may be clutter in the image after the subtraction. The clutter may be removed using a ring of LEDs in a circle. The ring is off axis and circular to correspond to the shape of the pupil. For example, off axis LEDs at 0 degrees and every 90 degrees can be used to turn off and on separately and to obtain a difference image for each LED. Because the pupil is circular a bright difference image at the pupil is obtained for each difference images. For objects such as glass frames, the difference images will only be bright at one particular angle because glass frames are usually linear at least at the scale of the pupil. Thus, an illuminator such as an IR illuminator is used at each different off axis point in combination with ambient illumination. Each image acquired with a respective IR illuminator is subtracted from the image with ambient illumination. This produces a set of difference images.

If the difference images are obtained using LEDs at 0 degrees, 90 degrees, 180 degrees, and 270 degrees, four difference images are produced and the pupil appears as a bright difference at every angle in the four difference images and clutter in the images varies between each image. At some images it might be visible and in others it would not be visible. The change in all of the difference images is identified as clutter and the pupil is the area that does not change.

In order to obtain a clear, sharp image of the user's iris for the iris classification and comparison process 326 (shown in FIG. 3), it is desirable to have an accurate measurement of the distance between the NFOV imager and the user's eyes. If the Locate Head step 1512 (shown in FIG. 15) generated a range map in order to locate the head, then this range information is already known. If this method was not used, then the eye location process, described above with reference to FIGS. 15 through 18a can be used with a pair of stereoscopic images, provided by WFOV imagers 10 and 12, as shown in FIG. 19 to generate an accurate distance measurement. This is an exemplary implementation of the Find Range step 1414 of FIG. 14.

The first two steps in the process shown in FIG. 19, steps 1910 and 1912, separately process the right and left WFOV images, as described above with respect to FIGS. 15, 16, 17 and 18a, to locate the user's eyes in each image. Next, at step 1914, the X, Y coordinate positions of each eye in the two images are determined by the stereo module 316, shown in FIG. 3. Also at step 1914, the stereo module 316 calculates the angle from each imager to each of the eyes, based on the determined pairs of X, Y coordinates. Knowing these angles, the focal length of the lenses used in the WFOV imagers 10 and 12 and the distance between the imagers 10 and 12, the distance of each eye from each of the WFOV imagers can be calculated using simple trigonometry. Because the relative geometry of the WFOV imagers 10 and 12 and the NFOV imager 14 is known, this distance can easily be converted into a distance between each eye and the NFOV imager.

If the second WFOV imager 12 is not used but the user is alternately illuminated from the right and left by, for example, the light sources 126 and 128, a similar method may be used to determine the Z coordinate distance. This method differs from that outlined above in that the points being compared would not be the determined user eye positions but points corresponding to shadow boundaries (e.g. the shadows cast by the customer's nose) in the two images. Alternatively, the relative positions of the corresponding specular reflections in each of the eyes may be used to determine the Z coordinate distance between the NFOV imager and the user's eyes.

If none of the methods outlined above is used to determine the Z coordinate distance, the NFOV imager may still be able to obtain a sharp image of the eye using either conventional autofocus techniques or autofocus techniques that are tuned to characteristic features of the eye. In this instance, it may be desirable to provide the NFOV imager 14 with an approximate Z coordinate distance. In the exemplary embodiment of the invention, this approximate distance may be provided by the sonic rangefinder 332, shown in FIG. 3, as is well known.

Once the range or Z coordinate distance has been determined, the next step in the process shown in FIG. 14, step 1416, is to locate the iris using the NFOV imager 14. An exemplary process for implementing this step is shown in FIG. 20. The first step in this process, step 2010 is to adjust the pan and tilt mirror 16, shown in FIGS. 1, 2 and 3, to capture an image at the X, Y and at least approximate Z coordinates, determined by the preceding steps of FIG. 14. When the mirror 16 has been positioned, the specular light sources 126 and 128 are turned on and step 2012 is executed to obtain a low-resolution NFOV image. In the exemplary embodiment of the invention, this image has a resolution of 160 by 120 pixels. Next, at step 2014, this image is scanned for specularities to verify that the image contains an eye. If specularities are found, then the X, Y, Z coordinates of the center point of the specularities are marked as the new position of the eye. Next, at step 2016, the driver 320 changes the focus of the near field of view imager to determine if the image can be made sharper. Even for a imager 14 that has an autofocus feature, if the customer is wearing glasses, the imager 14 may focus on the glasses and may not be able to obtain a sharp image of the iris. Step 2016 compensates for corrective lenses and other focusing problems by changing the focal length of the imager 14 and monitoring the image for well defined textures, characteristic of the iris.

Figure 27:
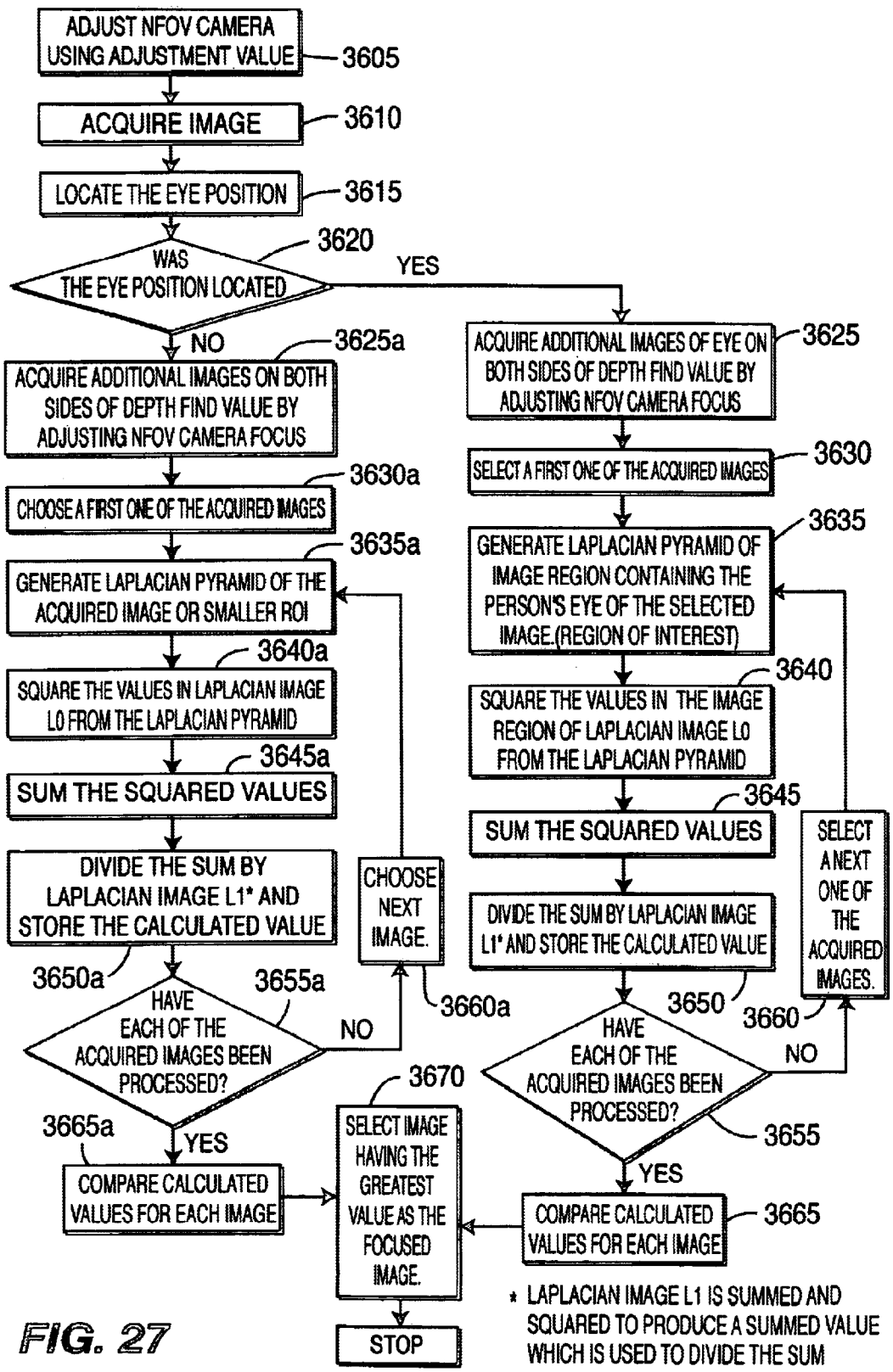
FIG. 27 is a flow chart which shows an exemplary method of autofocus for the NFOV imager.

One method for implementing autofocus is shown in FIG. 27. As is shown in FIG. 27, at step 3605, the NFOV imager is adjusted using the adjustment values. At step 3610, an image is acquired and, at step 3615, the system tries to identify the person's eye in the image. At step 3620, the process proceeds to step 3625 if it is determined that the person's eye was identified. If a person's eye is not identified in the image, the process proceeds to step 3625a.

At step 3625, additional images are acquired in front of and in back of the depth value. This is implemented by changing the focus of the NFOV imager 14 to a point greater than the depth value. The NFOV imager 14 is then moved from this focus to a focus on a point which is closer to the NFOV imager 14 than the depth value. As the NFOV imager 14 is moved from the farthest point to the nearest point in the range, the system acquires images at periodic intervals. For example, five image images may be acquired over the entire range.

In an alternative embodiment, the focus of the NFOV imager 14 can be adjusted to a point in the 3-D space on either side of the depth value. An image can be acquired at this point. Then the focus of the image, as described below, can be obtained. If the focus of the newly acquired image if better than the previously acquired image, then the focus of the NFOV imager 14 is adjusted in the same direction to determine if a more focused image can be acquired. If the newly acquired image is not in better focus than the previously acquired image, then the system proceeds in the opposite direction to determine if a better focused image can be obtained. The first embodiment is more advantageous than this embodiment because the delays required for readjusting the focus of the NFOV imager 14 can be avoided.

At step 3630, a first one of the acquired images are selected. A Laplacian pyramid of the image region containing the person's eye of the selected image is generated. At step 3640, the values in the Laplacian image L0 from the Laplacian pyramid are squared. Then, at step 3645 the squared values are summed. At step 3650 the summed values are divided by the values in Laplacian image L1. Prior to division, the values in Laplacian image L1 are squared and summed. The summed values of Laplacian image L1 are used to divide the summed values of Laplacian image L0. The calculated values are stored in a memory (not shown). At step 3655, it is determined if each of the acquired images has been processed. If each image has not been processed, at step 3660, the next one of the acquired images is selected and step 3635 is repeated. If all of the acquired images have been processed, the calculated values for each image are compared and, at step 3670, the image having the greatest calculated value is selected as the focused image.

The process performed by steps 3652A, 3630A, 3635A, 3640A, 3645A, 3650A, 3655A, and 3660A, are the same as the process described above with regard to steps 3625 to 3665 except that the image processing is performed over the entire obtained image because the person's eye was not identified. The processing performed in steps 3625 to 3665 is performed for the region which includes the user's eye.

Next, at step 2018, the iris preprocessor 324 determines whether specularities were found at step 2014. If specularities were not found, it may be because the image was not in focus. Accordingly, at step 2020, the process determines if step 2014 was executed before the image was focused. If so, then control is transferred to step 2014 to try once again to find specularities. If, after two tries, no specularities are found at step 2014, step 2020 transfers control to step 2022 which attempts to find an eye in the image by locating eye-specific features. One possible implementation of step 2022 is to use the circle finder algorithm described below with reference to FIGS. 22a and 22b. Another implementation may be to search the low-resolution NFOV image for a dark central area surrounded by a brighter area in much the same way as described above with reference to FIG. 17. Step 2022 selects the X, Y, Z coordinates for the eye from the best candidate possible eye that it locates.

After step 2022 or after step 2018 if specularities were found in the image, step 2024 is executed to correct the image for pan and tilt distortion. This step also centers the NFOV image at the determined X, Y coordinate position. The step 2024 warps the near field of view image according to a rotational transformation in order to compensate for rotational distortion introduced by the pan and tilt mirror 16. Because the NFOV image is captured using a mirror which may be tilted relative to the imager, the image may exhibit rotational distortion. The iris preprocessor 324 may compensate for this rotational distortion by warping the image. Since the two tilt angles of the pan and tilt mirror 16 are known, the warp needed to correct for this distortion is also known. While the warp transformations can be calculated mathematically, it may be simpler to empirically calibrate the warp transformations for the pan and tilt mirror prior to calibrating the X, Y, Z coordinate mapping between the WFOV image and the NFOV image.

Figure 21:
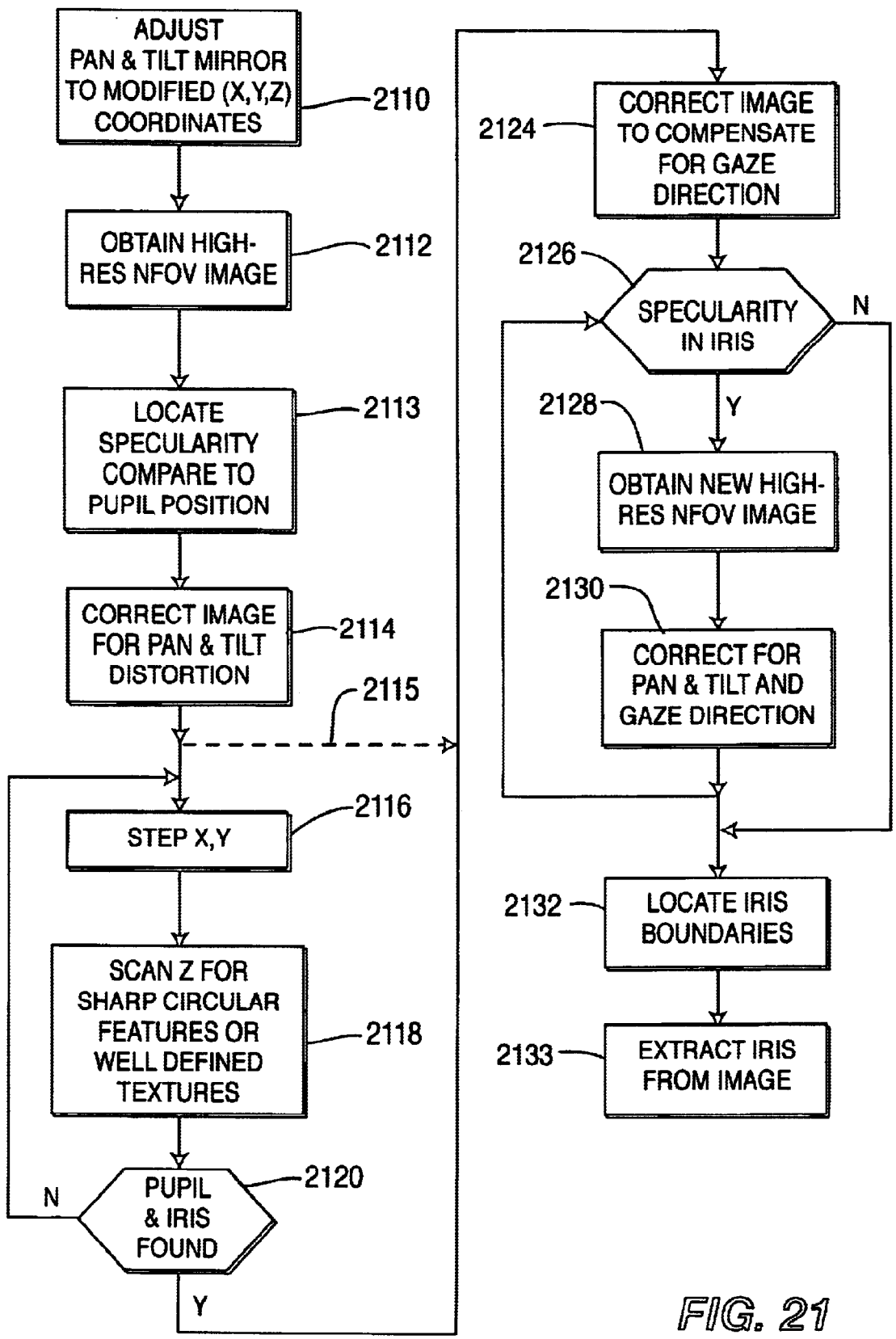
FIG. 21 is a flow chart which shows an exemplary method of implementing the obtain high quality image block of the flow chart shown in FIG. 14.

FIG. 21 is a flow chart of a process suitable for implementing the Obtain High Quality Image step 1418 of FIG. 14. As indicated by the dashed-line arrow 2115, a portion of this process is optional. The portion of the process bridged by the arrow 2115 performs much the same function as the focusing process described above with reference to FIG. 20. This process, however, operates on the high-resolution image. The focusing method illustrated by steps 2116, 2118 and 2120 may produce better results than a conventional autofocus algorithm for users who wear glasses. The focusing techniques described above may focus on the front of the glasses instead on eye features. The eye-specific autofocus algorithm, however, focuses on the eye even through many types of corrective lenses. This process may replace or augment the focusing process described above with reference to FIG. 20.

The first step in this process, step 2110, adjusts the pan and tilt mirror 16 for the modified X, Y, Z coordinates, determined by the process shown in FIG. 20. Next, at step 2112, the iris preprocessor 324 obtains a high-resolution image. In the exemplary embodiment of the invention, this is a 640 pixel by 480 pixel image. At step 2113, this image is scanned for specular reflections. The specular reflections are used both to confirm that the image contains an eye and, as described below, to determine gaze direction.

The specular reflections detected at step 2113 may confirmed by using a number of checks. The first check is to calculate the difference in brightness or brightness ratio between the candidate point and a point at a distance D (e.g. 10 pixel positions) to the left, above and below the candidate point. If the candidate point is brighter by at least a threshold value than all of these points, then a search is performed for the second specularity. The search region can be determined by the physical separation of the lights, the distance between the customer and the lights and the nominal radius of curvature of the eye. If a second candidate specularity is found, then it is compared in brightness to its surrounding pixels. If this threshold test is passed then the specularity has been detected. The above description assumes that the specular reflections are generated by light sources which do not have any characteristic shape. If shaped light sources are used, such as the sources 126 and 128, shown in FIG. 1c, an additional comparison may be made by correlating to the shapes of the reflections.

Figure 21A:
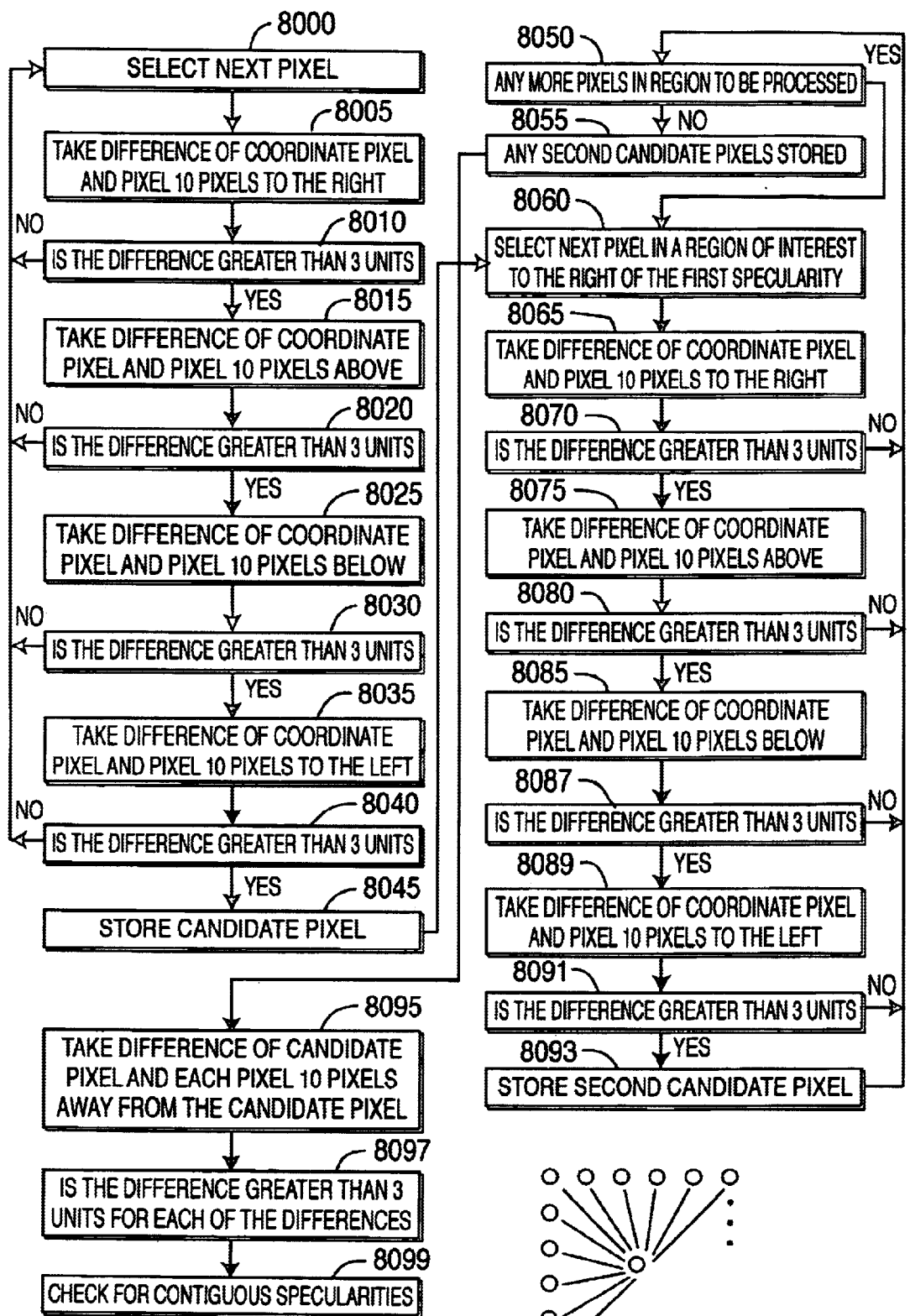
FIG. 21a is a flow chart for describing the detection of specularities in the NFOV imagery.
Figure 21B:
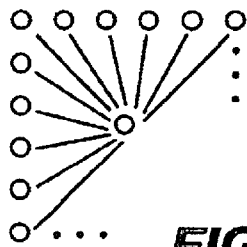
FIG. 21b is a diagram useful for illustrating the process of FIG. 21.

FIGS. 21a and 21b illustrate an alternative process for locating specularities in the NFOV imagery. Steps 8000 through 8045 are a process for locating a specularity in the NFOV imagery. At each step 8005, 8015, 8025, and 8035 a difference between a candidate pixel and a pixel ten pixels to the top, left, right or below of the candidate pixel is obtained. At steps 8010, 8020, 8030, and 8040, it is determined whether the candidate pixel is greater than 3 units of those pixels using the difference. If so, the candidate pixel is stored at step 8045 and a search is conducted to locate another specularity in a specified region to the right of the stored candidate pixel as determined at step 8060. A similar process is repeated for the pixels in the specified region in steps 8065 through 9093 as were performed in steps 8000 through 8045. Once candidate pixels have been obtained, the candidate pixels are verified in steps 8095 through 8099 to determine whether the stored candidate pixels are specularities. At step 8095, a difference is obtained between the candidate pixels and each pixel ten pixels away from the candidate pixel as shown in FIG. 21b. At step 8097, it is then determined whether each of the candidate pixel is greater than each of the pixels by three units using the difference. If so, at step 8099, it is determined whether the pixels which passed the above steps form at least a two by two pixel group of the candidate pixels that have passed the steps above to verify that the candidates pixels are specularities.

Next, at step 2114, the image is corrected for rotational distortion introduced by the pan and tilt mirror 16. At step 2116, the boundaries of the high-resolution image are stepped in the X and Y directions and at step 2118, the stepped image is scanned for sharp circular features. This step may be implemented using a circle finder algorithm, such as that described below with reference to FIGS. 22a and 22b and stepping the focus of the NFOV imager when circular features are found to determine if they can be made sharper. Alternatively, or in conjunction with the circle finder algorithm, step 2118 may change the focus of the near field of view imager 14 to achieve the best image textures. If the image was properly centered when the low-resolution near field of view image was processed, the main source of textures is the customer's iris. Until step 2120 indicates that a sharp pupil and/or textured iris have been found, step 2120 transfers control back to step 2116 to continue the search for the eye.

If the steps 2116, 2118 and 2120 are bypassed as indicated by the dashed-line arrow 2115, then the pupil and iris locations determined by the method described above with reference to FIG. 20 are translated from the low-resolution NFOV image to the high-resolution NFOV image and used by the steps that follow. Otherwise the locations determined at steps 2118 and 2120 are used.

At step 2124, the position of the specular reflection found at step 2113 is compared to the position of the pupil, as determined as step 2118. If the X, Y, Z coordinate position of the eye is known, then the position of the specularity, relative to the pupil or iris boundary when the customer is looking directly at the NFOV imager 14 is also known. Any displacement from this position indicates that the customer is not looking at the NFOV imager and, thus, that the image of the iris may be rotationally warped compared to the image that would be most desirable to pass to the classification and comparison process 326 (shown in FIG. 3). The warping needed to correct the image of the iris is uniquely determined by a vector between the desired position of the specular reflection and its actual position in the image. At step 2124, this vector is determined and the image is warped to correct for any rotational distortion caused by the customer not looking directly at the NFOV imager. The type and magnitude of this warping can be determined in the same way as the warping used to correct for rotational distortion caused by the pan and tilt mirror 16.

Alternatively, any rotational distortion of the image caused by gaze direction can be determined directly from the shape of the iris. If the iris is determined to be oval the correction needed to make it circular can be determined and applied using well-known techniques.

The next step in the process, step 2126, determines if the specularity in the NFOV image obscures too great a portion of the iris for accurate recognition. If so, it may be desirable to obtain a new high resolution image with the light sources 126 and/or 128 turned off. To ensure proper alignment, this image may be captured as a matter of course immediately after the image which includes the specular reflection but not analyzed until it is determined that is desirable to do so.

If a new image is obtained at step 2128, step 2130 is executed to correct for the pan and tilt and gaze direction rotational distortions. Steps 2126, 2128, and 2130 are performed iteratively. Once these steps have been executed, the normalized image may be processed once again using the circle finder algorithm to locate the iris boundaries. These include the limbic boundary between the iris and the cornea, the pupil boundary between the iris and the pupil and the eyelid boundaries which may obscure portions of the top and bottom of the iris details of the process used to implement this step are described below with reference to FIG. 23. At step 2133, once the iris boundaries in the image have been determined, that portion of the image corresponding only to the customer's iris are extracted and passed to the iris classification and comparison process 326.

Figure 22A:
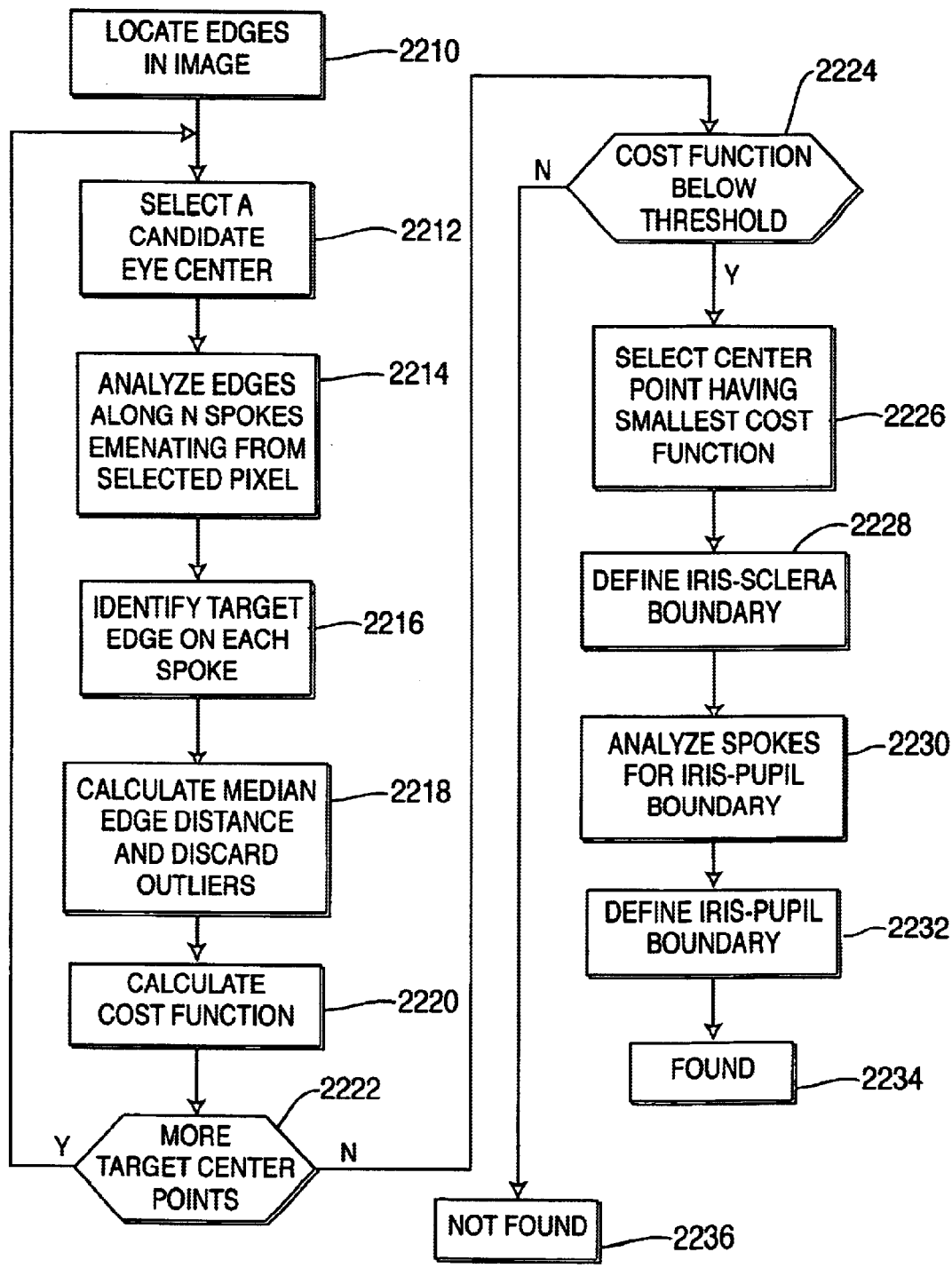
FIG. 22a is a flow chart which shows an exemplary method of implementing the circle finder step of the flow chart shown in FIGS. 20 and 21.

FIG. 22a is a flow chart which shows an exemplary implementation of the circle finder process used in the processes shown in FIGS. 20 and 21. Briefly, this process sequentially selects points in the image as target center points of the eye. It then determines a cost function for edge information of image pixels lying along spokes emanating from the target center point. The center point having the lowest cost function is designated as the center point of the iris.

The first step in the process, step 2210, is to locate edges in the image of the eye. This step may use any of a number of edge finder algorithms. In the exemplary embodiment of the invention, the image of the eye is first low-pass filtered to reduce noise using, for example, the Gaussian image produced by a pyramid processor. Next, a three-tap FIR filter, having weighting coefficients (−1, 0 and 1) is used to locate vertical edges by scanning the horizontal lines through the filter. As a last edge detection step, the same filter is applied to the vertical columns of the image to locate horizontal edges.

Figure 22B:
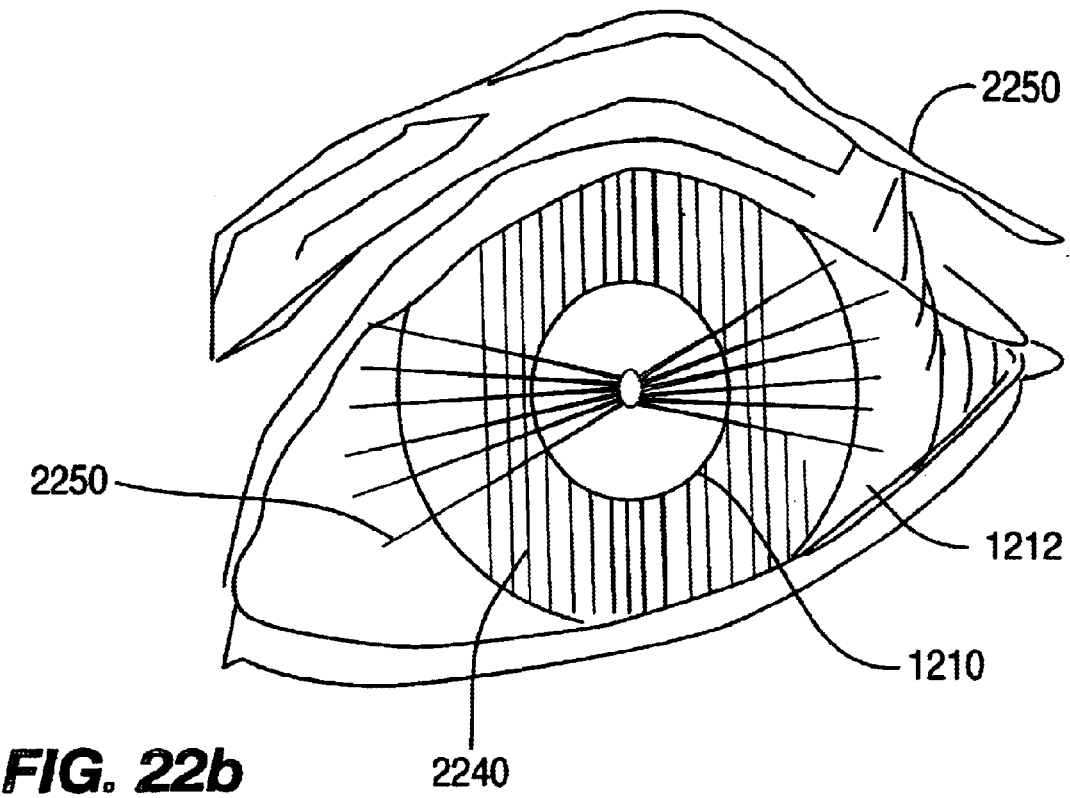

After step 2110, step 2212 and the steps which follow it select a pixel that is not an edge pixel and calculate a cost function for edges located along 12 spokes emanating from the selected point. This operation is illustrated in FIG. 22b. As shown in the FIG. 22b, the selected center point is the point 2240. Twelve spokes 2250 are defined as emanating from that point. The spokes are biased in the horizontal direction because the circular boundaries of the iris in the vertical direction may be occluded by the eyelid. In the exemplary embodiment of the invention, the spokes are separated by a ten degree angle. Due to the difference in luminance level, it is expected that the iris-sclera boundary is characterized by relatively well-defined edges. The starting and ending points of the spokes are selected using prior knowledge of the expected radius of the iris.

At step 2214, along each spoke, the edge having a magnitude that is greater than a threshold value and an orientation that matches most closely the predicted edge orientation (given by the spoke angle) is selected as the candidate iris/sclera boundary. This step is performed for each spoke at step 2216. Then, at step 2218, for all of the edges, the median distance from the candidate center point is calculated. Also at step 2218, selected edges that have a distance much greater than this calculated distance are discarded as being outliers caused, for example, by specularities in the eye. At step 2220, a cost is calculated for the remaining edges. This cost is the sum of the absolute difference between the predicted edge orientation and the measured orientation, multiplied by a normalization factor and added to the sum of the absolute difference between the median radius and the measured radius, multiplied by a normalization factor. At step 2222 this process is repeated for all candidate center pixels. For a prefect circle, this cost is zero.

At step 2224, the process determines whether any of the possible center points has a cost value that is less than a threshold value. This threshold value may be determined objectively as a low expected edge strength value for the iris-sclera boundary or it may be determined subjectively from data that was captured for the customer when her iris was first registered with the system. If no cost value is found to be below the threshold value, the process is unsuccessful in finding the iris. If the circle finder is invoked at step 2118 of FIG. 21, this is an expected possible outcome. If it is invoked at step 2132, however, the "not found" response indicates that the iris location process has been unsuccessful. In this instance, the control process 310 may attempt to retry the process or may use other means of verifying the identity of the customer.

At step 2226, the minimum cost of any of the candidate center pixels is selected if more than one cost value is below a predetermined threshold. Once a candidate center point is determined, then at step 2228, the iris-sclera boundary is defined for the image, at step 2230, the pixels lying along the spokes are analyzed once again to detect the iris-pupil boundary and that boundary is defined at step 2232. After step 2232, step 2234 is executed to notify the process which invoked the circle finder algorithm that an eye had been successfully located.

Figure 23:
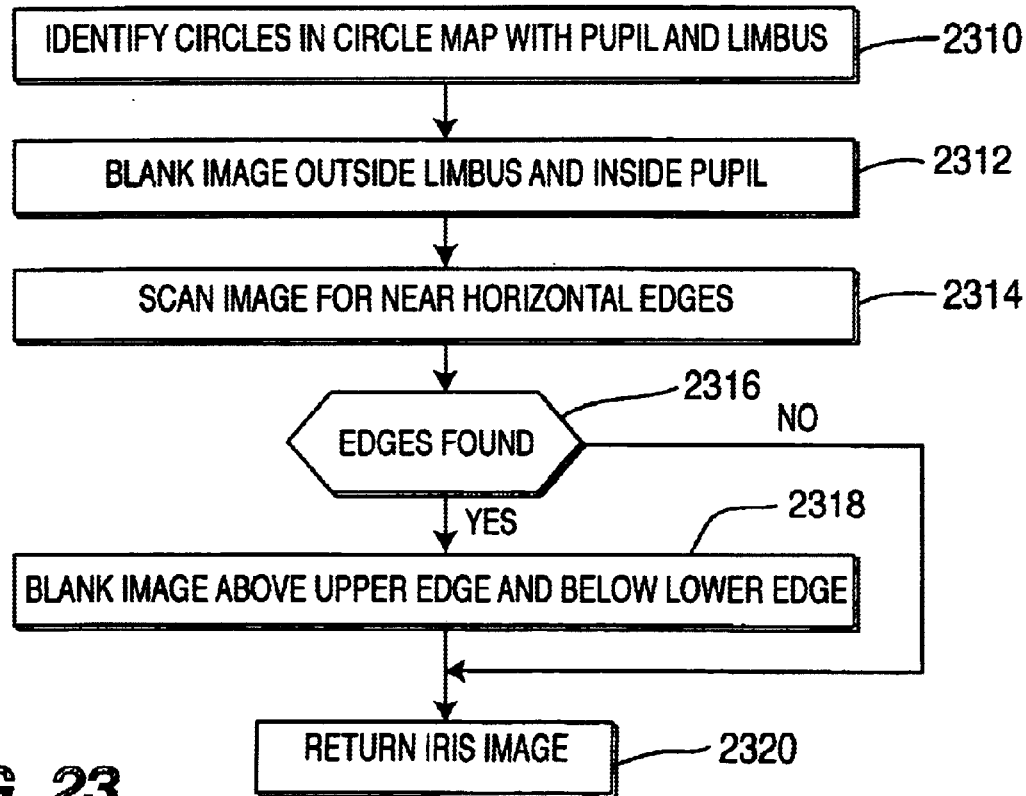
FIG. 23 is a flow chart which shows an exemplary method for implementing the extract iris step of the flow chart shown in FIG. 21.

The last step in extracting the iris is to eliminate pixels corresponding to the eyelids. An exemplary process for implementing this step is shown in FIG. 23. The first step in this process, step 2310, identifies the image area between the iris-sclera boundary and the iris-pupil boundary. Next, at step 2312, the high-resolution image outside of the iris-sclera boundary and inside the iris-pupil boundary are blanked. This image is then analyzed at step 2314 for horizontal and near horizontal edges. An exemplary algorithm for finding edges with a particular orientation is Fisher's Linear Discriminate which is described in section 4.10 of a textbook by R. O. Duda et al. entitled Pattern Classification and Scene Analysis, Wiley Interscience, 1974, pp. 114–18. As described above, this step is optional, depending on the iris recognition algorithm that is used.

If, at step 2316, horizontal or near-horizontal edges are found in the partially blanked image then, at step 2318, the image is blanked above and below the edges. This blanked image includes only components of the customer's iris. It is this image which is passed to the classification and comparison process 326.

In the exemplary embodiment of the invention, the classification and comparison process 326 is the IrisScan process developed by IrisScan Inc. and described in U.S. Pat. No. 4,641,349 entitled IRIS RECOGNITION SYSTEM and U.S. Pat. No. 5,291,560 entitled BIOMETRIC PERSONAL IDENTIFICATION SYSTEM BASED ON IRIS ANALYSIS, which are hereby incorporated by reference for their teachings on iris recognition systems. It is contemplated, however that other iris recognition systems could be used. One exemplary system may be implemented using spatial subband filters. These filters would be applied to a central band of the extracted iris image to generate multiple spatial frequency spectra, each corresponding to a separate subband. A comparison with the image would include generating a similar set of subband frequency spectra for the customer's eye from the high-resolution image and comparing the various frequency spectra to determine the likelihood that the iris being imaged has the same characteristics as are stored in the customer database. Alternatively or in addition, respective subband images of the scanned iris and the stored may be correlated to determine the likelihood of a match.

FIGS. 33 through 44 illustrate other exemplary embodiment of the invention where the processes described above are implemented using pipelined image processing circuitry.

The pipelined image processing processes implemented using the circuitry shown in FIGS. 33 through 44 and particularly the pyramid processor are described in U.S. Pat. No. 5,561,617 entitled PYRAMID PROCESSOR INTEGRATED CIRCUIT by van der Wal, and U.S. Pat. No. 5,539,674 entitle PYRAMID PROCESSOR INTEGRATED CIRCUIT by van der Wal and PARALLEL-PIPELINED IMAGE PROCESSING SYSTEM, U.S. patent application Ser. No. 08/606,171, filed Feb. 23, 1996, each of which is incorporated herein by reference. These patents teach the implementation of an ALU with a SRAM, 16-bit and 8-bit LUTs, storing, transposing, and transforming images using an ALU and LUT.

Figure 33:
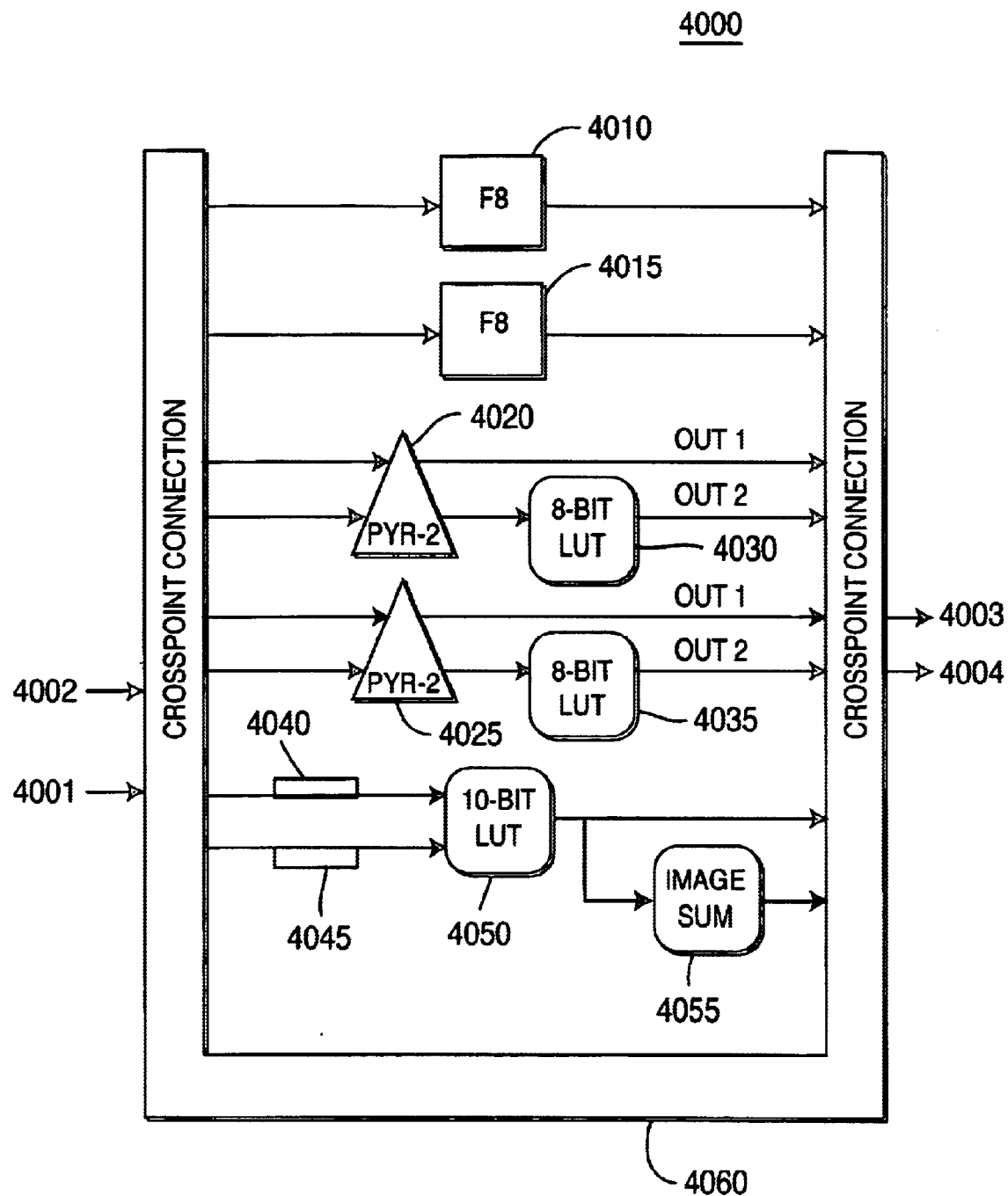
FIG. 33 is a block diagram of WFOV circuitry 4000 according to an alternative embodiment of the invention for performing the image processing operations associated with the WFOV images.

FIG. 33 is a block diagram of the WFOV circuitry 4000. The WFOV circuitry is tailored to perform stereo and template matching using the WFOV images from the WFOV imagers 10 and 12 (shown in FIG. 1c). In addition to the circuitry shown in FIG. 33, at least one processor is provided to control the WFOV circuitry 4000 and to perform processing operations that cannot be efficiently mapped into hardware. The processor may be one of the processors shown in FIG. 44.

The WFOV circuitry includes two frame stores 4010 and 4015, two pyramid processors 4020 and 4025 which may be, for example, PYR-2 Processors made by David Sarnoff Research Laboratories Inc., coupled to 8-bit single image look-up tables (LUTs) 4030 and 4035, and a pair of image delay lines 4040 and 4045 coupled to a 16-bit LUT 4050 for two image operations. The 16-bit LUT 4050 provides functional transformations of pairs of images. The 16-bit LUT 4050 is, for example, two 128K×8 SRAMs which can be upgraded to 512K×8 SRAMs.

Also included is an image sum mixing circuit 4055 coupled to LUT 4050 for integrating images over their entire extent. The image sum mixing circuit 4055 is used to accumulate the total of the pixel intensity values of an image. The sum can be accessed after an interrupt from a frame store controller 4010 and 4015 indicating that the frame store retrieval operation described below is complete, or through polling the status of the image sum 4015. In addition, a pyramid processor (not shown) could be provided for additional filtering operations.

Each pyramid processor 4020 and 4025 may receive two video data inputs and produce two video outputs OUT1 and OUT2. The first output OUT1 provides as an output Gaussian images while the second output OUT2 provides Laplacian images through a LUT 4030 and 4035 before reaching the crosspoint switch 4060. The LUTs 4030 and 4035 are 32K×8 RAMs. Alternatively, 8K×8 SRAMs may be used instead of the SRAMs. LUTs 4030 and 4035 provide mapping of video data output OUT2. The LUTs 4030 and 4035 are separated into 128 (or 32 with 8K×8 SRAM) functions of 256 bytes each.

Each pyramid processor 4020 and 4025 includes sixteen control registers (not shown). These registers are used to program the functionality of the pyramid processors 4020 and 4025. The LUTs 4030, and 4035 are programmed using registers of the pyramid processors 4020 and 4025.

Each of these components is interconnected with the crosspoint switch 4060 which routes image information between the frame store controllers 4010 and 4015, pyramid processors 4020 and 4025, 16-bit LUT 4050, image sum 4055, external input terminals 4001 and 4002 and external output terminals 4003 and 4004. The circuitry is configured to accept input signals having imbedded timing signals. These timing signals are propagated through the circuitry with compensating delays to match the delays of the data signals. These propagated timing signals are imbedded in the output signals.

Figure 33A:
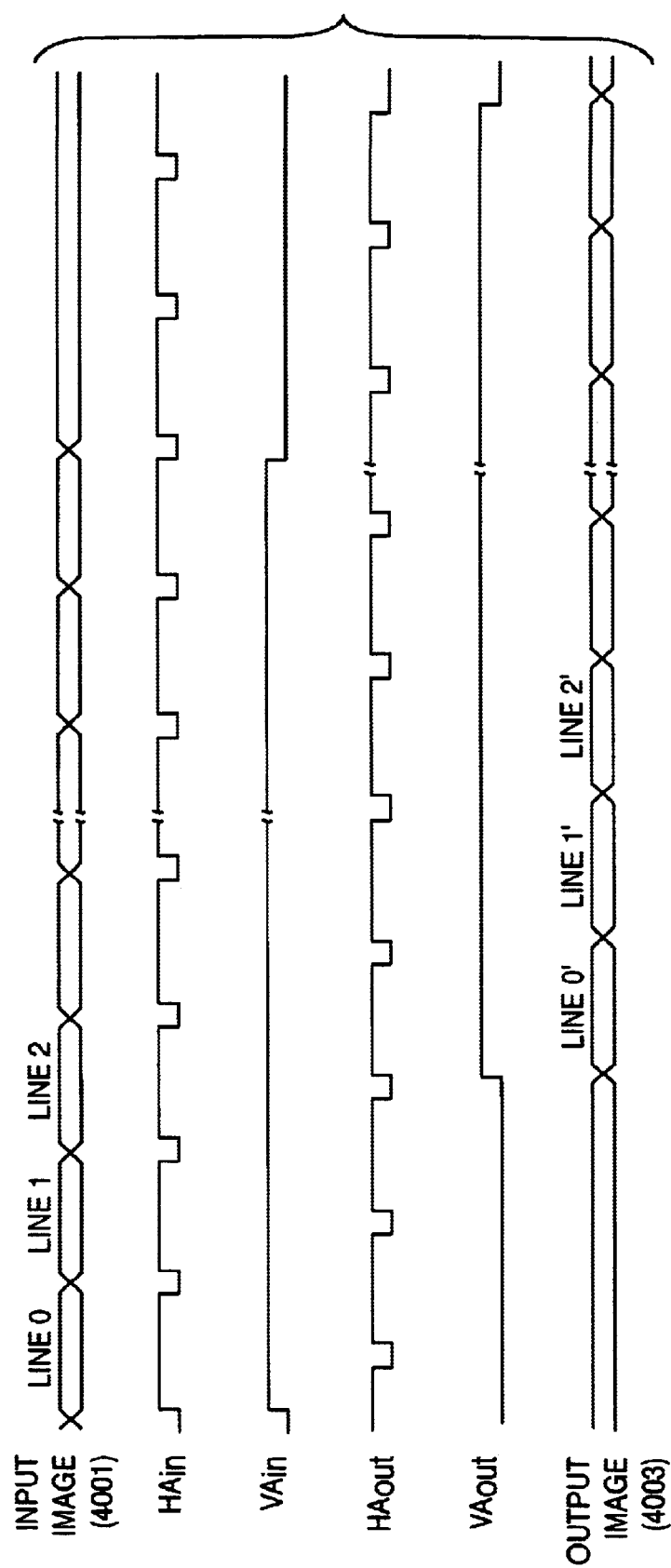
FIG. 33a is a timing diagram that is useful for illustrating the operation of the WFOV circuitry shown in FIG. 33.

Two timing bits convey respective timing signals. One signal, HA, is in a logic high state when the data in a line is valid (i.e. during the active picture interval) and in a logic low state otherwise (i.e. during the horizontal blanking interval). The other signal, VA, is in a logic high state when the data in a frame is valid and in a logic low state otherwise (i.e. during the vertical blanking interval). FIG. 33a is a timing diagram which illustrates the relative timing of the signal provided to terminal 4001 and the signal provided from output terminal 4003, and the signals HA and VA for those signals. The exemplary operation shown in this timing diagram delays the output signal by approximately two line intervals with respect to the input signal. Alternatively, internal delays or external delays may be used. For example, the frame stores may be used to implement delays.

The crosspoint switch 4060 is a centralized non-blocking crosspoint switch having eight crosspoint connections. Crosspoint switch 4060 encodes channels of image data along with timing information to enable multiple channels of image information to be processed without interference. Crosspoint switch 4060 is used to route image data between frame store controllers 4010 and 4015, pyramid processors 4020 and 4025, 8-bit LUTs 4030 and 4035, 16-bit LUT 4050, Image sum 4055, and input terminals 4001 and 4002 and the output terminals 4003 and 4004.

The input data signals and the output data signals of frame store controllers 4010 and 4020 are connected directly to crosspoint switch 4060 which routes the image data between frame store controllers 4010 and 4015 and the other circuitry connected to crosspoint switch 4060. The frame store controllers 4010 and 4015 resample image data signals during image read and store operations and execute read and store operations simultaneously.

Figure 33B:
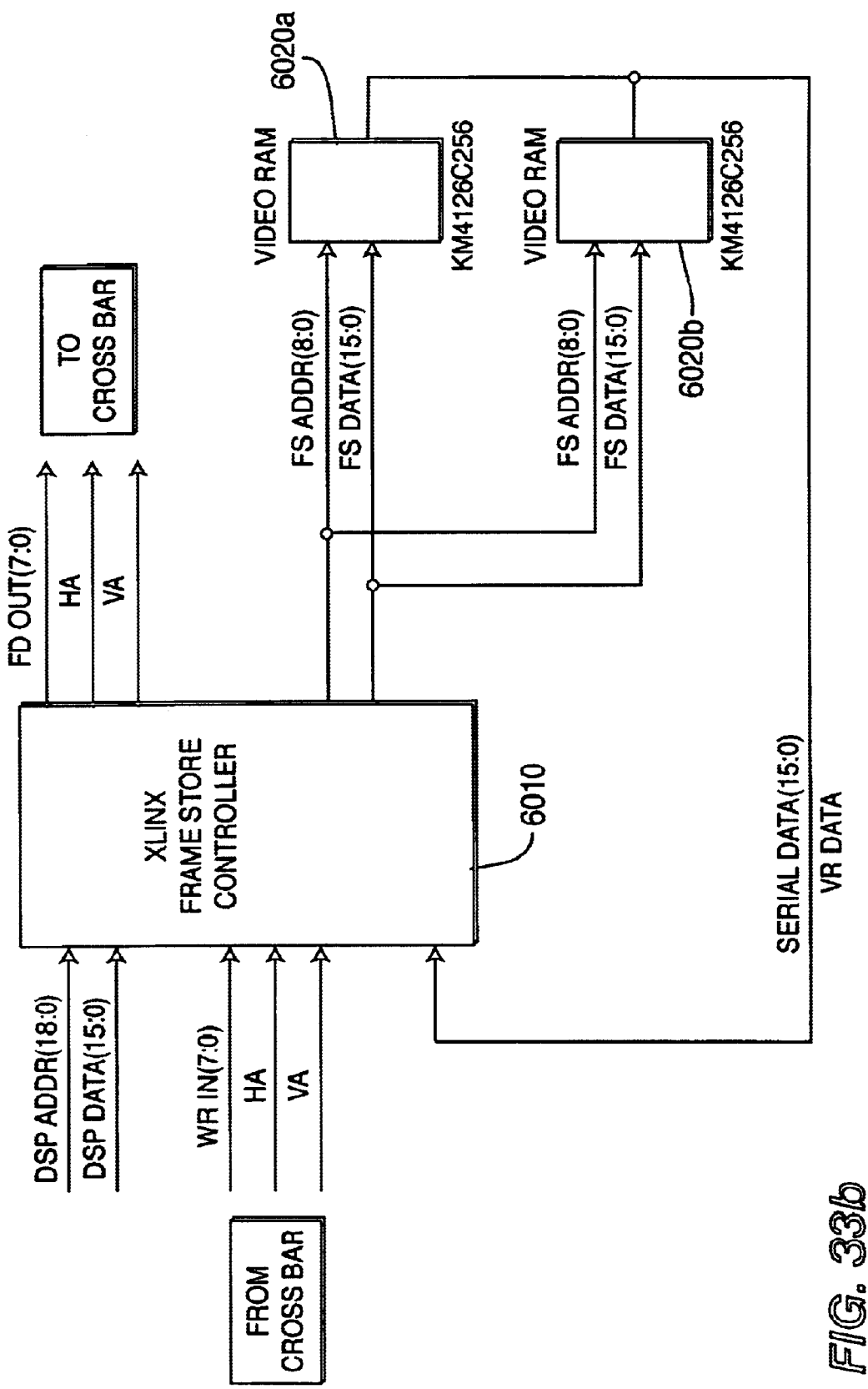
FIG. 33b is a block diagram of the frame store controllers shown in FIG. 33.

The frame store controllers 4010 and 4015 are described below with reference to FIG. 33b which illustrates a frame store controller. The frame store controllers 4010 and 4015 include two 256K×16 Video RAM's (VRAMs) 6020a and 6020b and a controller 6010 that is, for example, a Xilinx FPGA controller used to control triple-port accesses to the VRAMs 6020a and 6020b. The controller 6010 receives video data WR_IN including the timing signals HA and VA from crosspoint switch 6105 and stores video data FSDATA into VRAM 6020a and 6020b at an address FSDATA specified the controller 6010. The controller 6010 retrieves video data VRDATA from VRAM 6020a and 6020b and provides video data RD_OUT including the timing signals HA and VA associated with the video data. The frame store controllers 4010 and 4015 provide random access to VRAM 6020a and 6020b from processors 6110a, 6110b, and 6230 via address port DSP_ADDR and data port DSP_DATA. The frame store controllers 4010 and 4015 store up to 1K×1K of pixel image information. Alternatively, the frame store controllers 4010 and 4015 may be modified to store up to 2K×2K of video data to allow for storage of several larger images.

Figure 44:
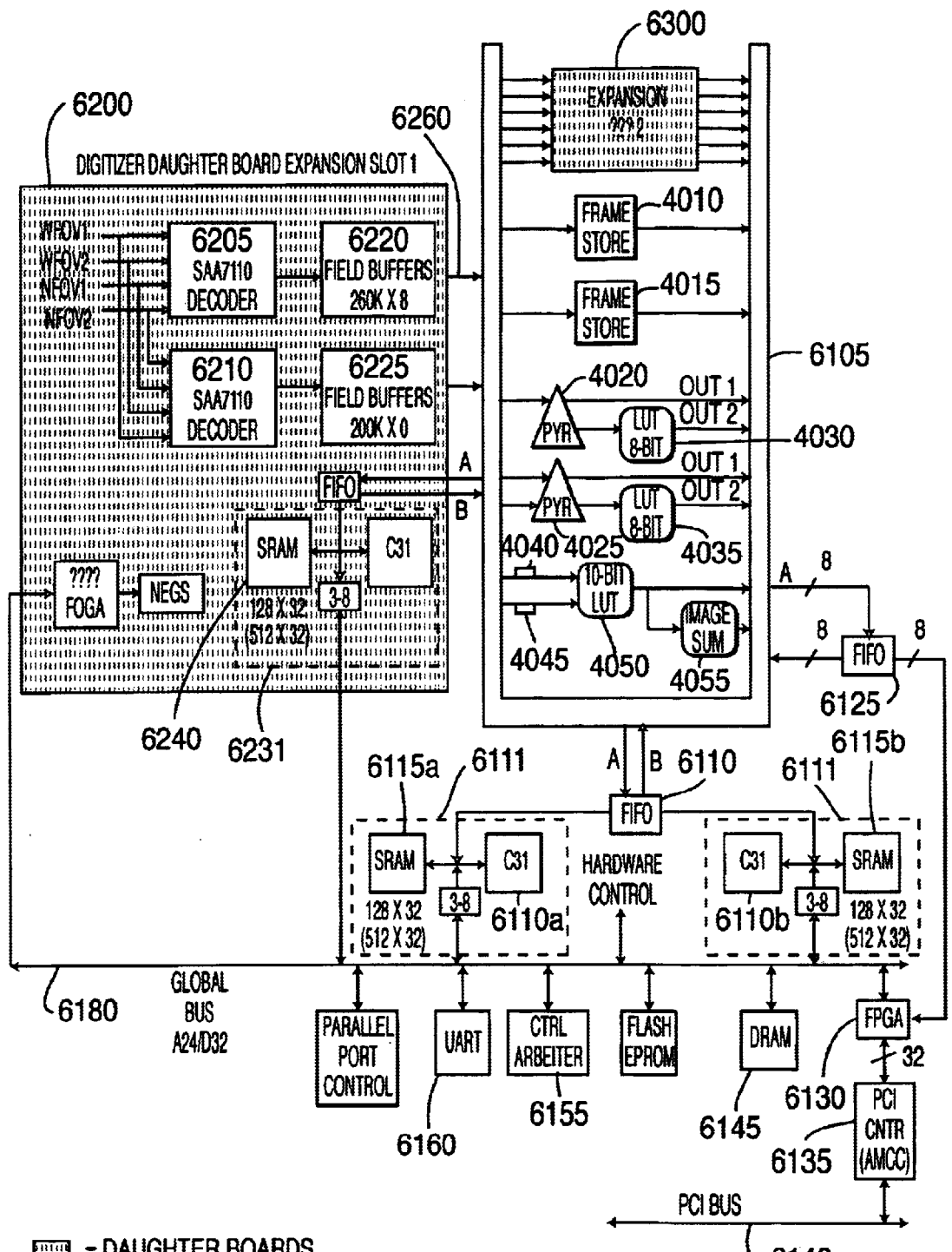
FIG. 44 is a block diagram of an alternative embodiment of the invention for digitizing and processing the NFOV and WFOV images.

Each frame store controller 4010 and 4015 has an interface to a processor, for example, processors 6110a, 6110b, and 6230 shown in FIG. 44, to provide control of where the image is stored in VRAM 6020a and 6020b. Typically, processors 6110a, 6110b, and 6230 instruct the frame store controllers 4010 and 4015 to perform several retrieval or store operations in the registers (not shown) of the frame store controllers 4010 and 4015 prior to the operation of the processor.

With the crosspoint switch 4060 having 8 crosspoint connections, there are two additional crosspoint connections available. The additional connections may be allocated to the input and output paths of a display frame store (not shown) or to an additional frame store (not shown) or processing device (not shown).

Figure 34:
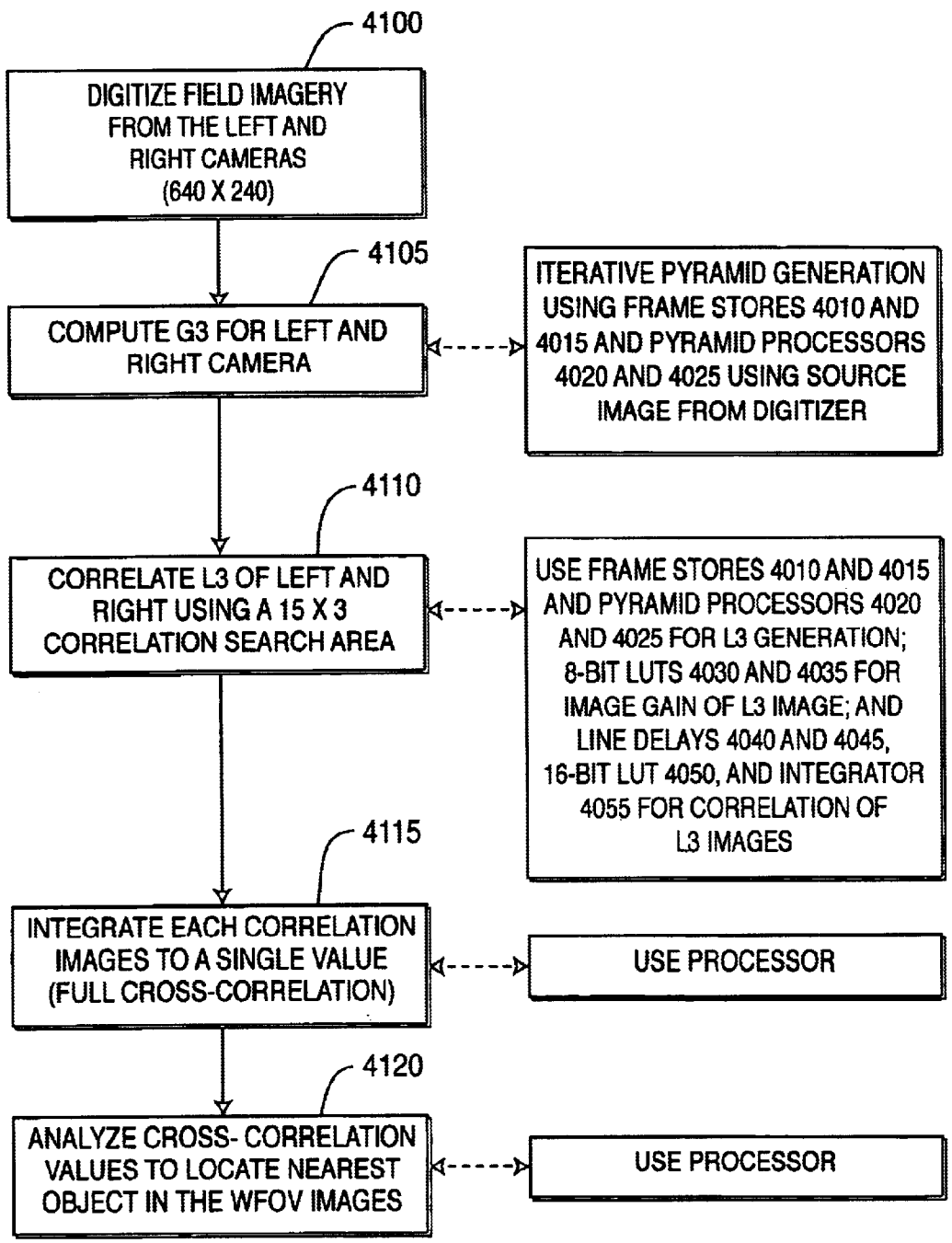
FIG. 34 is a flow chart that shows an exemplary method for determining the depth to nearest object in the WFOV images using the WFOV circuitry shown in FIG. 33.

The operation of the WFOV circuitry 4000 is described below with reference to FIGS. 34 through 37. FIG. 34 illustrates the process to determine the depth to nearest object in the WFOV images which is the user's head. For each step, the corresponding WFOV circuitry 4000 used to implement that step is shown in FIG. 34. At step 4100, the field imagery from the left and right WFOV imagers 10 and 12 (shown in FIG. 1c) is digitized to form a 640 pixel by 240 pixel image. Alternatively, a 320 pixel by 240 pixel image may be used to allow faster generation of Gaussian pyramid imagery described below.

At step 4105, a Gaussian level 3 image G3 is produced for the left and right WFOV images. A "Gaussian, level 3 image" is the third level of the Gaussian pyramid of the image. At step 4110, the left and right Laplacian, level 3 images of the WFOV images are correlated using a fifteen by three pixel search area. The "Laplacian level 3" is the third level of the Laplacian pyramid of the image. The Laplacian images may be generated directly from Gaussian images of the same resolution by simply subtracting using the pyramid processors 4020 and 4025. At step 4115, each of the correlated images is integrated to a single value. This is known as full cross-correlation. Finally, at step 4120, the cross-correlation values are analyzed to determine nearest object in the WFOV images.

Figure 34A:
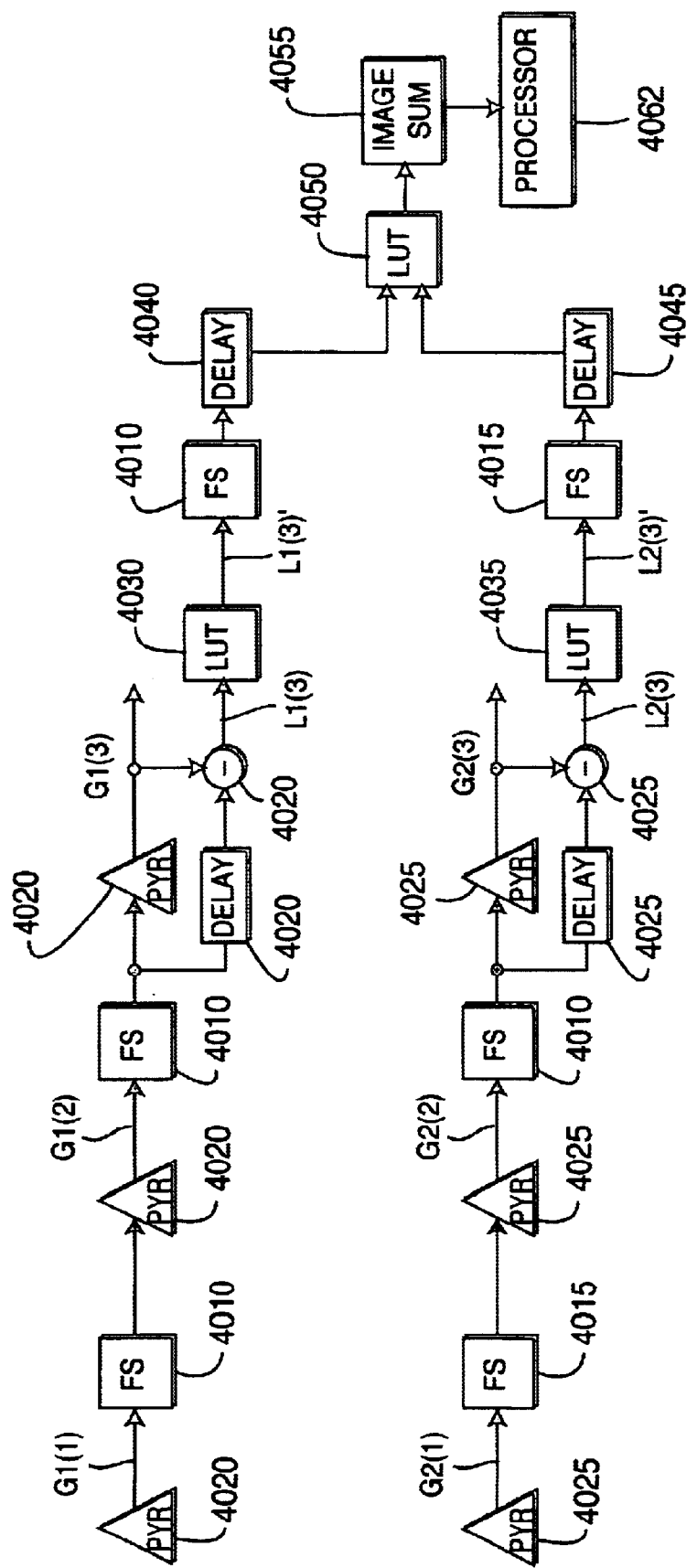
FIG. 34a is a process flow diagram that the operation of the WFOV circuitry when implementing the process described in FIG. 34.
Figure 35:
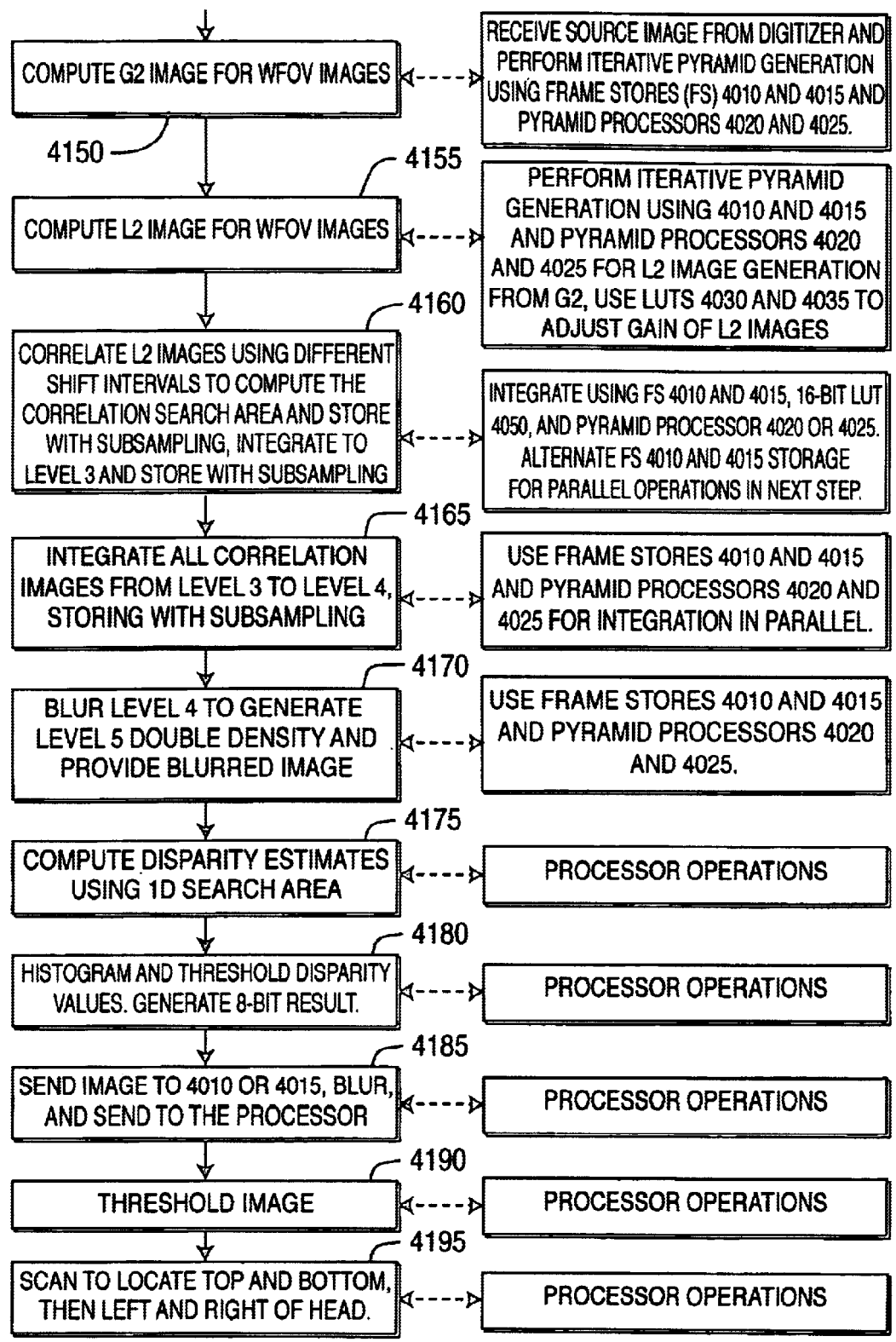
FIG. 35 is a flow chart that shows an exemplary method for localizing the user's head in the WFOV images using the WFOV circuitry shown in FIG. 33.

FIG. 34a is a process flow diagram useful for demonstrating the operation of the WFOV circuitry (shown in FIG. 34a) to produce the Gaussian and Laplacian images and the integration and cross correlation operations described above with reference to FIG. 34. FIG. 34a also illustrates how one skilled in the art of pipelined image processing would implement the other process shown in FIGS. 35 through 37 and FIGS. 40 through 43. Thus, for the operation of the pipeline image processing circuitry is omitted below.

The WFOV images from WFOV imagers 10 and 12 (shown in FIG. 1c) are provided to respective pyramid processors 4020 and 4025. Pyramid processors 4020 and 4025 produce respective level one Gaussian images G1(1) and G2(1) that are provided to frame stores 4010 and 4015. The Gaussian images G1(1) and G2(1) are provided from frame stores 4010 and 4015 to respective pyramid processors 4020 and 4025 to produce level two Gaussian images G1(2) and G2(2).

The Gaussian images G1(2) and G2(2) are then provided to respective frame stores 4010 and 4015. Next, the Gaussian images G1(2) and G2(2) are provided to pyramid processes 4020 and 4025 which produce level three Gaussian images G1(3) and G2(3) that are subtracted from Gaussian images G1(2) and G2(2) to produce level 3 Laplacian images L1(3) and L2(3). The delays and subtractors used to produce the Laplacian images L1(3) and L2(3) are included in the pyramid processors 4020 and 4025 and are shown in FIG. 34a to illustrate how the Laplacian images L1(3) and L2(3) are produced. The Laplacian images are provided to LUTs 4030 and 4035 to adjust the gain the Laplacian images to produce Laplacian images L1(3)' and L2(3)'.

The Laplacian images L1(3) and L2(3) are provided to frame stores 4010 and 4015 and then to delays 4040 and 4045. Delays 4040 and 4045 delay each of the Laplacian images L1(3)' and L2(3)' so that the Laplacian images L1(3)' and L2(3)' may be provided to the 16-bit LUT at substantially the same time. The 16-bit LUT 4050 and the image sum 4055 correlate the Laplacian images L1(3)' and L2(3)'.

The correlated images are provided to the processor 4062 which implements steps 4115 and 4120 shown in FIG. 34. The images described in FIG. 34a are provided between the different components of the WFOV circuitry 4000 via the crosspoint switch 4060.

Next, the WFOV circuitry 4000 shown in FIG. 33 is used to localize the user's head in the WFOV images. Head localization is described below with reference to FIGS. 33 and 35. For each step shown in FIG. 35, a corresponding description of the processing circuitry for performing those steps using the WFOV circuitry 4000 is shown in FIG. 33. The operations performed by the WFOV circuitry 4000 are similar to those described above and shown in FIG. 34a except that operations may be deleted or added to implement the specific steps shown in FIG. 35. These steps could be readily implemented by a person skilled in the art of pipelined image processing.

Returning to FIG. 35, at step 4150, the level 2 Gaussian image from WFOV images is produced from the digitized image. At step 4155, the Laplacian image L2 is produced. Next, at step 4160, the images L2 are correlated using a ten pixel by three pixel correlation search. The correlated image is integrated, subsampled, and stored. At step 4165, the correlated images are integrated from a level 3 Laplacian image L3 to a level 4 Laplacian image L4, subsampled, and stored. At step 4170, the image L4 is blurred to a level 5 double density Laplacian image L5 of forty pixels by thirty pixels and provided to the processor. Double density (DD) is defined as an image having frequency contents that have been limited to the next lower octave band. A level 5 double density image, for example, is computed through blurring a level 4 Gaussian image with the typical Gaussian filter, but without subsampling after the blur. In other words, the image is "oversampled" by a factor of 2.

At step 4175, the disparity values between the WFOV images are computed using a one dimensional (1D) search area. Next, at step 4180, the disparity values are histogramed and thresholded. At step 4185, the threshold image is Gaussian filtered at level 5 DD to blur the threshold image. At step 4190, the blurred image is thresholded and, at step 4195, scanned to locate the top and bottom and then the left and right portions of the users head.

Next, the WFOV circuitry 4000 shown in FIG. 33 is used to track the user's head. Head tracking tracks the user's head within a single pixel at high resolution and is described below with reference to FIGS. 33 and 37. For each step shown in FIG. 37, a corresponding description of the processing circuitry for performing those steps using the WFOV circuitry 4000 is shown in FIG. 33. The operations performed by the WFOV circuitry 4000 are similar to those described above and shown in FIG. 34a except that operations may be deleted or added to implement the specific steps shown in FIG. 37. These steps could be readily implemented by a person skilled in the art of pipelined image processing.

Returning to FIG. 37, at step 4250, the L3 image of a region of interest (ROI) of a WFOV image is produced. The region of interest is produced from a Gaussian level 1 image G1 of 320 pixels by 240 pixels from the digitized WFOV image. A ROI of 120 pixels by 80 pixels is retrieved from the image G1. A Gaussian level 3 image G3 of 30 pixels by 20 pixels is produced from the ROI and a Laplacian level 3 image L3 is produced using the image G3. Next, at step 4255, the a previous Laplacian level 3 image L3' of the ROI is retrieved from memory and correlated with the new L3 image of the ROI using a five pixel by five pixel search area. The correlation values produced are integrated over the entire ROI to perform full cross-correlation of the ROI. At step 4260, the integrated image is analyzed to determine the translation between the old image and the new image by locating the peak value of the correlation. This information is used to track the user's head.

Figure 36:
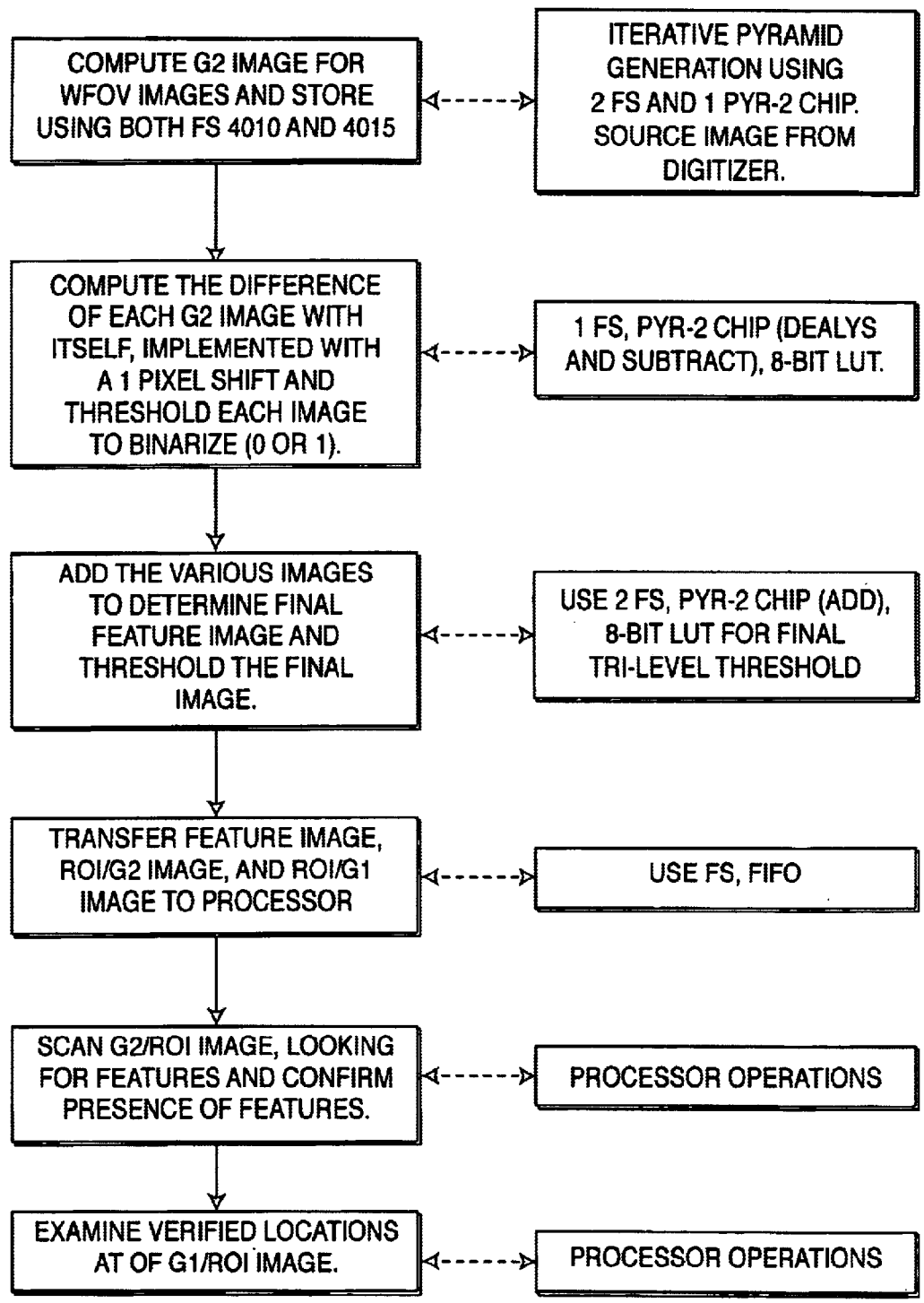
FIG. 36 is a flow chart that shows an exemplary method for localizing the user's eye in the WFOV images using the WFOV circuitry shown in FIG. 33.

Next, the WFOV circuitry 4000 shown in FIG. 33 is used to localize the user's eye in the WFOV images. Eye localization is shown in FIGS. 33 and 36. For each step shown in FIG. 36, a corresponding description of the processing circuitry for performing those steps using the WFOV circuitry 4000 is shown in FIG. 33. The operations performed by the WFOV circuitry 4000 are similar to those described above and shown in FIG. 34a except that operations may be deleted or added to implement the specific steps shown in FIG. 36. These steps could be readily implemented by a person skilled in the art of pipelined image processing.

Figure 38:
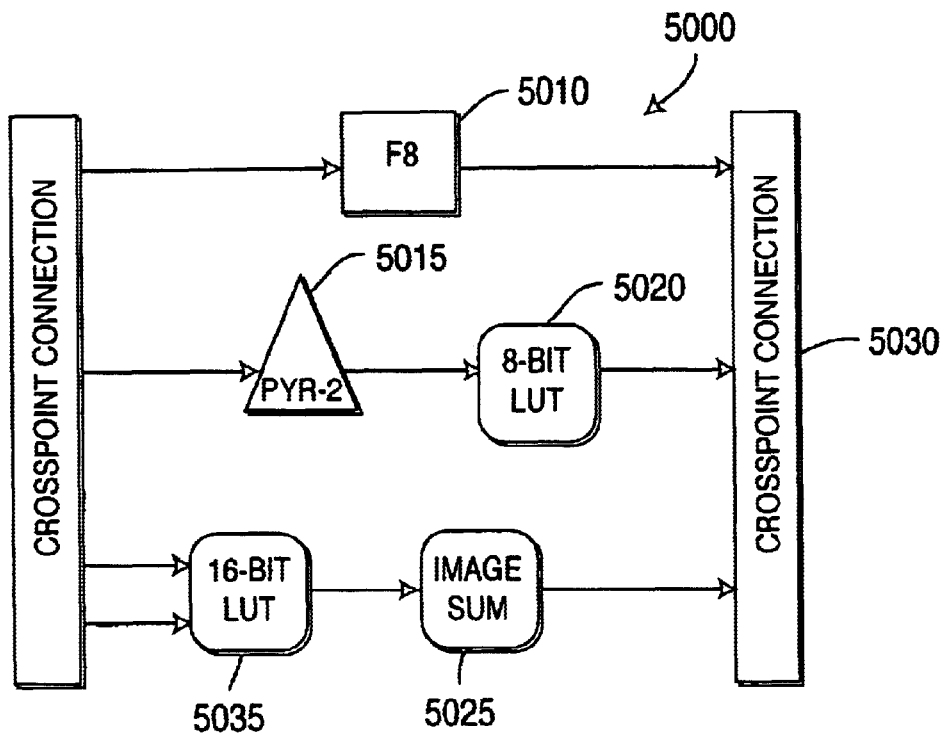
FIG. 38 is a block diagram of NFOV circuitry according to an alternative embodiment of the invention for performing the image processing operations associated with the NFOV image.

FIGS. 38 through 43 illustrate the NFOV circuitry 5000 and the processing performed by these components. Referring to FIG. 38, the NFOV circuitry includes a frame store 5010, a pyramid processor 5015 that is, for example, a PYR-2 chip with an image look-up table (LUT) 5020, and a 16-bit LUT 5035 for operations on two images. Also included is an image sum circuit 5025 at the output of the LUT 5035 that allows image results to be passed through and integrated over the entire extent of the image. NFOV circuitry 5000 is for pyramid generation and energy analysis used for focus and brightness control. In addition to the circuitry shown in FIG. 38, at least one digital signal processor (not shown) is provided to control the NFOV circuitry 5000 and to perform processing operations that cannot be efficiently mapped into hardware. The circuitry 5000 operates in the same way that the WFOV circuitry 4000.

An alternative NFOV circuitry configuration 5000a is shown in FIG. 38. NFOV circuitry 5000a is the same as NFOV circuitry 5000 shown in FIG. 38 except that an additional pyramid processor 5015a and 8-bit LUT 5020a are provided. The NFOV circuitry 5000a shown in FIG. 38 is tailored for computing gradient information used for spoke filtering in addition to the other NFOV processes. The iris spoke filtering process has slightly greater requirements than the other NFOV processes. This is because the spoke filter requires the generation of a gradient image including partial derivatives horizontally and vertically which are interpreted using the 16-bit LUT 5035 to provide magnitude and orientation from the images at different resolutions.

The NFOV circuitry 5000 shown in FIG. 38 is used to detect specularities present within the entire NFOV image and locate the most probable locations of the user's eye and iris regions in image coordinates. This process is described below with reference to FIG. 40. For each step shown in FIG. 40, a corresponding description of the processing circuitry for performing those steps using the NFOV circuitry 5000 is shown in FIG. 38. The operations performed by the NFOV circuitry 5000 are similar to those described above and shown in FIG. 34a except that operations may be deleted or added to implement the specific steps shown in FIG. 40. These steps could be readily implemented by a person skilled in the art of pipelined image processing.

At step 5100, digitized frame imagery of 640 pixels by 480 pixels from the NFOV imager is processed to produce a Gaussian level 3 image G3. At step 5105, the Laplacian level 3 image L3 is produced and the values in the image L3 are squared. At step 5110, the squared image L3 is histogramed and the threshold of the image having the highest energy is located. Next, at step 5115, the high energy regions are processed to verify that specularities are present. Finally, the location of the user's eye is determined from the detected specularities.

Next, the NFOV circuitry 5000 shown in FIG. 38 is used to determine using image energies over different spatial frequencies the adjustments to the imager to obtain a well focused image. This operation precedes the actual adjustment of focus of the NFOV imager 14 (shown in FIG. 1c). This process is described below with reference to FIG. 41. For each step shown in FIG. 41, a corresponding description of the processing circuitry for performing the step using the NFOV circuitry 5000 is shown in FIG. 38. The operations performed by the NFOV circuitry 5000 are the same of those described above and shown in FIG. 34a except that operations may be deleted or added to implement the specific steps shown in FIG. 41. These steps could be readily implemented by a person skilled in the art of pipelined image processing.

Returning to FIG. 41, at step 5150, the Gaussian level 1 image G1 and the Laplacian level 0 image L0 are produced from the digitized NFOV image of 640 pixels by 480 pixels. At step 5155, Gaussian images G1 through G3 and Laplacian images L1 through L3 are produced and the gain for the images L1 through L3 are determined. Next, at step 5160, the energy values of the images L0 through L3 image are analyzed to determine the new focus for the NFOV imager 14 shown in FIG. 1c. This is performed by calculating the absolute values or the energies of the images L0 through L3 images. Finally, the computed energy levels are used to determine the adjustment to the focus of the NFOV imager.

Alternatively, a field of the NFOV image may be analyzed instead of the entire frame because interlacing effects on NFOV image may cause problems with energy measurements at higher resolution levels. In this case, the FS 5010 would retrieve a single field rather than an interlaced frame for processing.

Next, the NFOV circuitry 5000 shown in FIG. 38 is used to determine through image energies the brightness and contrast of the NFOV imager to adjust the NFOV imager iris. This process is described below with reference to FIG. 42. For each step shown in FIG. 42, a corresponding description of the processing circuitry for performing the step using the NFOV circuitry 5000 is shown in FIG. 38. The operations performed by the NFOV circuitry 5000 are the same as those described above and shown in FIG. 34a except that operations may be deleted or added to implement the specific steps shown in FIG. 42. These steps could be readily implemented by a person skilled in the art of pipelined image processing.

Returning to FIG. 42, at step 5200, a Gaussian level 3 image G3 is produced from a digitized NFOV image of 640 pixels by 480 pixels. The image G3 is provided to the processor. At step 5205, the regions surrounding the detected specularities are examined to determine contrast and brightness. Finally, at step 5210, the iris of the NFOV imager is adjusted in response to the analyzed values.

Figure 39:
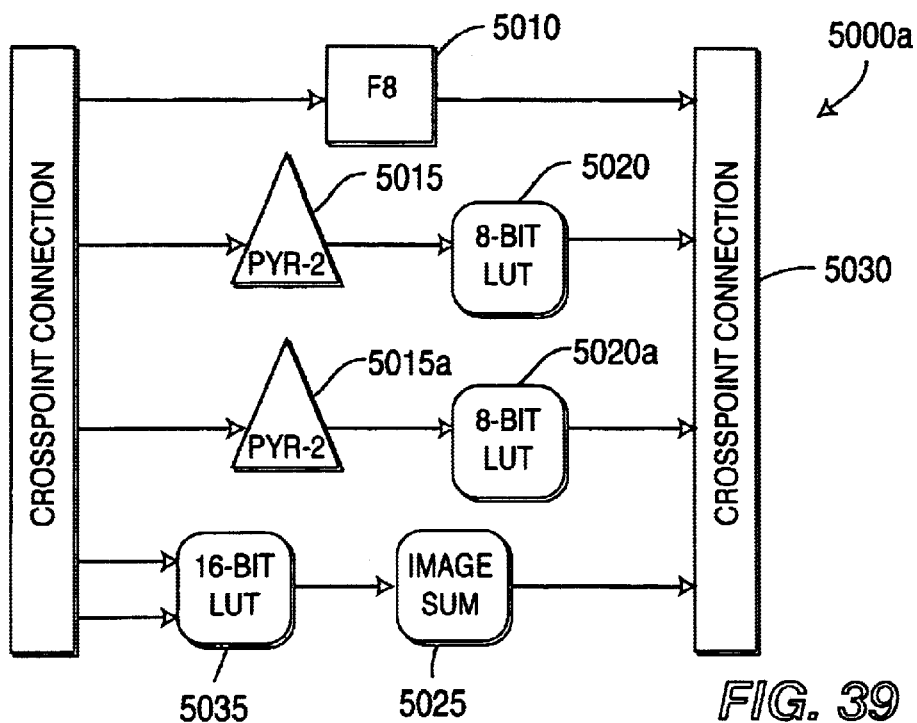
FIG. 39 is a block diagram of NFOV circuitry according to another alternative embodiment of the invention for performing the image processing operations associated with the NFOV image.
Figure 40:
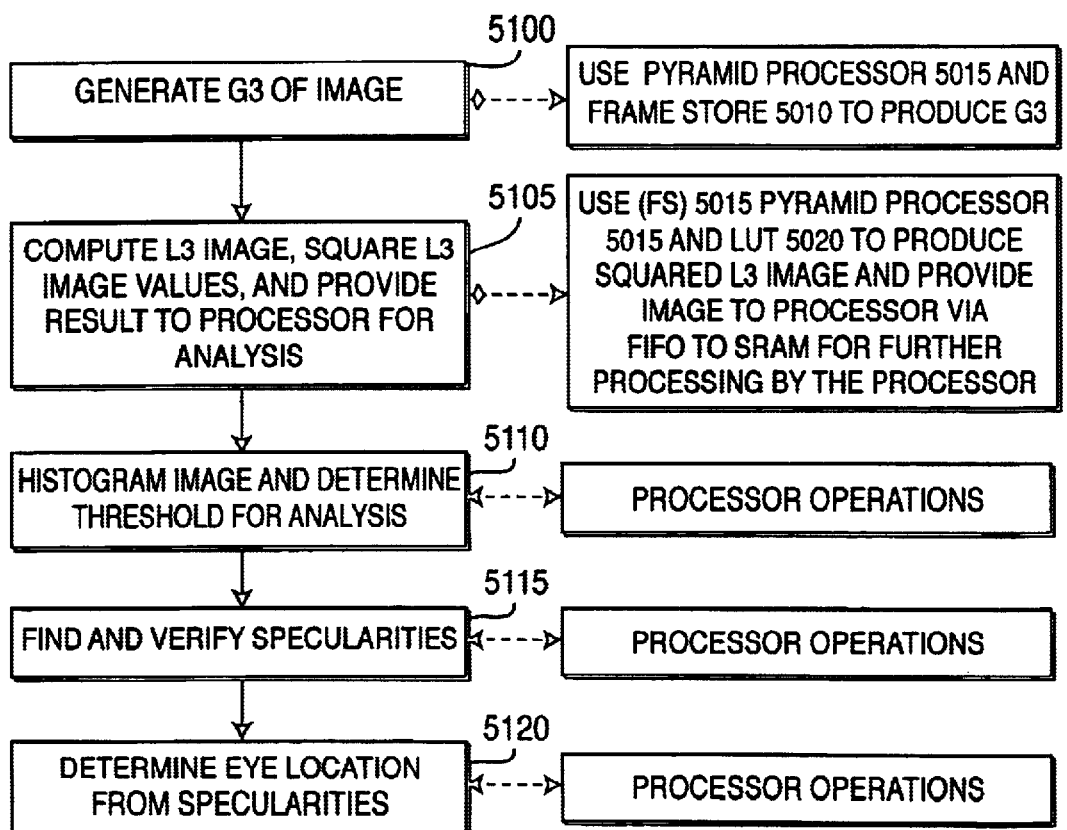
FIG. 40 is a flow chart that shows an exemplary method for locating the user's eye and iris regions using the NFOV circuitry shown in FIG. 38.
Figure 41:
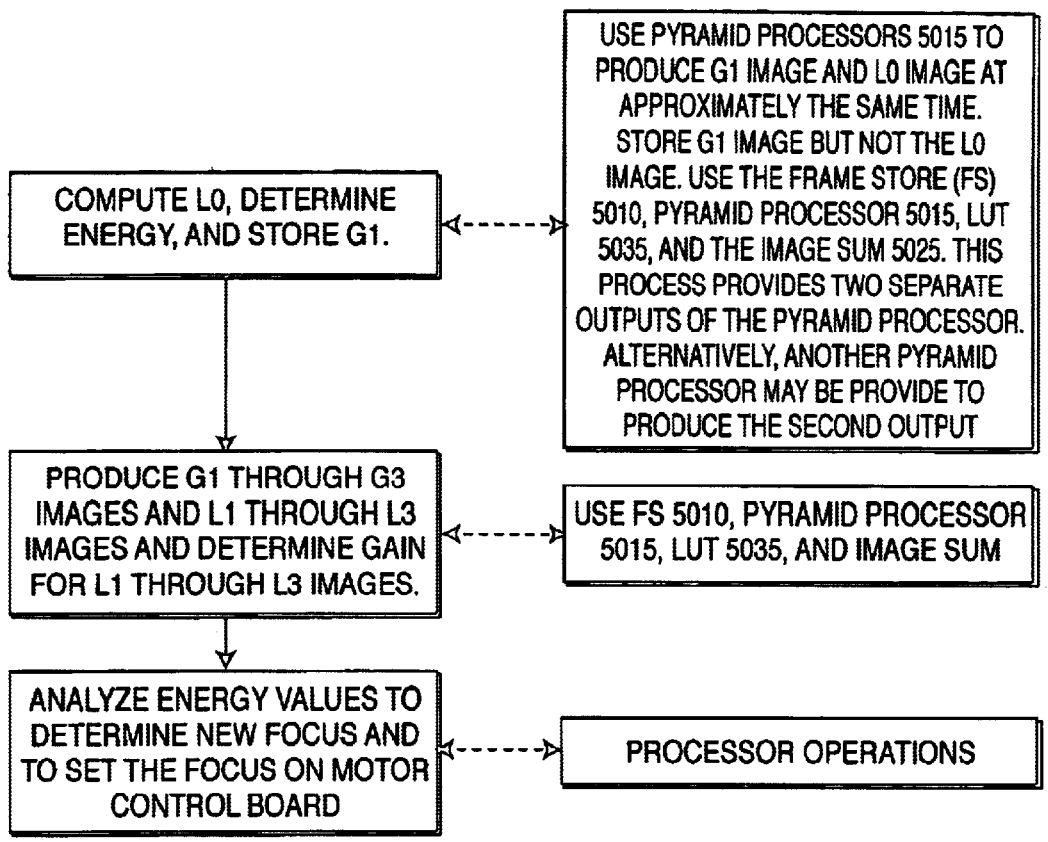
FIG. 41 is a flow chart that shows an exemplary method for determining the adjustments to the NFOV imager 14 to obtain a focused image using the NFOV circuitry shown in FIG. 38.
Figure 42:
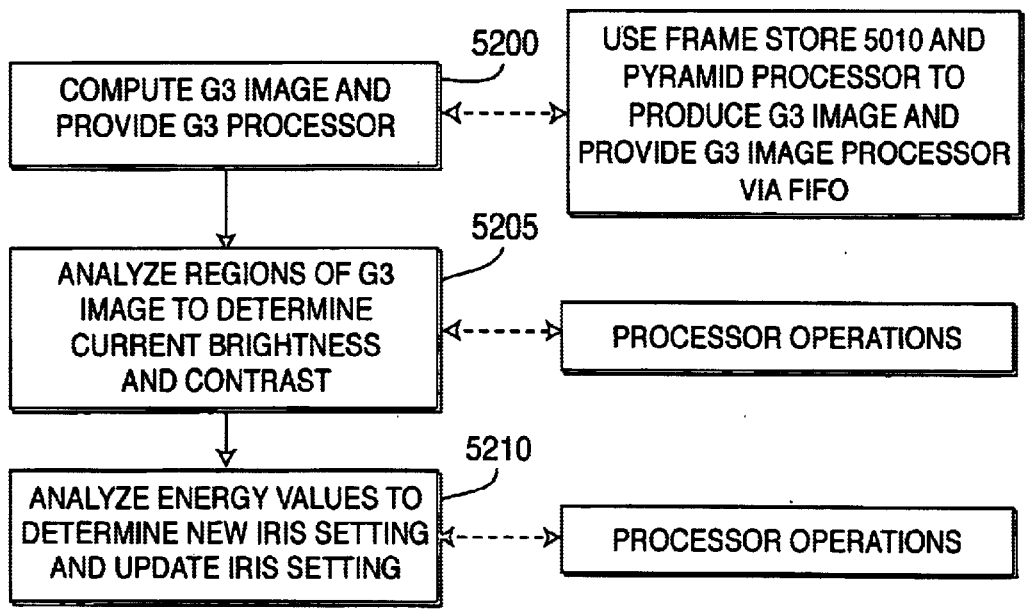
FIG. 42 is a flow chart that shows an exemplary method for determining adjustments to the iris of the NFOV imager 14 using the NFOV circuitry shown in FIG. 38.
Figure 43:
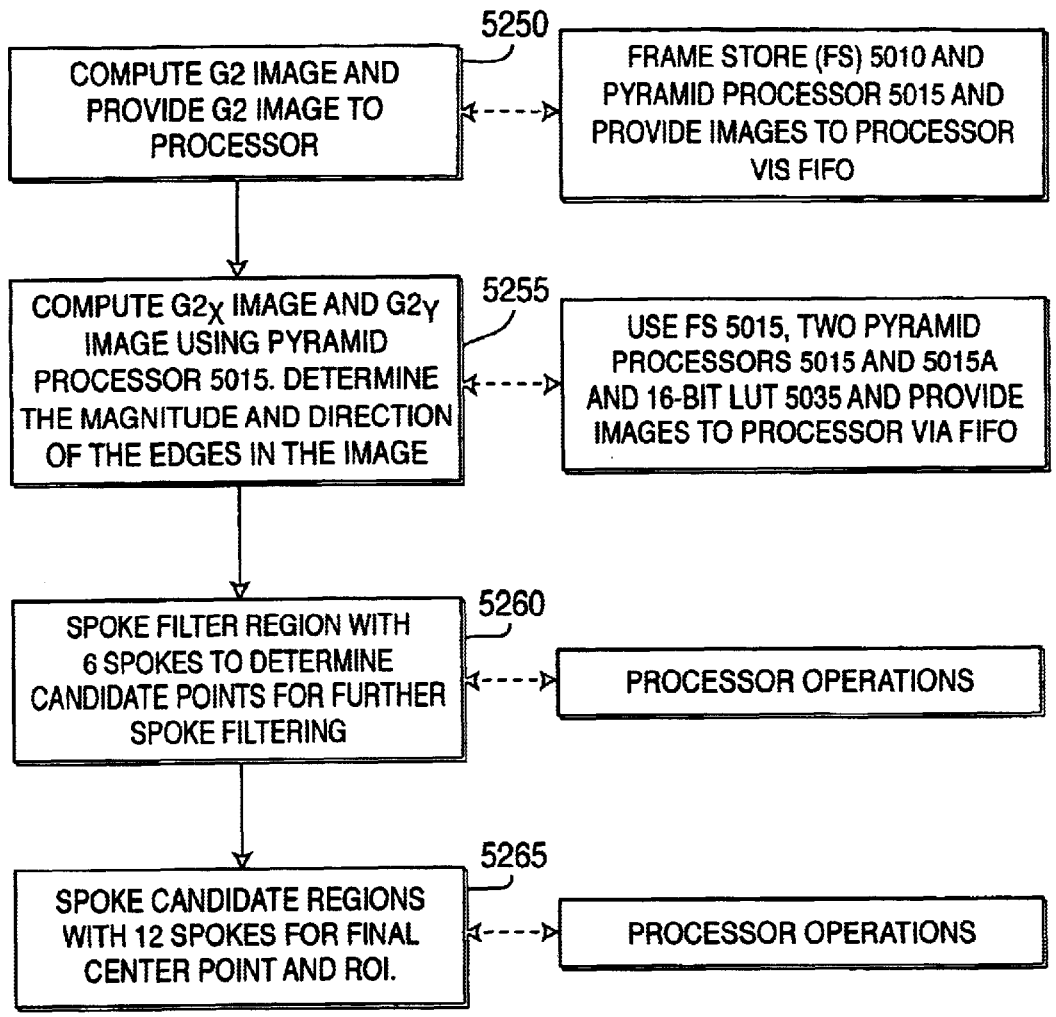
FIG. 43 is a flow chart that shows an exemplary method for locating a region in the image containing the user's iris using the NFOV circuitry shown in FIG. 39.

Next, the NFOV circuitry 5000 shown in FIG. 38 is used to locate a region in the image containing the user's iris through analysis gradients to enforce radial symmetry of the pupil-iris and iris-eye interface, resulting in the center of the pupil and rectangular region circumscribing the iris region. This process is described below with reference to FIG. 43. For each step shown in FIG. 43, a corresponding description of the processing circuitry for performing those steps using the NFOV circuitry 5000 is shown in FIG. 39. The operations performed by the NFOV circuitry 5000 are similar to those described above and shown in FIG. 34a except that operations may be deleted or added to implement the specific steps shown in FIG. 43. These steps could be readily implemented by a person skilled in the art of pipelined image processing.

At step 5250, a Gaussian level 2 image G2 is produced from a 640 pixel by 480 pixel image from the NFOV imager. The image G2 is provided to a processor (not shown). At step 5255, a Gaussian level 2 image filtered in the x-direction G2x and a Gaussian level 2 image filtered in the y-direction G2y are produced using the pyramid processor 5015. The magnitude and orientation of the images are determined from the images G2x and G2y. At step 5260, the image G2 is spoke filtered to determine candidate locations for the user's iris. Finally, at step 5265, the location of the user's iris is confirmed using a spoke analysis test which uses an increased number of spokes. An additional LUT may be provided to store trigonometric functions (cos, sin of angles) and other operations to reduce the amount of time spent in traversing radials of the spoke. A precomputed table of beginning and end points of the radials might be used in place of the trigonometric functions in the LUT.

FIG. 44 illustrates an alternative embodiment of the system 5. The system 5 includes a mother board 6100 and board interface to a PCI backplane 6140. This allows the use of daughter boards 6200 and 6300. By allowing for multiple boards in the backplane, the system 5 may be expanded to accommodate parallel execution of additional algorithms. A possible expansion of this system may be the addition of another board to divide the NFOV processes and the WFOV processes. If this case, a central processor is used to control both boards or one of the PCI operates as PCI master.

The exemplary digitizer daughterboard 6200 digitizes and stores any two of four video channel inputs at video frame rates. The digitizer daughterboard 6200 captures fields or frames of digitized real time video data from the WFOV imagers via analog inputs WFOV1 and WFOV2, NFOV imager via analog input NFOV, or an auxiliary input signal via analog input AUX. The digitizer daughterboard 6200 also provides continuous fields or frames of video data which are provided to the crosspoint switch 6105 for video processing. The digitizer daughterboard 6200 also provides one auxiliary analog video output, selected from one of the four inputs WFOV1, WFOV2, NFOV, and AUX, for external inspection of the video. The digitizer daughterboard 6200 provides two digital outputs 6260 and 6265 to the crosspoint switch 6105 on the motherboard 6300. The digital outputs 6260 and 6265 are eight bits of data and horizontal timing signals HA and vertical timing signals VA described above.

The two timing signals are based upon the image data. The HA timing signal goes high for each horizontal image line and low during the line blanking period. The VA timing signal is used to frame the entire image. The pyramid hardware is continuously clocked but without the timing signals HA and VA active processing will not occur. Timing signals HA and VA are delayed with the image data if pipeline delays occur in the hardware. By delaying the timing the image data may be framed by the timing signals.

Two of the four video inputs WFOV1, WFOV2, NFOV, and AUX to the digitized daughterboard 6200 are selectable for digitization. The decoders 6205 and 6210 digitize a single field of interlaced video from each of the two selected video inputs WFOV1, WFOV2, NFOV, and AUX. The decoders may be, for example, Philips SAA7110 front end decoders. The output signals produced by the decoders 6205 and 6210 are stored in respective field buffers 6220 and 6225. Stored image data is retrieved from the field buffers 6220 and 6225 at a rate of 30 MHz. The frame buffers 6220 and 6225 may be, for example, 256 k by 8-bit buffers. Data is retrieved from the field buffers 6220 and 6225 in response a start signal (not shown) from a processor 6230, 6115a, or

6115b or every field. The decoders 6205 and 6210 provide two internal eight bit analog to digital converters and internal timing signals to digitize the video input data.

The decoders operate in a field mode and a frame mode. In the field mode, the digitized video data from each decoder 6205 and 6210 are provided to the field buffers 6220 and 6225 in a ping pong fashion. The odd fields are sent to one field memory while the even to the other. Field data is read out from the field buffers 6220 and 6225 as every other line and provided to the crosspoint switch 6105. In frame mode, every image line is provided to the crosspoint switch 6105.

Approximately 30.4 msec is used to store a frame of 640 pixels by 480 pixels 480 in the two field buffers at a 12.5 MHz rate. Approximately 10.5 msec is used to retrieve the stored frame from the field buffers 6220 and 6225. To avoid retrieving image data from the field buffers 6220 and 6225 before it has been stored, the retrieval process does not occur until approximately 22 msec into the process of storage of the image data into the field buffers 6220 and 6225. This is equivalent to waiting for more than 346 lines past the start of a frame. A hardware counter (not shown) of the line number can be used to determine when to start reading data from the field buffers 6220 and 6225.

Crosspoint switch 6105 controls the image data input and output signals. The input signals to and the output signals from the digitizer daughter board 6200 and the NFOV daughter board 6300 are coupled to the crosspoint switch 6105. The crosspoint switch 6105 is three 64 bit to sixty four bit LSI Logic crosspoint switches. The crosspoint switch 6105 interconnects any given input signal to any given output terminal. Both the input and output signals of the crosspoint switch 6105 include eight bits of data and two timing signals as described above.

The mother board 6100 includes the WFOV pyramid circuitry 4000 for implementing the WFOV processes described above in the other embodiments except that the crosspoint switch is a sixteen by sixteen crosspoint switch as described above instead of an eight by eight crosspoint switch. The motherboard 6100 also includes two digital signal processors 6110a and 6110b that may be, for example, Texas Instruments TMS320C31 32-bit floating-point Digital Signal Processors (DSPs). The processors 6110a and 6110b are used to implement the NFOV and WFOV processes described above. Each processor 6110a and 6110b is coupled to global bus 6170. The global bus 6170 provides access to DRAM 6145, Flash EPROM 6150, and the daughter boards 6200 and 6300. The DRAM 6145 is accessible by each of the processors 6110a, 6110b, and 6230 and the PCI bus 6140 through the PCI bridge 6135.

The Flash EPROM 6150 is used to boot the processors 6230, 6110a, and 6110b. After a reset, processor 6110a accesses the flash EPROM 6150 and copies its executable boot code to its local memory 6115a which is SRAM. Processor 6110a then interrupts processor 6110b and processor 6230 causing those processors to copy the boot memory of processor 6110a to the memories 6240 and 6115b of processors 6230 and 6110b.

Each processor 6110a, 6110b, and 6230 has four external interrupt lines (not shown). These interrupts are used for cueing task switching and initiating software processes. Interrupts are used to respond to the following circumstances: (1) an interruption request from another processor for a specific operation, (2) an interrupt generated for boot loading operations, and (3) interrupts generated by the NFOV and WFOV circuitry indicating the completion or occurrence of processing tasks. The WFOV and NFOV circuitry generates interrupts when requested by a processor 611a, 6110b, and 6230. The processor 6110a, 6110b, and 6230 produce interrupts to indicate (1) the completion of image data retrieval by the frame stores, (2) the completion of image data storing by the frame stores, (3) digitizer field interrupts, and (4) the completion of imager motor control operations.

These interrupts are used to cue ongoing operations based on the completion of an existing operation, such as frame store retrieval or store operations. These interrupts allow other operations executing within the processor to proceed during the time when other operations are underway in the circuitry. External interrupt and masking circuitry are provided to control the sequencing of interrupts to each of the processors 6230, 6110a, and 6110b. Each processor may mask out all interrupts and control which external interrupts will be received by its external interrupt lines. Two DSP interrupts will be provided for hardware interrupts, one interrupt from other DSPs or from the PCI bus, and one dedicated to power-on operations.

Three 2K×9 FIFOs 6125, 6110, and 6255 provide fast data communications for image information passing through the crosspoint switch 6105 and the memories 6115a, 6115b, and 6240 and between the crosspoint switch 6105 and the PCI backplane bus 6140. FIFOs 6110 and 6255 provide a buffer between the crosspoint switch 6105 and the processors 6110a, 6110b, and 6230 and memories 6115a, 6115b, and 6240. FIFOs 6110 and 6255 allow the processors 6110a, 6110b, and 6230 to direct the image data directly into memories 6115a, 6115b, and 6240 at a desired memory location. The connections to the crosspoint switch 6105 are shared connections to accommodate limited crosspoint I/O available. As a result, the processors 6110a, 6110b, and 6230 share the data path from the crosspoint switch to the individual FIFOs.

FIFO 6125 provides a buffer interface between the crosspoint switch 6105 and the PCI bus 6140. This interface allows burst retrieval of the video data out over the PCI bus 6140 to a central processor (not shown) on the PCI bus 6140. This interface also allows data on the PCI bus 6140 to be stored in the FIFO 6125 to provide data to the crosspoint switch 6105. An FPGA 6130 is provided to control the FIFO 6125. When data is retrieved from the PCI bus 6140, the 8 bit data is converted to 32 bit data. This is accomplished using the FPGA 6130 for control and a set of registered buffers (not shown) for the data.

The buffers 6110 and 6255 are described with reference to FIG. 45. Data is retrieved from the crosspoint switch 6105 through a 2K×9 FWO 6112a and provided to the processor circuitry and stored in memories 6240, 6115a, and 6115b. The data on the crosspoint switch is provided from frame stores 4010 and 4015. Processors 6230, 6110a, and 6110b poll the 2K×9 FIFO 6112a to determine when data may be retrieved from the 2K×9 FIFO 6112a. If the processors 6230, 6110a, and 6110b can not keep up to the data rate of data provided from the crosspoint switch 6105, then a hold is generated by the 2K×9 FIFO 6112a to the frame stores 4010 and 4015. This hold allows the processors 6230, 6110a, and 6110b to catch up with respect to retrieving data from the 2K×9 FIFO 6112a.

The timing signals VA and HA are detected by control circuit 6111a that determines which samples are valid and should be retrieved from the crosspoint switch 6105 and stored in the 2K×9 FIFO 6112a. The 2K×9 FIFO 6112a is controlled by the control circuit 6111a to perform this operation. The 8-bit image data that is retrieved from the crosspoint switch 6105 is converted to 32-bit image data by converter 6113a prior to being provided to the processor circuitry 6111 and 6231.

Figure 45:
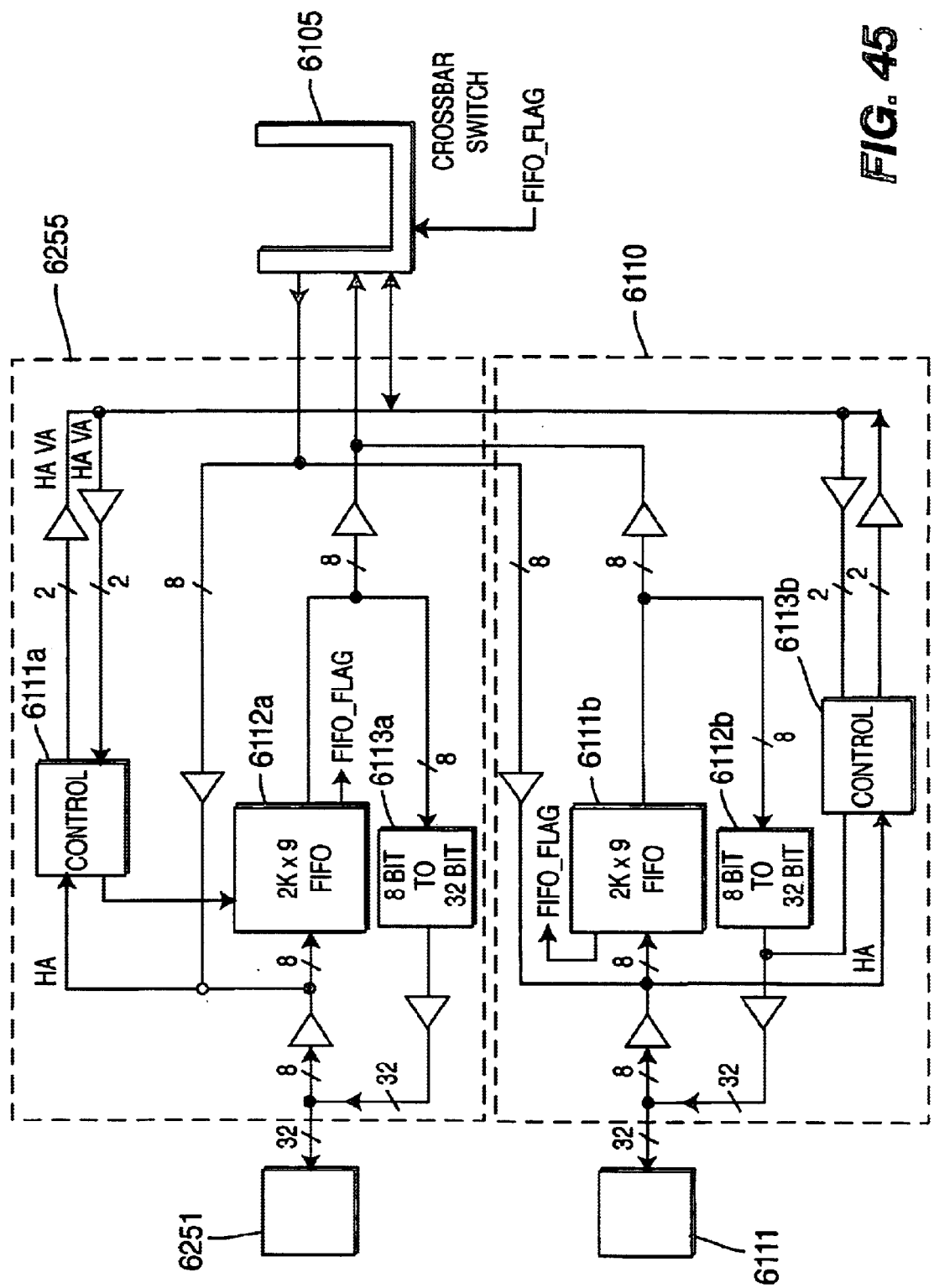
FIG. 45 is a block diagram of the FIFOs shown in FIG. 44 according to an alternative embodiment of the invention.

Data is also retrieved from processor circuitry 6111 and 6231 and provided to the crosspoint switch 6105 using the circuitry shown in FIG. 45. Timing signals HA and VA are added to the data retrieved from processor circuitry 6111 and 6231 so that pyramid circuitry may determine if valid image data is present. To create the signal HA, processors 6230, 6110a, and 6110b cause the control circuit 6111a to start and stop the signal HA using FPGA 6130. The signal HA is provided to the crosspoint switch to indicate that an active image data line is present. Prior to the setting of the ninth bit the first time image data is being retrieved, the processors 6230, 6110a, and 6110b cause the control circuit 6111a, using the FPGA 6130, to indicate that the next active signal HA indicates that signal VA should go active high. Signal VA is also provided to the crosspoint switch 6105 and remains active until the end of the retrieved data for one image fact or frame. The processors 6230, 6110a, and 6110b using FPGA 6130 cause the control 6111a prior to sending the last line of image data to the 2K×9 FIFO 6112a to indicate that when signal HA goes inactive that signal VA should also be inactive. Blanking data is produced by FPGA 6130 when signal HA or VA is low.

Before the crosspoint switch 6105 can retrieve image data from 2K×9 FIFO 6112a, the crosspoint switch 6105 determines if the 2K×9 FIFO 6112a contains at least one full line of image data. A programmable FIFO level flag FIFO_ FLAG is set to indicate that the 2K×9 FIFO 6112a contains a line of image data. The processors 6230, 6110a, and 6110b also monitor the 2K×9 FIFO 6112a register flags to prevent overflow of image data in the 2K×9 FIFO 6112a. The amount of image data in the 2K×9 FIFO 6112a could overflow if the processors 6230, 6110a, and 6110b store image data in the 2K×9 FIFO 6112a faster than image data is retrieved from the 2K×9 FIFO 6112a. This, may occur because data is not retrieved from the 2K×9 FIFO 6112a during blanking periods. Image data is stored from the processors 6230, 6110a, and 6110b in the 2K×9 FIFO 6112a in eight bit words with the ninth bit being the HA active bit.

Figure 47:
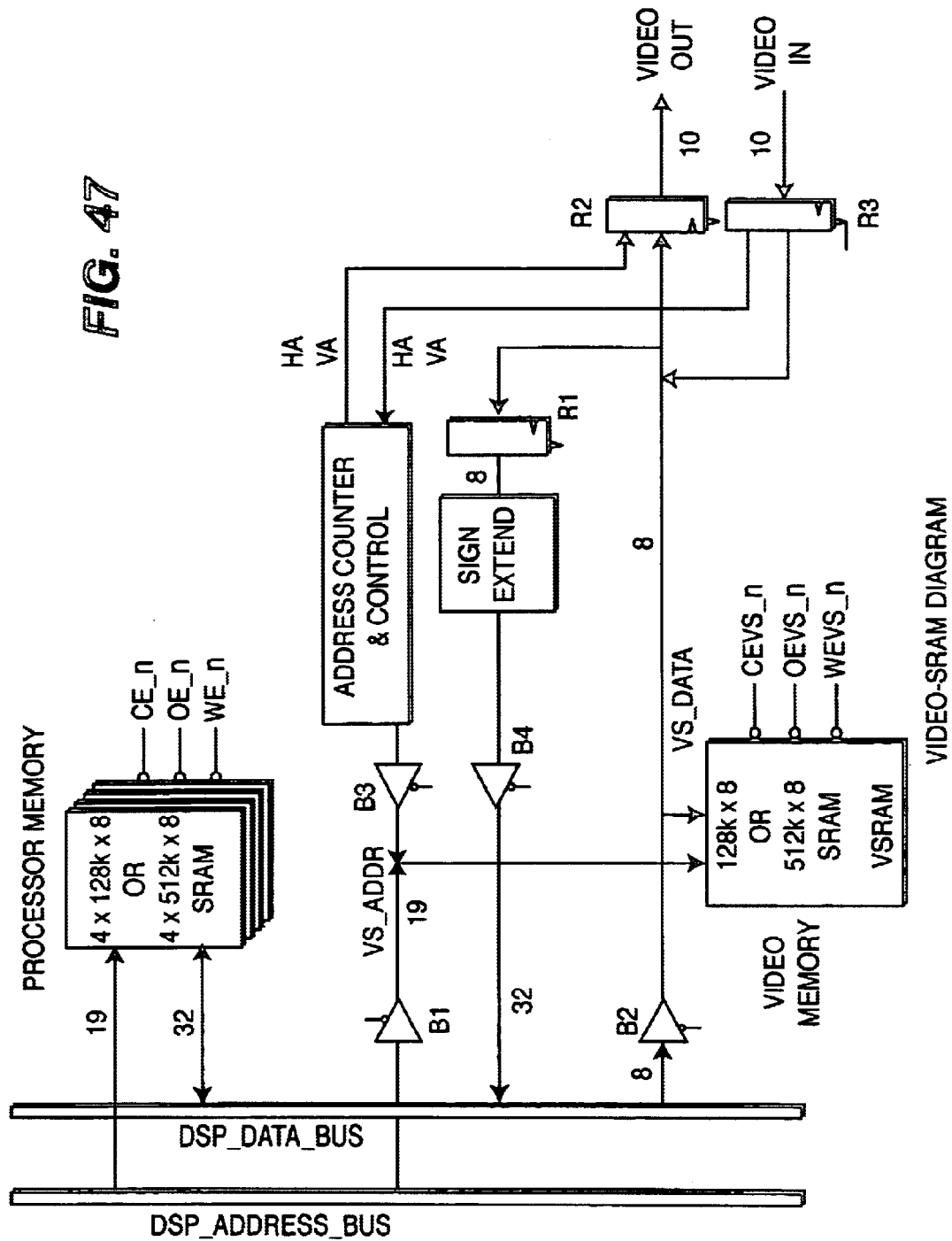
FIG. 47 is a block diagram of an alternative embodiment for circuitry shown in FIG. 44 that uses Video SRAM.

An alternative embodiment using Video SRAM that is described below with reference to FIG. 47. This embodiment allows the digital signal processors, host processor, or signal backplane not to be involved in actively transferring the video data from the crosspoint switch to memory that is accessible by the digital signal processor, no special timing circuitry is needed to make sure that the FIFO does not overflow, and the digital signal processor memory access to the video SRAM may be as fast as random access to the digital signal processor main memory.

The VSRAM provides a high-speed interface between the DSP and the video hardware. The VSRAM is organized as a 128K by 8 SRAM, that can be used to send data to and from the crosspoint switch in single-ported fashion. Larger memories may also be used in lie of the 128K by 8 SRAMs without further modification or the design may be extended to use 16 bit or 32 bit wide memory. The primary use of the VSRAM is used for analyzing image information. The VSRAM is used for this purpose because the frame stores do not support access speeds which would allow these operations to be performed directly using information stored in the frame store memories. In addition, images may be read from the VSRAM and provided to other components via the crosspoint switch. This is useful for processing operations that may be performed by the DSP, but may still utilize the video hardware for subsequent processing operations. This configuration also allows test imagery to be provided to the hardware.

The VSRAM includes an interface to a 128 k by 8 SRAM device. The first interface is a zero or one wait-state read and zero wait-state write access from the DSP to the VSRAM. The second and third interfaces are a video read and a video write interface to the crosspoint switch that provides or receives video data at the crosspoint switch data rates in the crosspoint video format of eight data bits plus the HA and VA timing signals. The VSRAM supports three types of transfer operations: video reads, video writes, and DSP access. Each of these operations is mutually exclusive. Alternatively, these operations may be performed in parallel by doubling the functionality using ping-pong or double buffered memories or by time-multiplexing these operations while increasing the bandwidth the memories. In the exemplary embodiment, when a video read or video write operation is performed, the DSP is locked out from the SRAM bank, and as a result read operations initiated to the VSRAM by the DSP will be undefined and write operates to the VSRAM by the DSP are ignored during these intervals.

The VSRAM may be accessed in a direct mode and in a pipelined mode. Using direct mode accessing, the DSP may access the VSRAM as it would access any other 8-bit memory space with no restrictions. These accesses are single wait-state accesses and are slower than accesses to the program and data SRAM. A DSP write to memory operation is performed by enabling the B1 buffer and the B2 buffer while controlling the VSRAM control signals. Because the DSP address and DSP data to pass through these buffers, access time to the VSRAM is increased, but because the DSP uses a two cycle write operation, the write access to the VSRAM is fast enough for zero-wait-state memory access.

A DSP read from the VSRAM memory in direct mode is accomplished by enabling the B1 buffer and the B4 buffer. Data then is retrieved from the VSRAM, transferred through the R1 register, the retrieved 8-bit data is then extended to the full DSP word width by adding zero data to the more significant bits, or by sign-extension of the most significant data bit of the VSRAM data to represent twos-complement data to the DSP. This path is typically slower then a DSP requires for fast access, but by controlling the DSP to extend the read cycle, a one-wait-state read access, the DSP may have moderately fast access to the memory in the VSRAM.

The DSP read operation from VSRAM memory in pipelined mode is performed in a similar manner as the DSP read operation from VSRAM memory in direct mode, except that register R1 is used in this mode. In this mode, the DSP read operation effectively retrieves data from register R1 that was stored in register R1 at the end of the previous read access to the VSRAM. During this access the VSRAM data is retrieved with the current DSP address and is stored in register R1 at the end of the read cycle, so that it is stored for the next VSRAM read access from the DSP. This provides zero-wait-state access to the VSRAM from the DSP. The pipelined data retrieved during each memory access is delayed by one access cycle. The first data retrieval operation in pipelined mode is undefined, the second data byte data retrieval corresponds to the address of the first read access, the third data byte data retrieval corresponds to the address of the second retrieval access, and so on.

The VSRAM video read operations are described below. When the VSRAM is programmed for a video retrieval operation, an image is retrieved from the VSRAM at full video rates, 30 MHz, and provided to the crosspoint switch. The retrieval operation starts at the programmed start location specified by the VSRAM start register. The size of the image retrieved is specified by a VSRAM register for HA and a VSRAM register for VA in the controller. The retrieval operation performs an auto increment of the address while retrieving, so images are retrieved from lower-valued locations to higher-valued locations in a linear fashion. Alternatively, the retrieval operation may be performed in a 2D fashion as used by the frame stores. The incremented address is provided to the VSRAM by enabling buffer B3.

The timing of the retrieval operation is consistent with the timing of the general frame stores. The video data is accompanied by two timing signals HA and VA, which indicate the active portion of the video data. Between every horizontal line, there is a horizontal blanking time where HA signal is low and the VA signal is high.

The VSRAM video write operations are described below. During the VSRAM video write operation, an image is provided from a video source such as a frame stores through the crosspoint switch or through register R3, if necessary for timing, and into the VSRAM memory at full video rate. The write operation starts at the programmed start location specified by a VSRAM start register. The size of the image write is determined by the incoming timing signals HA and VA, as in the frame stores. The write operation performs an auto increment of the address while writing, so images are stored from lower-valued locations to higher-valued locations in a linear fashion. Alternatively, this operation may be performed in a 2D fashion. The incremented address is presented to the VSRAM by enabling buffer b3. Most of the circuitry such as buffers, address counters, program and data registers, timing control, etc. shown in FIG. 47, may be implemented using Field Programmable Gate Arrays (FPGAs) such as are available from Altera or Xilinx.

An RS-232 interface 6110 is also provided to allow an alternative means of communication when a PCI master is not available.

Figure 46:
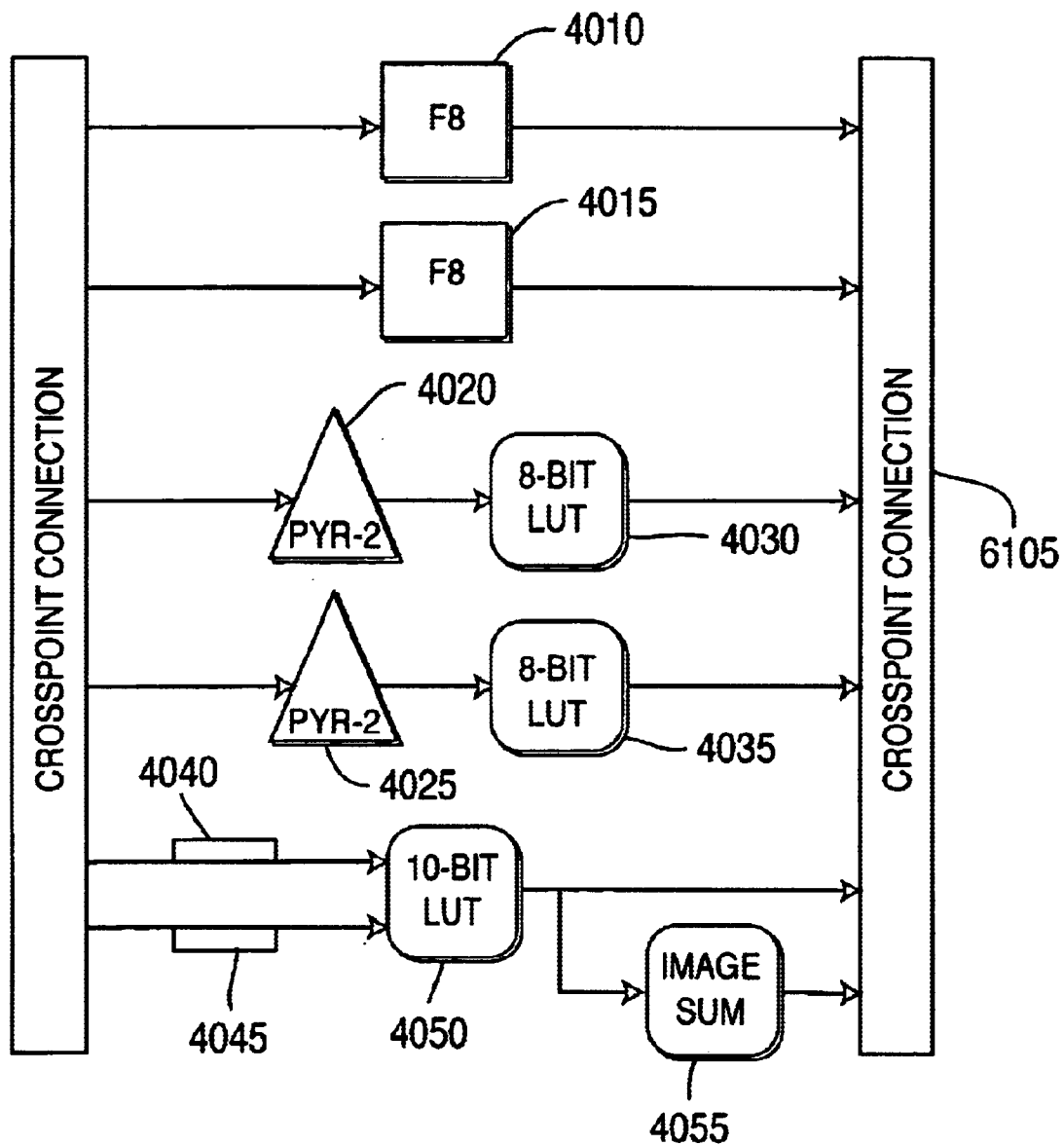
FIG. 46 is a block diagram of NFOV circuitry shown in FIG. 44 according to an alternative embodiment of the invention.

The pyramid daughter board 6300 is described below with reference to FIG. 46. The pyramid daughter board 6300 supports the NFOV processes and is the same as the WFOV pyramid circuitry shown in FIGS. 33, 38, and 39 except that the pyramid processes 4020 and 4025 have only one output port due to input/output limitations. The pyramid daughter board 6300 receives six digital video busses from the crosspoint switch 6105 and provides six video busses to the crosspoint switch 6105.

The motherboard 6100 also has a global bus 6180 that is a 32-bit bus and is the main communication path for all data between each of the processors 6230, 6110*a*, and 6110*b*. The global bus 6180 allows each processor 6230, 6110*a*, and 6110*b* to access its respective local memory 6240, 61156*a*, and 6115*b* for program and data space as well as pyramid processing hardware registers and shared DRAM. Each processor 6230, 6110*a*, and 6110*b* may also access its respective memory 6240, 61156*a*, and 6115*b*. If the processors 6230, 6110*a*, and 6110*b* access there respective memories 6240, 61156*a*, and 6115*b* via the global bus 6180, then each processor 6230, 6110*a*, and 6110*b* arbitrates for access to the global bus 6180. The global bus 6180 is controlled by FPGA control 6130 which accepts bus requests from each possible global bus master. After the FPGA control 6130 arbitrates which processor 6230, 6110*a*, and 6110*b* is to be granted control, the FPGA control 6130 produces a bus grant to the new global bus master which is the selected processor 6230, 6110*a*, and 6110*b*.

The interface from the motherboard 6100 to the daughterboards 6200 and 6300 is through two high density thru hole connectors (not shown). The thru hole connectors are 160 pins each, four rows of 40 pins each. Each daughterboard 6200 and 6300 has a processor 6230, 6110*a*, and 6110*b* data bus interface and also a video bus interface each containing power and ground. The video bus to the daughterboards 6200 and 6300 include six ten bit video input busses and six ten bit video output busses. These busses add up to a total of 120 pins of the 160 pin connector. The only other signal required for video processing is a frame start/stop signal used to synchronize the video transfers. The remaining 39 pins are to be used for ground which equates to about three video signals per ground.

The system is compliant with the Peripheral Component Interconnect (PCI) specification version 2.1. A PCI interface is desired to provide an interface a Pentium or PowerPC based CPU board. The CPU board could be used to process additional algorithms after obtaining imagery from the Iris board over the PCI bus. The system is to be a slave or master on the PCI bus. The only time the board is required to become a master is when the need arises to perform a burst transfers. The PCI interface chip provides an electrical interface to the motherboard global bus.

Many of the components described in the reference to FIGS. 33 to 42 may be integrated into a single integrated circuit by combining, for example, frame stores, pyramid processors with LUTs, an ALU with an LUT, and a crosspoint switch into a single IC. This IC would have external synchronous DRAM or Rambus DRAM or similar high bandwidth memories for the frame stores, external 512 k by 16 bit wide SRAM for the ALU LUT. One or more digitizers, such as the SN7110, may be directly coupled to such IC, or may interface with the IC through a field buffer, with the control as part of the IC. Such a system is described in U.S. Provisional Patent Application No. 60/007,906, entitled FULLY AUTOMATIC IRIS RECOGNITION SYSTEM, which is incorporated herein by reference.

A memory cache may also be coupled to the host control bus, to provide high bandwidth access to memory in the frame stores. The host control bus may be a standard PCI bus with up to a 64 bit data-width and a 66 MHz clock rate. The verification/recognition circuitry would consist of, for example, a workstation computer includes a Pentium-Pro Processor available from Intel Corporation, and that has a PCI interface, with associated interface and memory devices, directly connected through the PCI bus to one or two chips with associated memory devices.

Figure 48:
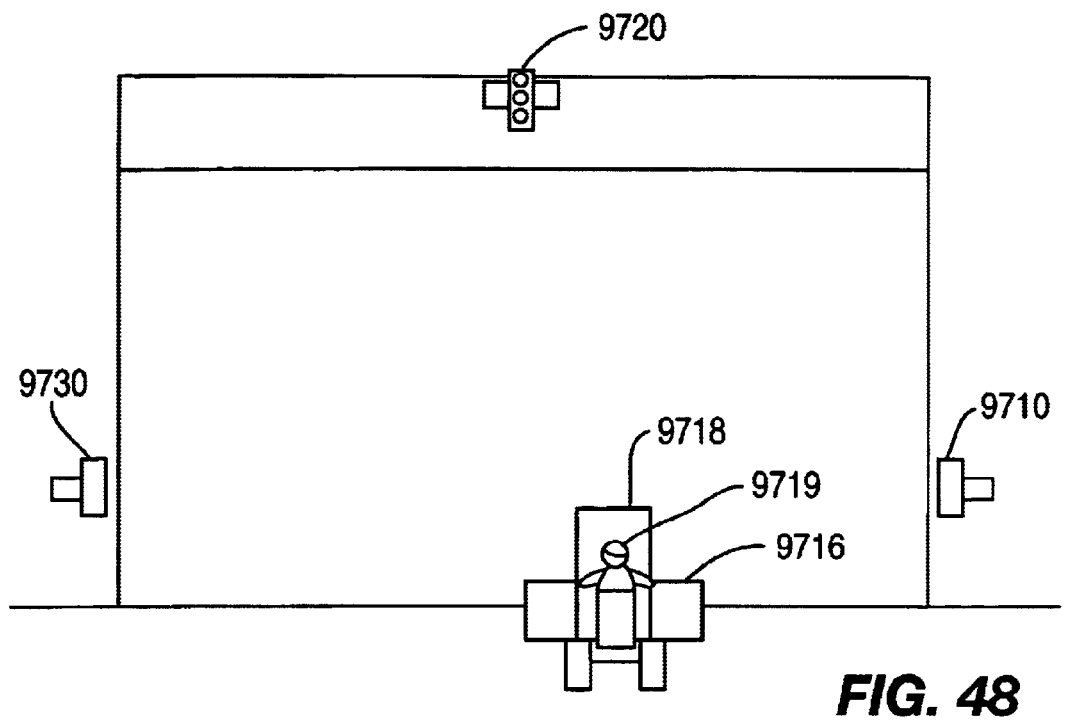
FIGS. 48 and 49 are perspective views of an another exemplary embodiment of the invention for detecting barcodes using WFOV imagery and NFOV imagery.

The wide-field of view/NFOV recognition system described above is not limited to iris recognition but may be applied more generally to any system in which an object having both large-scale and small-scale features is to be identified. One such application is illustrated in FIG. 48. In this application, three recognition systems, 9710, 9720 and 9730, such as the one described above are used in a warehouse for inventory control. In the system shown in FIG. 48, a worker is removing a box 9716 from the warehouse using a forklift 9718. The three recognition systems continually scan the scene for large-scale features indicative of barcodes. When such a large-scale feature is identified by the WFOV processing, the system switches to NFOV processing to capture and analyze an image of the barcode.

While the barcodes may be applied to materials stored in the warehouse, they also may be applied to equipment, such as the forklift 9718 and to the hardhat 9719 worn by the worker. Thus, the recognition system can be the sensing system of an inventory control and management system for the warehouse. In addition, matching barcodes may be applied to all sides of the materials in the warehouse and, as each barcode is read by the recognition system, it is checked against barcodes read by the other systems for consistency.

Figure 49:
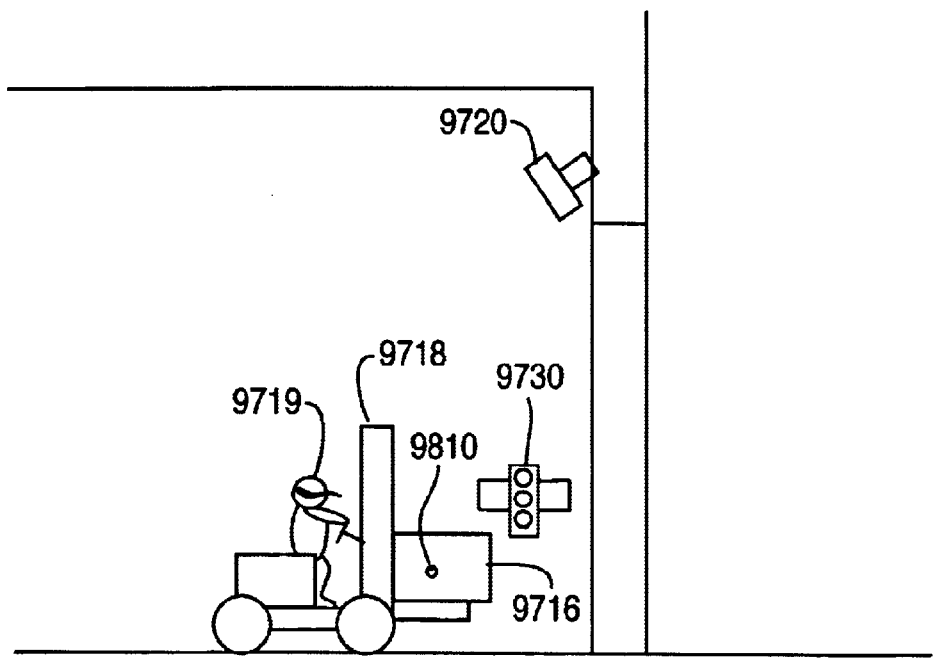
Figure 50A:
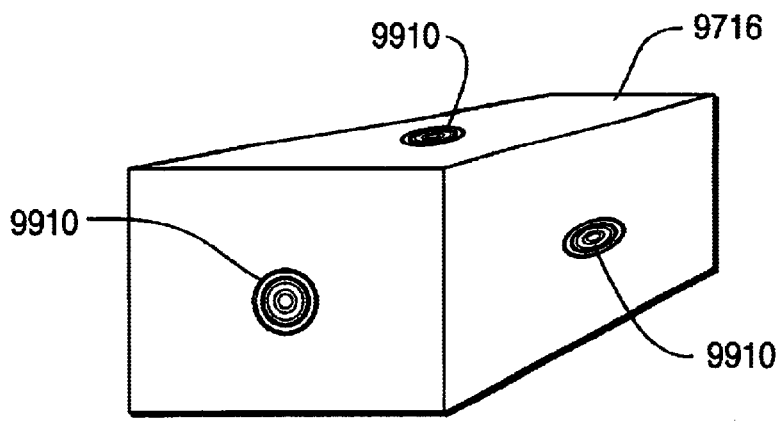
FIG. 50a is a perspective view of the barcodes on a container.
Figure 50B:
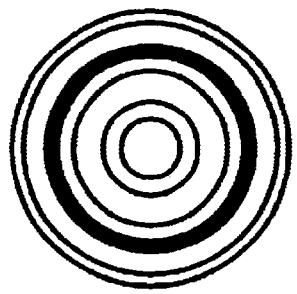
FIGS. 50b and 50c are exemplary barcodes for use with the system shown in FIGS. 48 and 49.

As shown in FIG. 49, as the forklift approaches the loading dock, the recognition system 9720 scans the scene for an identifying bar code, such as the barcode 9810. An exemplary barcode that may be used on the box is shown in FIG. 50B while a perspective view of the box 9716 is shown in FIG. 50A. As shown, the exemplary barcode is composed of concentric circles and is printed on all sides of the box 9716. It may also be printed with a reflective or shiny surface which would provide specular reflections. Accordingly, the features of the system described above which locate a target object in the WFOV image using specular reflections and then use image processing techniques based on circular features to extract a region of interest from the NFOV image may be directly applied to obtaining an image of the barcode 9910. In addition, the circle finding algorithm described above with reference to FIGS. 20 and 21 may be used both to locate the barcode in the NFOV image and to "read" the barcode by analyzing the pattern of light and dark regions along the most likely diameter.

Figure 50C:
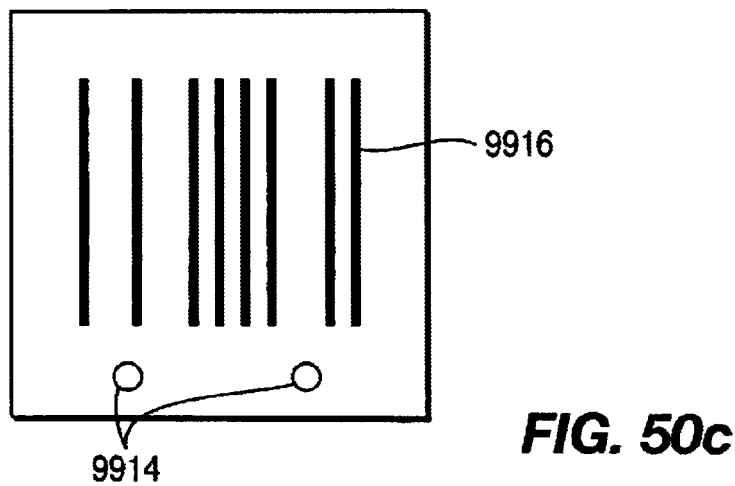

The system may use a more conventional linear barcode 9916 as shown in FIG. 50C. This barcode may also be printed with a reflective surface or it may include markers such as 9914 which emit light having a predetermined frequency when excited, for example, by ultraviolet light. These markers may be used in much the same way as the "red-eye" effect described above, either to locate the barcode in the WFOV image or to determine the proper orientation of the image in the NFOV image. Instead of placing the markers at the bottom of the label it is contemplated that the markers may be placed on either side of the linear barcode, indicating a path to be followed to read the barcode.

It is also contemplated that the infrared imaging techniques described above may be used to compensate for low-light conditions in the warehouse or to provide added security by having a barcode that is visible only in infrared light printed at some known offset from the visible light barcode. The near field of view image may be aligned to capture and process both the visible and infrared barcode images.

Another recognition task to which the exemplary system may be well suited is capturing images of license plates on vehicles. The location of a license plate may vary greatly with the type of vehicle. License plates, however, generally conform to a known size and shape. Used for this purpose, the WFOV processing would search images for features that are likely to be classified as license plates and then the NFOV processing may focus on the area of the scene identified by the WFOV imager and isolate a region of interest that may contain a license plate. In this application, the image recognition system may use such features as the reflectivity of the license plate or the infrared signature of tailpipe emissions to isolate an area of interest in the WFOV image.

A system of this type may be useful for monitoring vehicles entering and leaving a secure installation. Furthermore, by adding image stabilizers (not shown) to both the WFOV and NFOV processors, the system may be used in police vehicles to obtain an image of the license plate on a fleeing vehicle.

In both of the systems described above, it may be desirable to use a multi-level rangefinding technique which may, for example, determine a rough distance to the object to be imaged from an acoustic sensor, use this rough distance to focus the WFOV imager and to determine a zoom distance for the NFOV imager and then use other techniques, such as the stereoscopic range finding technique described above to provide coarse region of interest information and focus information to the NFOV processor. With this information, the NFOV processing can capture a focused image and refine the region of interest to obtain a detailed focused image of the target, either the barcode or the license plate.

The invention is a system which obtains and analyzes images of at least one object in a scene comprising a WFOV (WFOV) imager which is used to capture an image of the scene and to locate the object and a NFOV (NFOV) imager which is responsive to the location information provided by the WFOV imager and which is used to capture an image of the object, the image of the object having a higher resolution than the image captured by the WFOV imager.

The invention is also a fully automatic system that obtains and analyzes images of the irises of eyes of a human or animal in an image with little or no active involvement by the human or animal. According to one aspect of the invention, the system includes both WFOV and NFOV imagers. The system includes control circuitry which obtains an image from the WFOV imager to determine the location of the eyes and then uses the NFOV imager to obtain a high-quality image of one or both of the irises.

The invention is also a method for obtaining and analyzing images of at least one object in a scene comprising capturing a WFOV image of the object to locate the object in the scene; and then using a NFOV imager responsive to the location information provided in the capturing step to obtain higher resolution image of the object.

The invention is also a method for obtaining and analyzing images of an object in a scene comprising capturing an image of the scene, processing the image at a coarse resolution to locate the object in a region of interest in the image and processing the region of interest at a second resolution greater than the first resolution to capture a high resolution image of the object.

While the invention has been described in terms of multiple exemplary embodiments, it is contemplated that it may be practiced as outlined above within the spirit and scope of the following claims.

The invention claimed is:

1. A fully automatic iris recognition system which obtains and analyzes images of an iris of at least one eye in a scene comprising:

a wide view of view imager which is used to capture an image of the scene and to locate the eye; and a narrow field of view imager, distinct from the wide field of view imager, which is responsive to the location information provided by the wide field of view imager and which is used to capture an image of the iris of the eye, the image captured by the narrow field of view imager having a higher resolution and a narrower field of view than the image captured by the wide field of view imager.

2. The system of claim 1 in which the eye is located on a head and the system includes apparatus, coupled to the wide field of view imager and to a further wide field of view imager, which generates a depth map of an image from stereoscopic information provided by the wide field of view imager and the further wide field of view imager;

means, responsive to the depth map, for locating a head in the image; and means, responsive to the determined location of the head in the image for locating the eyes.

3. The system of claim 1 in which the eye is located on a head and the system includes apparatus, coupled to the wide field of view imager which is responsive to motion in the image to locate the head in the image; and means, responsive to the determined location of the head in the image for locating the eyes.

4. The system of claim 1 in which the eye is located on a head and the system includes apparatus, coupled to the wide field of view imager which is responsive to flesh tones in the image to locate the head in the image; and means, responsive to the determined location of the head in the image for locating the eyes.

5. The system of claim 1 in which the eye is located on a head and the system includes:

apparatus, coupled to the wide field of view imager which is responsive to patterns in the image corresponding to a face to locate the head in the image; and means, responsive to the determined location of the head in the image for locating the eyes.

6. The system of claim 1 in which the eye is located on a head and the system includes apparatus, coupled to the wide field of view imager which matches sections of the image corresponding to a face to a template to locate the eye in the image.

7. A fully automatic object recognition system which obtains and analyzes images of at least one object in a scene comprising:

a wide view of view imager which is used to capture an image of the scene and to locate the object; and a narrow field of view imager, distinct from the wide field of view imager, which is responsive to the location information provided by the wide field of view imager and which is used to capture an image of the object, the image captured by the narrow field of view imager having a higher resolution and a narrower field of view than the image captured by the wide field of view imager.

8. The system of claim 7 wherein the object has a feature and the narrow field of view imager captures an image of the feature.

9. The system of claim 8 wherein the image of the feature excludes other parts of the object.

10. The system of claim 7 further comprising a further wide field of view imager which is used to capture a further image of the scene; and the fully automatic recognition system further comprises:

means for producing a depth map from stereoscopic information provided by the wide field of view imager and the further wide field of view imager;

means, responsive to the depth map, for locating the object in the image; and means, responsive to the determined location of the object in the image for locating a feature on the object.

11. A fully automatic object recognition system which obtains and analyzes images of at least one object in a scene comprising:

at least one wide view of view imager;

wide field of view circuitry, coupled to the wide field of view imager, which processes images provided from the wide field of view imager;

a narrow field of view imager, distinct from the wide field of view imager, coupled to the wide field of view circuitry; and narrow field of view circuitry, coupled to the narrow field of view imager and to the wide field of view circuitry, which directs the narrow field of view imager based on data provided by the wide field of view circuitry and which processes images provided from the narrow field of view imager.

12. The system of claim 11 wherein in the wide field of view circuitry comprises:

control circuitry which controls operations of the narrow field of view imager and the wide field of view imager;

a crosspoint switch; and at least one pyramid processor coupled to the crosspoint switch, the pyramid processor processes images provided from the wide field of view imager via the crosspoint switch.

13. The system of claim 12 wherein the narrow field of view circuitry comprises a pyramid processor, coupled to the crosspoint switch, that processes the images provided from the narrow field of view imager via the crosspoint switch.

14. A fully automatic object recognition system which obtains and analyzes images of an object in a scene composing:

coarse imaging means for capturing an image of the scene at a first resolution and for processing the image at the first resolution to locate the object in a region of interest in the image; and fine imaging means, distinct from the coarse imaging means and responsive to the coarse imaging means, for capturing an image of the region of interest at a second resolution, greater than the first resolution and for processing the region of interest at the second resolution to capture a high-resolution image of the object.

15. A method for obtaining and analyzing images of at least one object in a scene comprising the steps of:

capturing a wide field of view image of the object to locate the object in the scene; and responsive to the location information provided in the capturing step capturing a high resolution image of the scene which includes the object, the high resolution image having a greater resolution and a narrower field of view than the wide field of view image, the high resolution image being distinct from the wide field of view image.

16. A method for obtaining and analyzing images of an object in a scene comprising the steps of:

capturing a first image of the scene;

processing the first image at a coarse resolution to locate the object in a region of interest in the scene;

responsive to location information provided by the processing step, capturing a second image of the region of interest in the scene said second image having a higher resolution and narrower field of view than the first image; and processing the second image at a second resolution greater than the first resolution to capture a high resolution image of the object.

* * * * *